US012261941B2

(12) United States Patent
Brandt et al.

(10) Patent No.: US 12,261,941 B2
(45) Date of Patent: Mar. 25, 2025

(54) CREATING, USING, AND MANAGING PROTECTED CRYPTOGRAPHY KEYS

(71) Applicant: Intel Corporation, Santa Clara, CA (US)

(72) Inventors: Jason W. Brandt, Austin, TX (US); Steven L. Grobman, Flower Mound, TX (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 18/040,245

(22) PCT Filed: Aug. 27, 2021

(86) PCT No.: PCT/US2021/048039
§ 371 (c)(1),
(2) Date: Feb. 1, 2023

(87) PCT Pub. No.: WO2022/051189
PCT Pub. Date: Mar. 10, 2022

(65) Prior Publication Data
US 2023/0269076 A1 Aug. 24, 2023

Related U.S. Application Data

(60) Provisional application No. 63/073,366, filed on Sep. 1, 2020.

(51) Int. Cl.
*H04L 9/08* (2006.01)
*H04L 9/32* (2006.01)
(52) U.S. Cl.
CPC .............. *H04L 9/0822* (2013.01); *H04L 9/32* (2013.01)

(58) Field of Classification Search
CPC ....... H04L 9/0822; H04L 9/0891; H04L 9/32; H04L 9/3239
See application file for complete search history.

(56) References Cited

U.S. PATENT DOCUMENTS 8,510,569 B2 * 8/2013 Smith ................... G06F 21/554
713/324
8,914,648 B1 * 12/2014 Pierson ................. G06F 21/64
713/189

(Continued)

OTHER PUBLICATIONS

Hasarfaty, Shai, and Yanai Moyal. "Behind the Scenes of Intel Security and Manageability Engine." BlackHat US 2019. (Year: 2019).*

(Continued)

*Primary Examiner* — John M MacIlwinen
(74) *Attorney, Agent, or Firm* — Nicholson De Vos Webster & Elliott LLP

(57) ABSTRACT

System, method, and apparatus embodiments for creating, using, and managing protected cryptography keys are described. In an embodiment, an apparatus includes a decoder, an execution unit, and a cache. The decoder is to decode a single instruction into a decoded single instruction, the single instruction having a first source operand to specify encrypted data and a second source operand to specify a handle including a first including ciphertext of an encryption key, an integrity tag, and additional authentication data. The execution unit is to execute the decoded single instruction to perform a first check of the integrity tag against the ciphertext and the additional authentication data for any modification to the ciphertext or the additional authentication data, perform a second check of a current request against one or more restrictions specified by the additional authentication data of the handle, decrypt the ciphertext to generate an encryption key only when the first check indicates no (Continued)

modification to the ciphertext or the additional authentication data and the second check indicates the one or more restrictions are not violated, decrypt the encrypted data with the encryption key to generate unencrypted data, and provide the unencrypted data as a result of the single instruction. The cache is to store the handle, wherein only a portion of the integrity tag is to be used in a lookup of the handle.

20 Claims, 26 Drawing Sheets

(56) References Cited

U.S. PATENT DOCUMENTS

| | | | |
|---|---|---|---|
| 2006/0015753 A1* | 1/2006 | Drehmel | H04L 9/32 |
| | | | 713/193 |
| 2012/0096282 A1 | 4/2012 | Henry et al. | |
| 2015/0271144 A1 | 9/2015 | Ronca | |
| 2018/0247082 A1* | 8/2018 | Durham | G06F 21/53 |
| 2019/0080096 A1 | 3/2019 | Savry | |
| 2019/0087354 A1* | 3/2019 | Chhabra | G06F 21/602 |
| 2019/0132120 A1* | 5/2019 | Zhang | H04L 63/0428 |
| 2020/0125742 A1* | 4/2020 | Kounavis | H04L 9/0822 |
| 2020/0134234 A1* | 4/2020 | LeMay | G06F 21/602 |

OTHER PUBLICATIONS

International Preliminary Report on Patentability, PCT App. No. PCT/US2021/048039, Mar. 16, 2023, 8 pages.
International Search Report and Written Opinion, PCT App. No. PCT/US2021/048039, Dec. 13, 2021, 11 pages.
Office Action, TW App. No. 110132120, Nov. 4, 2024, 42 pages (17 pages of English Translation and 25 pages of Original Document).

* cited by examiner

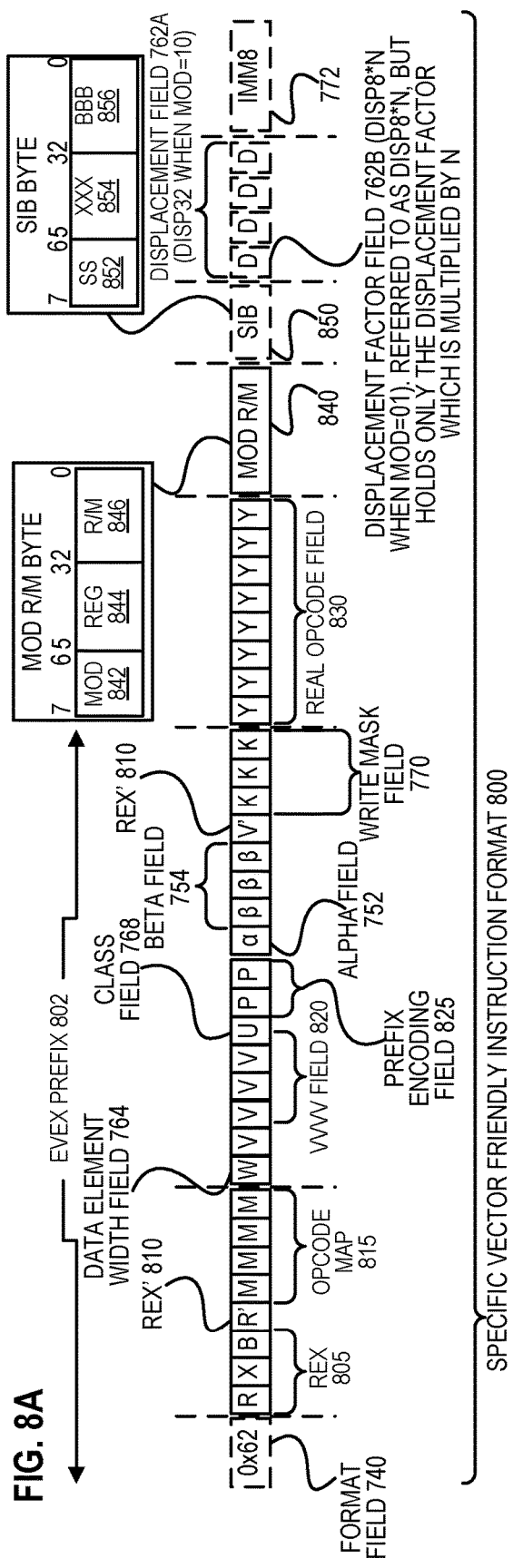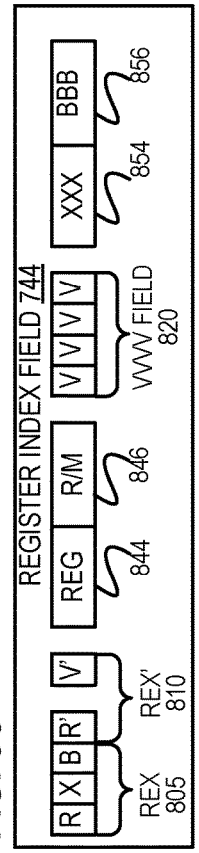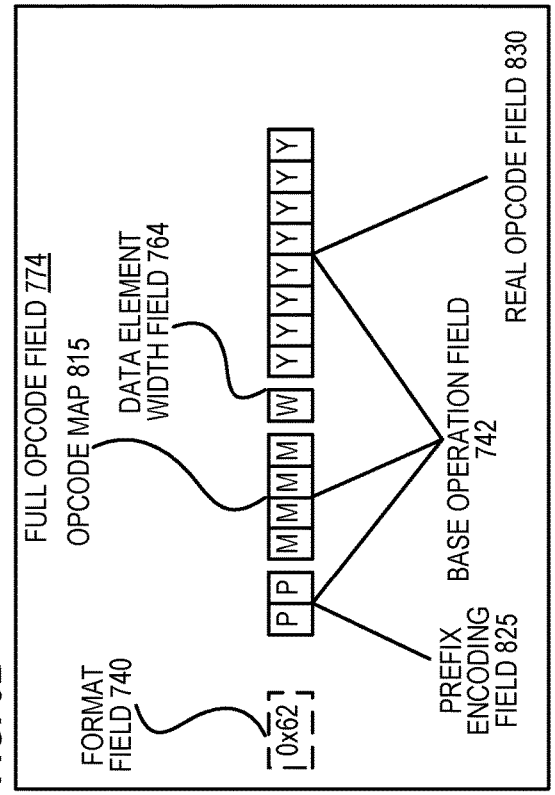

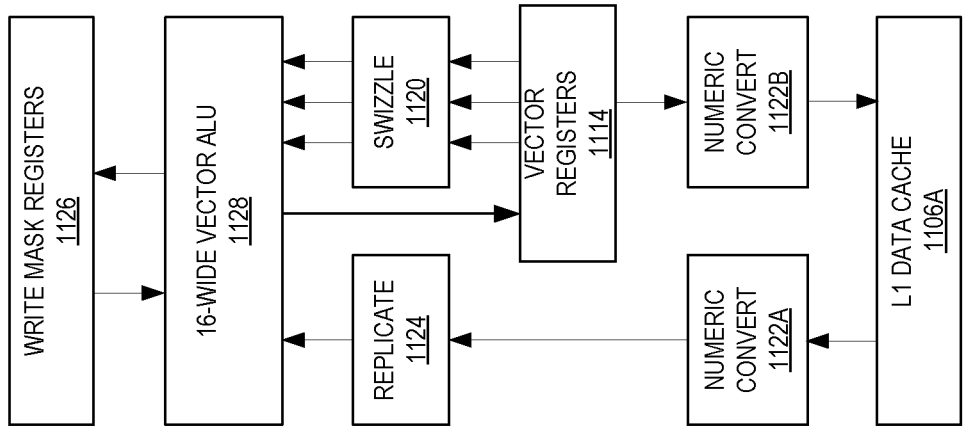
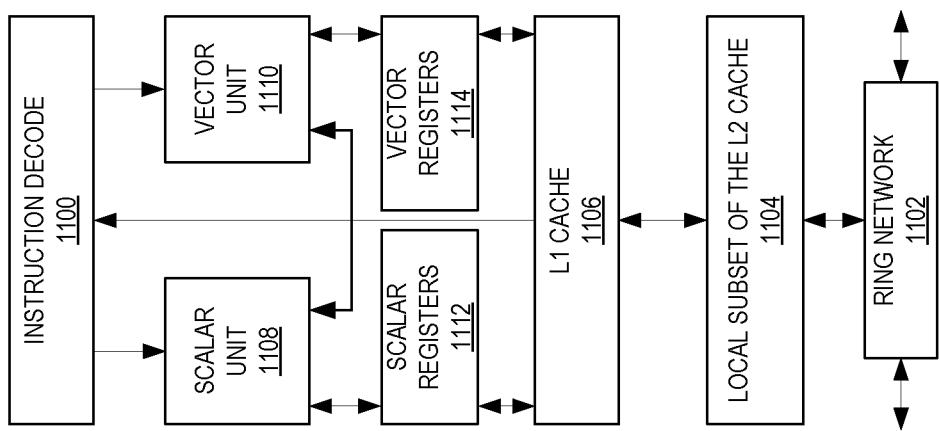

METHOD 2400

CREATING, USING, AND MANAGING PROTECTED CRYPTOGRAPHY KEYS

TECHNICAL FIELD

The disclosure relates generally to electronics, and, more specifically, an embodiment of the disclosure relates to circuitry to implement instructions to create and/or use data that is restricted in how it can be used.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8A is a block diagram illustrating fields for the generic vector friendly instruction formats in FIGS. 7A and 7B according to embodiments of the disclosure.

FIG. 8B is a block diagram illustrating the fields of the specific vector friendly instruction format in FIG. 8A that make up a full opcode field according to one embodiment of the disclosure.

FIG. 8C is a block diagram illustrating the fields of the specific vector friendly instruction format in FIG. 8A that make up a register index field according to one embodiment of the disclosure.

FIG. 11A is a block diagram of a single processor core, along with its connection to the on-die interconnect network and with its local subset of the Level 2 (L2) cache, according to embodiments of the disclosure.

FIG. 11B is an expanded view of part of the processor core in FIG. 11A according to embodiments of the disclosure.

DETAILED DESCRIPTION

Figure 1:
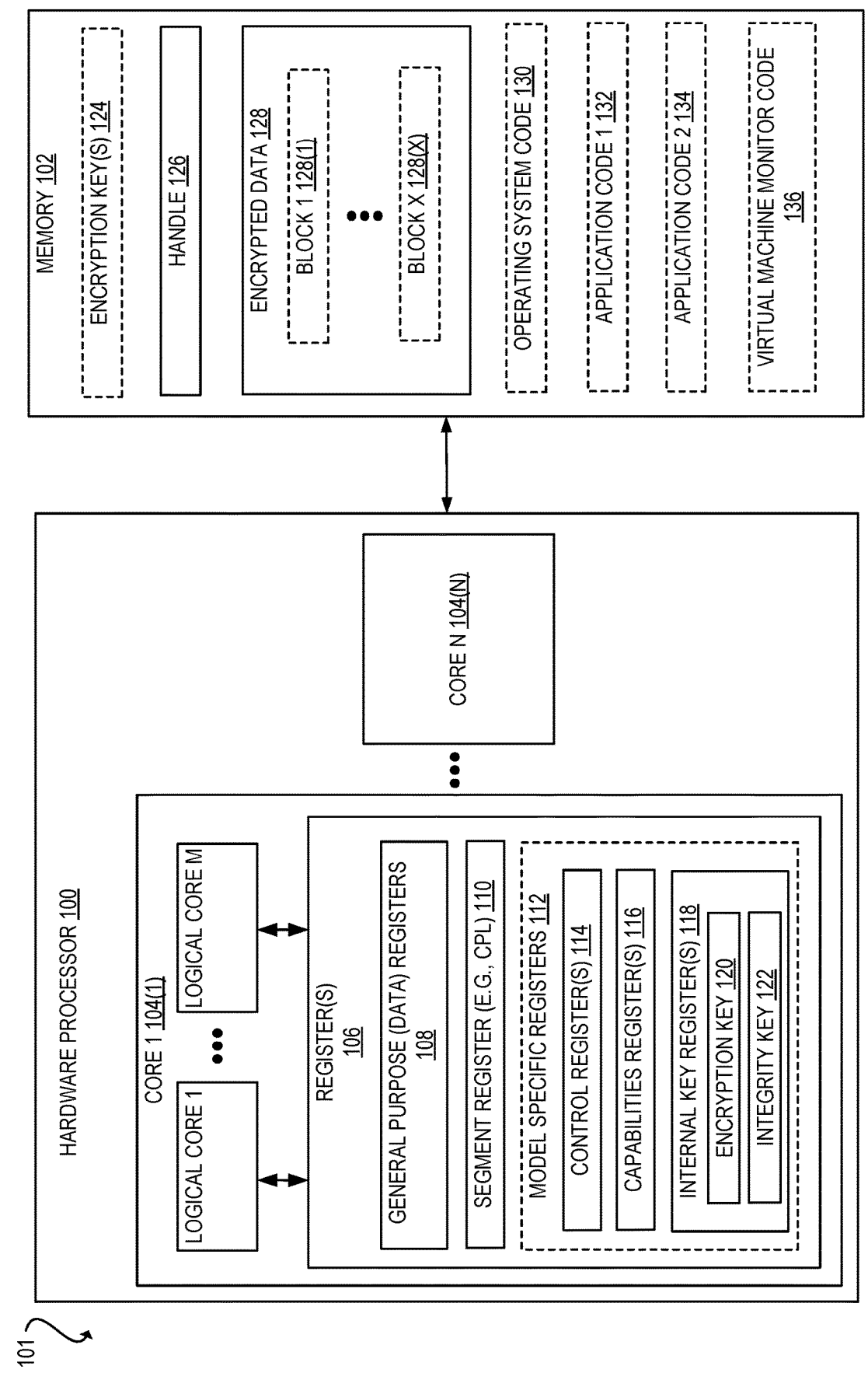
FIG. 1 illustrates a block diagram of a multiple core hardware processor utilizing a handle according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A hardware processor may use an encryption key (e.g., cryptographic key) to encrypt and/or decrypt data, for example, data that is desired to be protected from an attacker. The embodiments herein mitigate hardware and software attack scenarios that steal the underlying key, e.g., a key according to an Advanced Encryption Standard (AES). Certain embodiments herein limit operations to the way they are intended to be used so that an attacker who steals the encrypted data is unable to access it. In one embodiment, an encryption key for data (e.g., disk) encryption may be limited to only being usable in the OS and not in an application. In certain embodiments, a processor (e.g., at request of software) converts keys into respective "handles" that do not reveal the key value (e.g., with the original key then deleted from memory), and then the processor performs encryption and/or decryption with the handle using one or more of the instructions disclosed herein. In certain embodiments, a particular handle cannot be used on other systems or after revocation (e.g., after reboot). Handles can be specified with restrictions on what is allowed, for example, the handle being used by an operating system (OS) only, the handle being used for encryption only, or the handle being used for decryption only. Non-limiting usages of the instructions and methods herein are for cryptographic libraries, disk encryption, networking, any software using an encryption standard (such as AES). In one embodiment, a cryptographic library use is to abstract (e.g., hide) the use of the handle from applications.

In certain embodiments, an instruction set architecture of a hardware processor includes one or more of the instructions discussed herein to create and/or use data (e.g., original data) that is restricted in how it can be used. Although the below uses a cryptographic key as an example of the original data that is being protected, this is merely an example and other uses are possible. In one embodiment, an encryption (e.g., cryptographic) key is restricted to only be used in a particular mode, for example, the key used just by the OS, just by a specific application, just by a specific trusted execution environment (e.g., enclave), just by a specific virtual machine, just at a specific instruction pointer, etc.

Thus, an attacker who steals (e.g., via through a side channel or a data leak) the encrypted data (e.g., including the key) is unable to use it outside of the restricted manner. For some attack scenarios, this prevents the attacker from using the data (e.g., key) at all.

Embodiments herein are an improvement to computer functionality as they protect keys from exfiltration (e.g., where a stolen "handle" is not useful on another system/processor). Embodiments herein are an improvement to computer functionality as they are easily revoked (e.g., after security issue is detected), for example, where use of a handle ensures that the attacker who steals the handle does not get the true key (e.g., where the handle is not useful after revocation (e.g., reboot) so an attacker must persist their access). As discussed further below, a handle's use can be limited to a particular request (e.g., based on the mode/usage). For example, limiting use of a handle to only an OS (e.g., ring 0) only, to encryption only, to decryption only, to being virtual machine (VM) specific (e.g., assuming a virtual machine monitor (VMM) does not set up guests to share handle space), to being process specific, to being (e.g., secure) trusted execution environment specific, or any combination thereof. In one embodiment, a trusted execution environment is a (e.g., secure) enclave. In one embodiment, a trusted execution environment is a trusted domain (TD), e.g., a TD that is being worked on where an entire VM (e.g., guest) is run in a way that it is protected against attack from a malicious VMM that is managing it.

Certain embodiments herein are an improvement to computer functionality as they allow protection of data with the instructions discussed herein in contrast to switching to a different environment (e.g., a secure virtual machine or a trusted execution environment) in order to use data (e.g., a key) which can be high overhead and more complicated for software to manage than just directly using the data with native processor instructions.

FIG. 1 illustrates a block diagram of a multiple core hardware processor 100 utilizing a handle 126 according to embodiments of the disclosure. Hardware processor 100 including a plurality of cores 104(1) to 104(N) e.g., where N is any integer one (e.g., a single core type of processor) or greater (e.g., multicore type of processor). Hardware processor 100 is depicted as coupled to a system memory 102, e.g., forming a computing system 101. In the depicted embodiment, a core of (e.g., each core of) hardware processor 100 includes a plurality of logical cores (e.g., logical processing elements or logical processors), for example, where M is any integer 1 or greater. In certain embodiments, each of physical core 104(1) to physical core 104(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain embodiments, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 106 of core 104(1). In certain embodiments, each core includes its own set of registers 106. Registers 106 may include one or more general purpose (e.g., data) registers 108 to perform (e.g., logic or arithmetic) operations in, for example, additionally or alternatively to accessing (e.g., load or store) data in memory 102. Registers 106 may include a segment register 110, e.g., to store data indicating a current privilege level of software operating on a logical core, e.g., separately for each logical core. In one embodiment, current privilege level is stored in a current privilege level (CPL) field of a code segment selector register of segment register 110. In certain embodiments, processor 100 requires a certain level of privilege to perform certain actions, for example, actions requested by a particular logical core (e.g., actions requested by software running on that particular logical core).

Registers 106 may include one or more model specific registers 112. In one embodiment, model specific registers 112 are configuration and/or control registers. In certain embodiments, each physical core has its own respective set of registers 106. In certain embodiments, each logical core (e.g., of multiple logical cores of a single physical core) has its own respective set of registers 106. In certain embodiments, each logical core has its own respective configuration and/or control registers. In one embodiment, one or more (e.g., model specific) registers are (e.g., only) written to at the request of the OS running on the processor, e.g., where the OS operates in privilege (e.g., system) mode but does not operate in non-privilege (e.g., user) mode. In one embodiment, a model specific register can only be written to by software running in supervisor mode, and not by software running in user mode. Registers 106 may include capabilities register(s) 116, e.g., to indicate if the processor (e.g., core) is capable of performing the instruction(s) or other functionality discussed herein.

Registers 106 (e.g., model specific registers 110) may include one or more of control register(s) 114, capabilities register(s) 116, or internal key register(s) 118, e.g., in addition to other control registers. In one embodiment, each logical core has its own respective control register(s) 114, capabilities register(s) 116, internal key register(s) 118, or any combination thereof. In one embodiment, a plurality of logical cores share a single register, e.g., share one or more general purpose (e.g., data) registers 108.

In certain embodiments, each logical core includes its own (e.g., not shared with other logical cores) control register(s) 114, capabilities register(s) 116, and/or internal key register(s) 118, e.g., separate from the data registers 108. In one embodiment, internal key register(s) 118 is a write only register (e.g., it can only be written by software, and not read by software). In certain embodiments, control register(s) 114 and/or capabilities register(s) 116 are each read and write registers, e.g., with a write allowed when the write requestor (e.g., software) has an appropriate (e.g., permitted) privilege level (and/or predictor mode) and/or a read allowed for any privilege level. Each register may be read only (e.g., by a logical core operating in a privilege level below a threshold) or read and write (e.g., writable by a logical core operating in a privilege level above the threshold). In certain embodiments, read and write registers are readable and writeable only in supervisor privilege level. In certain embodiments, write-only registers are writeable only in supervisor privilege level and not readable for any privilege level. In certain embodiments, read-only registers are readable only in supervisor privilege level and not writeable for any privilege level.

Memory may include an encryption key 124, handle 126, and/or encrypted data 128 (e.g., multiple blocks 128(1) to 128(X) of encrypted data, where X is any integer greater than 1). In one embodiment, each block of encrypted data is encrypted by its own encryption key 124. In one embodiment, multiple blocks of encrypted data are encrypted by a single encryption key 124.

Memory 102 may include (e.g., store) one or more of (e.g., any combination of) the following software: operating system (OS) code 130, first application code 132, second (or more) application code 134, virtual machine monitor code 136, or any combination thereof. First application code 132 or second application code 134 may be a respective user program.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

Certain embodiments herein perform encryption/decryption using a handle 126 instead of a key for encrypted data 128. In one embodiment, a method (e.g., an instruction) uses data that was converted into the handle 126. In certain embodiments, a handle includes the original data encrypted with a key (e.g., encryption key 124), an integrity measurement (e.g., an authentication tag), and additional authentication data (e.g., metadata) specifying restrictions on how the data can be used (e.g., the additional authentication data also being protected by the integrity measurement). Example restrictions are that the handle (e.g., key encrypted within the handle) is not usable for encrypt/decrypt at CPL (e.g., ring) greater than zero, not usable for encrypt, and/or not usable for decrypt. Example format of handle 126 is a (e.g., 384 bit) handle for a first size of keys (e.g., 128 bit keys) where a first field (e.g., bits [127:0] of the handle 126) is the additional authentication data, a second field (e.g., bits [255:128] of the handle 126) are an authentication tag, and a third field is the encrypted version (e.g., ciphertext) of the original data (e.g., encryption key) (e.g., bits [383:256] of the handle 126). Another example format of handle 126 is a (e.g., 512 bit) handle for a second size of keys (e.g., 256 bit keys) where a first field (e.g., bits [127:0] of the handle 126) is the additional authentication data, a second field (e.g., bits [255:128] of the handle 126) are an authentication tag, a third field is one portion (e.g., the first half of bits of ciphertext bits in [127:0]) of the encrypted version of the encryption key (e.g., bits [383:256] of the handle 126), and a fourth field is the other portion (e.g., the second half of bits of ciphertext bits in [255:128]) of the encrypted version of the encryption key (e.g., bits [511:383] of the handle 126). An example format of the additional authentication data includes one or more of the following: a first bit position (e.g., index [0]) when set (e.g., to one) indicates the handle is not usable in CPL>0, a second bit position (e.g., index [1]) when set (e.g., to one) indicates the handle is not usable for encryption, a third bit position (e.g., index [2]) when set (e.g., to one) indicates the handle is not usable for decryption, another bit position (e.g., bits [27:24]) indicating a key type (e.g., 0 for a 128 bit key and 1 for a 256 bit key).

In one embodiment, the additional (e.g., authentication) data is integrity protected but not encrypted. In one embodiment, the additional (e.g., authentication) data is both integrity protected as well as confidentiality protected by being encrypted. For example, the metadata may be "in the clear" (meaning it can be observed inside the handle), but the concept of restrictions can also be done with the metadata being encrypted (e.g., so that an attacker who gets the handle does not know what restrictions are applied on the handle).

In certain embodiments, a handle is created by encrypting original data of an encryption key 124 (e.g., encryption key 124 used to encrypt a block of data in encrypted data 128) and setting the desired bit(s) in the additional authentication data. In certain embodiments, the ciphertext of the encrypted "encryption key" 124 and the (e.g., encrypted or unencrypted) additional authentication data are bound together to form an authentication tag, for example, by binding the associated data (e.g., additional authentication data) to the ciphertext and to the context where it is supposed to appear/be used so that attempts to "cut-and-paste" a valid ciphertext into a different context are detected and rejected, for example, by performing an authenticated encryption with associated data (e.g., to allow a recipient to check the integrity of both the encrypted and unencrypted information in a message). In certain embodiments, a nonce is utilized to create a handle. In certain embodiments, a nonce is not utilized to create a handle. In one embodiment, attempts to modify the ciphertext or the additional authentication data having a particular authentication tag will cause a failure to decrypt the ciphertext using that authentication tag (e.g., and the encryption key 120 and/or the integrity key 122). In certain embodiments, an encryption key 124 is deleted after generation of a corresponding handle. Generation of a handle is discussed in further detail below in reference to FIG. 4.

In certain embodiments, a handle 126 is generated for a future request (e.g., mode/usage) of the processor (e.g., core 104(1)) (e.g., a request corresponding to the restrictions specified in the additional authentication data) where the handle is to be used. For example, a future request (e.g., mode and/or use) may be for executing an OS (e.g., ring 0) only, encryption, decryption, executing a particular virtual machine (VM), executing a particular process, executing in a (e.g., secure) enclave, or any combination thereof. In one embodiment, a request (e.g., an instruction as discussed in reference to FIG. 2) to decrypt or encrypt is received by the core 104(1)), and in response, the core is to read the handle 126 and the internal key register 118 (e.g., having a key used to create the encrypted handle 126). In certain embodiments, the key(s) used to create a handle are private to the core 104(1), e.g., as stored in internal key register 118 (e.g., and not accessed by a read MSR or write MSR instruction, but only by an instruction as discussed in reference to FIG. 3).

In certain embodiments, after reading the handle 126 and the key used to create the encrypted handle 126, the core 104(1) performs a check of the authentication tag of the handle 126 against the ciphertext of the handle 126 (which in one example, is the encryption key for the encrypted data 128) and the additional authentication data of the handle 126 for any modification to the ciphertext or the additional authentication data, and if that passes, then performs a check of a current request (e.g., mode/use) of the core 104(1) against one or more restrictions specified by the additional authentication data of the handle 126, and decrypts the ciphertext to generate the original data (e.g., plaintext) (e.g., encryption key in one example) of the ciphertext only when the first check indicates no modification to the ciphertext or the additional authentication data, and the second check indicates the one or more restrictions are not violated. Core 104(1) may then decrypt or encrypt data with the unencrypted encryption key, e.g., decrypt the encrypted data 128 with the encryption key that is now in plaintext format.

In certain embodiments, a processor (e.g., CPU) caches the mapping from the handle to the plaintext format of the original data in order to avoid the latency or power required to decrypt the ciphertext format of the original data in the common case. In one embodiment, decryption is still needed when the "handle" to "original data" mapping is not present in the cache. Certain embodiments utilize a special cache for this purpose, e.g., not a data/instruction cache.

Figure 2:
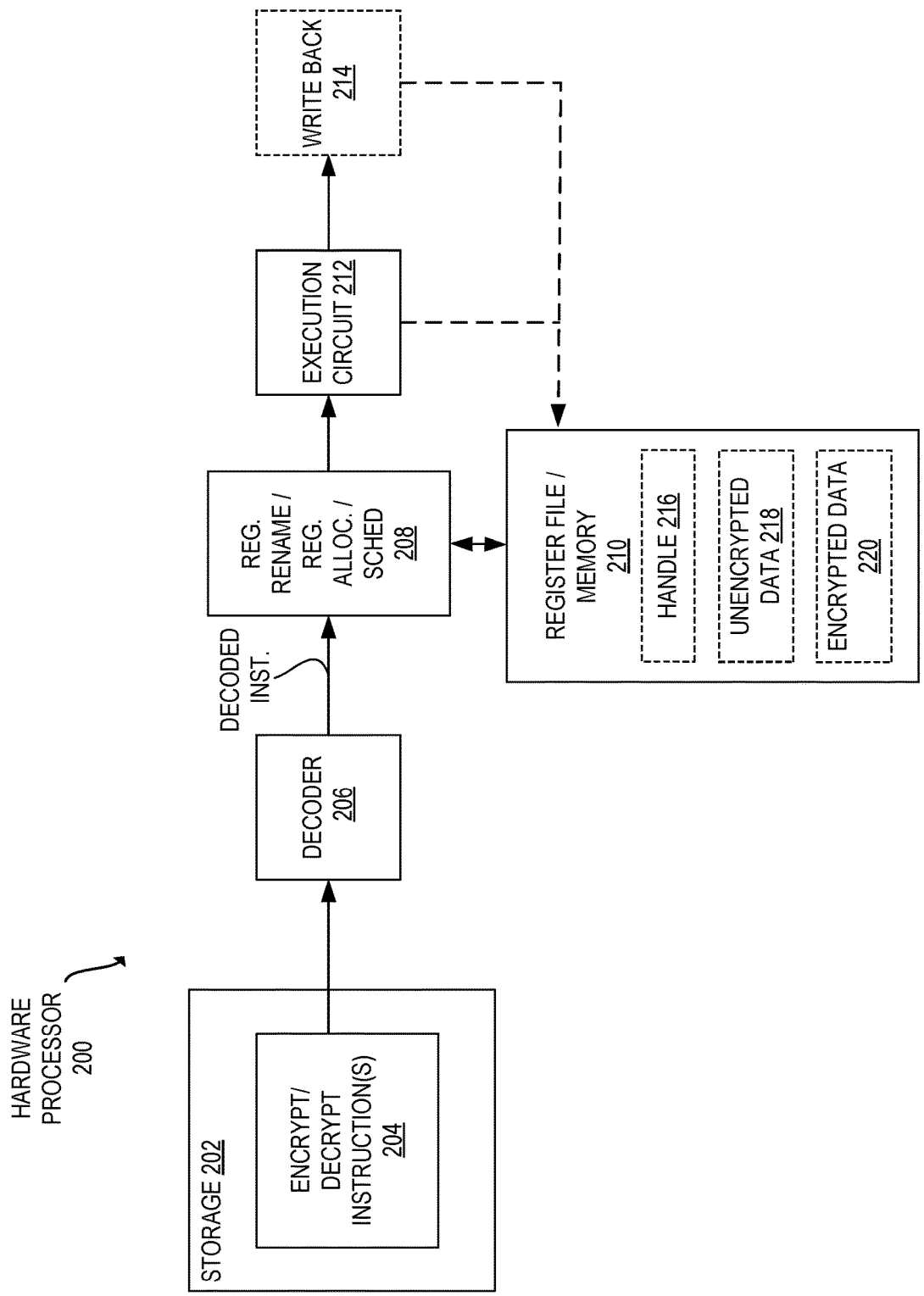
FIG. 2 illustrates a hardware processor coupled to storage that includes one or more encryption or decryption instructions utilizing a handle according to embodiments of the disclosure.

FIG. 2 illustrates a hardware processor 200 coupled to storage 202 that includes one or more encryption or decryption instructions 204 utilizing a handle 216 according to embodiments of the disclosure. In certain embodiments, an encryption or decryption instruction is according to any of the disclosure herein. In one embodiment, e.g., in response to a request to perform an operation, the instruction (e.g., macro-instruction) is fetched from storage 202 and sent to decoder 206. In the depicted embodiment, the decoder 206 (e.g., decoder circuit) decodes the instruction into a decoded instruction (e.g., one or more micro-instructions or micro-operations). The decoded instruction is then sent for execution, e.g., via scheduler circuit 208 to schedule the decoded instruction for execution.

In certain embodiments, (e.g., where the processor/core supports out-of-order (OoO) execution), the processor includes a register rename/allocator circuit coupled to register file/memory circuit 210 (e.g., unit) to allocate resources and perform register renaming on registers (e.g., registers associated with the instruction). In certain embodiments, (e.g., for out-of-order execution), the processor includes one or more scheduler circuits 208 coupled to the decoder. The scheduler circuit(s) may schedule one or more operations associated with decoded instructions, including one or more operations decoded from an encryption or decryption instruction, for execution on the execution circuit 212.

In certain embodiments, a write back circuit 214 is included to write back results of an instruction to a destination (e.g., write them to a register(s) and/or memory), for example, so those results are visible within a processor (e.g., visible outside of the execution circuit that produced those results).

One or more of these components (e.g., decoder 206, register rename/register allocator/scheduler 208, execution circuit 212, register file/memory 210, or write back circuit 214) may be in a single core of a hardware processor (e.g., and multiple cores each with an instance of these components.

In one embodiment of an encryption instruction, execution circuit 212 (e.g., unit) is to determine an encryption key from the handle 216 (e.g., as discussed herein) and if no exception (e.g., fault), then is to use the encryption key to encrypt the unencrypted data 218 into encrypted data 220.

In one embodiment of a decryption instruction, execution circuit 212 (e.g., unit) is to determine an encryption key from the handle 216 (e.g., as discussed herein) and if no exception (e.g., fault from not matching the authentication tag), then is to use the encryption key to decrypt the encrypted data 220 into unencrypted (e.g., decrypted) data 218.

In certain embodiments, an encryption or decryption instruction has the format of: OPCODE{ENC,DEC}{128, 256}KL to encrypt (ENC) or decrypt (DEC) a single (e.g., 128-bit) block of data. For example, with the source and destination data in registers 108 (e.g., in one of XMM0-7 registers). For example, with the handle in memory specified by memory argument.

In certain embodiments, an encryption or decryption instruction has the format of: OPCODE{ENC, DEC}WIDE{128,256}KL encrypts/decrypts to encrypt (ENC) or decrypt (DEC) multiple (e.g., any plurality, for example, eight) blocks of (e.g., 128-bits of) data with the same, single key. For example, with the source and destination data in registers 108 (e.g., in XMM0-7 registers). For example, with the handle in memory specified by memory argument.

In certain embodiments, an encryption or decryption instruction fails (e.g., throws an exception) if handle authenticity failure. In one embodiment, failure causes a set of an exception flag (e.g., EFLAGS.ZF) and do not modify destination data. In one embodiment where the destination may hold original plaintext/ciphertext, software checks for an exception flag (e.g., EFLAGS.ZF to avoid issues (e.g., putting plaintext into result). Example authenticity failures are: if handle not created (e.g., wrapped) with current (e.g., wrapping) key (e.g., internal key from internal key register 118), if handle indicates key of different size than instruction specifies, and/or if additional authentication data specifies rules that are violated (e.g., using handle outside indicated restrictions).

In certain embodiments, a handle is created from original data, and a key is an example of "original data" in this discussion, e.g., such that there is an internal key (IKey) used to create a handle from "original data", and in the below example that original data also happens to be a different key.

In certain embodiments, an internal key (IKey) (e.g., an internal wrapping key (IWKey)) is used to create a handle from a different key that is to be used for data encryption (e.g., to create encrypted data 220) or data decryption (e.g., to create decrypted data 218). In one embodiment, software (e.g., an OS or application) is allowed to write the internal key into a processor, but software is not allowed to read the internal key from the processor, e.g., software can write into internal key register 118 in FIG. 1 but cannot read from internal key register 118. In one embodiment, the internal key is written into the processor (e.g., into internal key register 118) by execution of a load internal key instruction (e.g., LOADIKEY instruction or a register write (e.g., WRMSR) instruction). The internal key may be software specified or hardware random. Certain embodiments allow an internal key to be read out only by software in a special secure mode (e.g. system management mode (SMM) or a specially privileged enclave).

In one embodiment, software can save the internal key to a platform-scoped state (e.g., IKeyBackup) and restore it from its storage using a new architectural MSR. In one embodiment, an operating system can use this to save/restore the internal key across sleep states (e.g., S3/S4 sleep states). A virtual machine monitor (VMM) can use this to save/restore a hypervisor internal key across virtual machine execution. A processor can use this to securely distribute an internal key to other logical processors (e.g., within the same core).

In certain embodiments, internal key is programmed by software or hardware, e.g., with software specifying a random or specific value using a "load internal key" instruction (e.g., early in boot). In one embodiment, software sets up the same internal (e.g., internal to a core) key for all logical processors (e.g., logical cores), for example, all logical processors in a single core. In one embodiment, the internal key value is not locked and thus can be overwritten. Execution of a handle generation instruction (e.g., as discussed in reference to FIG. 4) may return information on what entity wrote the current internal key, e.g., and indicate a software specified value for an internal key or a randomly generated internal key. The information returned allows code to decide whether it trusts the internal key (e.g., code in a trusted execution environment may only trust random internal keys).

Figure 3:
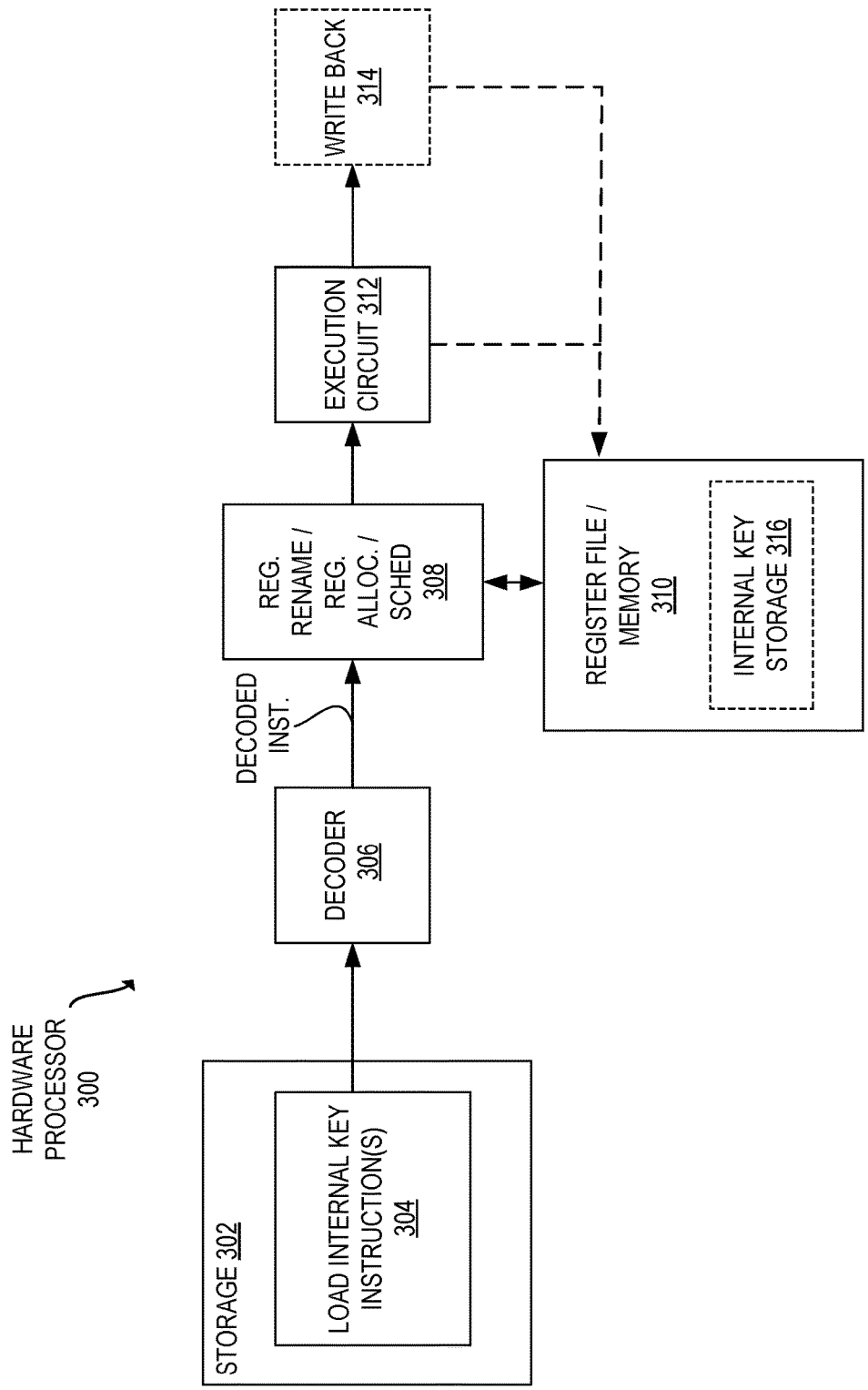
FIG. 3 illustrates a hardware processor coupled to storage that includes one or more load internal key instructions according to embodiments of the disclosure.

FIG. 3 illustrates a hardware processor 300 coupled to storage 302 that includes one or more load internal key instructions 304 according to embodiments of the disclosure. In certain embodiments, a load internal key instruction is according to any of the disclosure herein. In one embodiment, e.g., in response to a request to perform an operation, the instruction (e.g., macro-instruction) is fetched from storage 302 and sent to decoder 306. In the depicted embodiment, the decoder 306 (e.g., decoder circuit) decodes the instruction into a decoded instruction (e.g., one or more micro-instructions or micro-operations). The decoded instruction is then sent for execution, e.g., via scheduler circuit 308 to schedule the decoded instruction for execution.

In certain embodiments, (e.g., where the processor/core supports out-of-order (OoO) execution), the processor includes a register rename/allocator circuit coupled to register file/memory circuit 310 (e.g., unit) to allocate resources and perform register renaming on registers (e.g., registers associated with the instruction). In certain embodiments, (e.g., for out-of-order execution), the processor includes one or more scheduler circuits 308 coupled to the decoder. The scheduler circuit(s) may schedule one or more operations associated with decoded instructions, including one or more operations decoded from a load internal key instruction, for execution on the execution circuit 312.

In certain embodiments, a write back circuit 314 is included to write back results of an instruction to a destination (e.g., write them to a register(s) and/or memory), for example, so those results are visible within a processor (e.g., visible outside of the execution circuit that produced those results).

One or more of these components (e.g., decoder 306, register rename/register allocator/scheduler 308, execution circuit 312, register file/memory 310, or write back circuit 314) may be in a single core of a hardware processor (e.g., and multiple cores each with an instance of these components.

In one embodiment of a load internal key instruction, execution circuit 312 (e.g., unit) is to output an internal key (e.g., into internal key storage 316). In certain embodiments, an internal key (IKey) has the format of: an (e.g., 256 bit) encryption key (e.g., encryption key 120 in FIG. 1) (e.g., to encrypt original data for use a ciphertext in a handle), an (e.g., 128 bit) integrity key (e.g., integrity key 122 in FIG. 1) (e.g., a key to allow a recipient to check the integrity of both the encrypted information (e.g., ciphertext in a handle) and unencrypted information (e.g., additional authentication data in a handle)), a (e.g., 384 bit) "internal key owner" identity (e.g., owner ID), a single bit "no backup" flag, that when set, indicates that backup of the internal key to an internal key backup storage (e.g., in a cache of the core) is not allowed, and/or a source field where a first value (e.g., zero) means that software requested a specific internal key (e.g., through execution of a respective load internal key instruction) and a second value (e.g., one) means that software requested a random internal key (e.g., through execution of a respective load internal key instruction). In certain embodiments, software is not allowed to read the internal key from the processor.

In certain embodiments, a load "internal key" instruction has the format of: OPCODE (e.g., for LOADIKEY or LOADIWKEY mnemonic) source 2 (e.g., xmm_reg_src2), source 1 (e.g., xmm_reg_src1). In certain embodiments, only an OS (e.g., ring 0) can request execution of a load "internal key" instruction, for example, and not an application. In one embodiment, implicit registers are used (e.g., XMM0 and EAX). In one embodiment, IKey.Encryption_Key=concatenation of source 1 and source 2 (e.g., xmm_src_reg_2, xmm_src_reg1) and IKey.Integrity_Key=XMM0. In one embodiment, if implicit register (e.g., EAX[1]) is set, then IKey.Encryption_Key and IKey.Integrity_Key are XORed with random numbers (e.g., from a random number generator of the core). In certain embodiments, if insufficient randomness then this will fail (e.g., not modify IKey) and set an exception (e.g., ZF) flag. In certain embodiments, implicit register (e.g., EAX[0]) specifies IKey.NoBackup value. In certain embodiments, IKey.KeySource is set to indicate software specified (e.g., EAX[1]=0) or random (e.g., EAX[1]=1). In one embodiment, a virtual machine monitor is configured to cause a LOADIKEY VM exit by setting a "LoadIKey exiting" VM execution control. In certain embodiments, the encryption key (e.g., Encryption_Key) is used for encrypting the original data into the handle ciphertext while the internal key (e.g., Integrity_Key) is used for generating and verifying the authentication tag (e.g., which covers the original data and the additional authentication data).

In certain embodiments, the internal key is used for integrity and/or encryption/decryption of a handle. For example, where the handle includes an encrypted form of a key-to-be-used for encrypting data (e.g., data 128 in FIG. 1). In certain embodiments, software generates a handle from a key and other input values via handle generation instructions (e.g., ENCODEKEY128 to generate a handle from a 128-bit key and ENCODEKEY256 to generate a handle from a 256-bit key).

Figure 4:
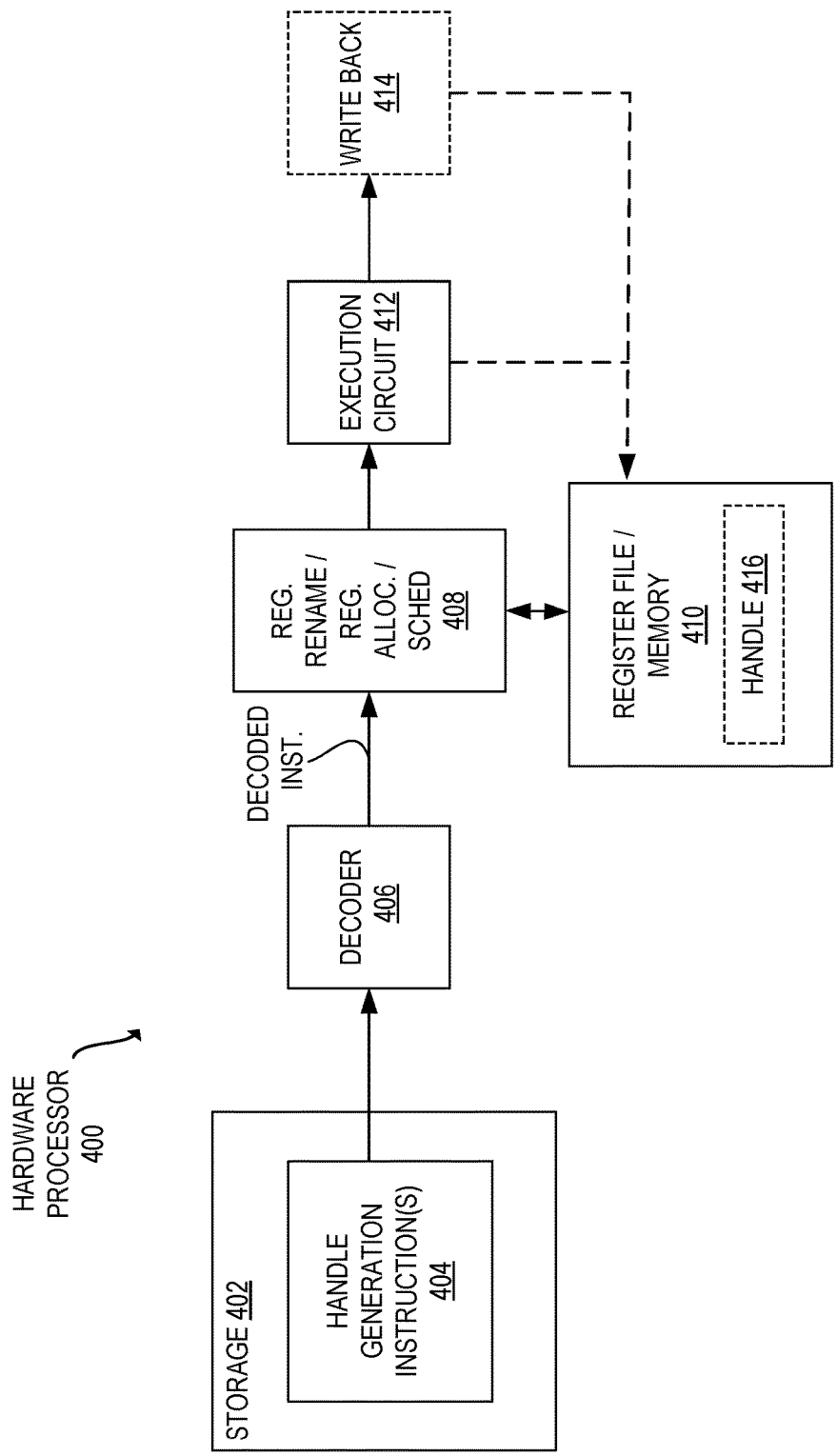
FIG. 4 illustrates a hardware processor coupled to storage that includes one or more handle generation instructions according to embodiments of the disclosure.

FIG. 4 illustrates a hardware processor 400 coupled to storage 402 that includes one or more handle generation instructions 404 according to embodiments of the disclosure. In certain embodiments, a handle generation instruction is according to any of the disclosure herein. In one embodiment, e.g., in response to a request to perform an operation, the instruction (e.g., macro-instruction) is fetched from storage 402 and sent to decoder 406. In the depicted embodiment, the decoder 406 (e.g., decoder circuit) decodes the instruction into a decoded instruction (e.g., one or more micro-instructions or micro-operations). The decoded instruction is then sent for execution, e.g., via scheduler circuit 408 to schedule the decoded instruction for execution.

In certain embodiments, (e.g., where the processor/core supports out-of-order (OoO) execution), the processor includes a register rename/allocator circuit coupled to register file/memory circuit 410 (e.g., unit) to allocate resources and perform register renaming on registers (e.g., registers associated with the instruction). In certain embodiments, (e.g., for out-of-order execution), the processor includes one or more scheduler circuits 408 coupled to the decoder. The scheduler circuit(s) may schedule one or more operations associated with decoded instructions, including one or more operations decoded from a handle generation instruction, for execution on the execution circuit 412.

In certain embodiments, a write back circuit 414 is included to write back results of an instruction to a destination (e.g., write them to a register(s) and/or memory), for example, so those results are visible within a processor (e.g., visible outside of the execution circuit that produced those results).

One or more of these components (e.g., decoder 406, register rename/register allocator/scheduler 408, execution circuit 412, register file/memory 410, or write back circuit 414) may be in a single core of a hardware processor (e.g., and multiple cores each with an instance of these components.

In one embodiment of a handle generation instruction, execution circuit 412 (e.g., unit) is to generate a handle 416 from an (e.g., AES) encryption key and an internal key (e.g., internal encryption key and an internal integrity key) (e.g., as discussed herein). In one embodiment, execution unit utilizes an encryption and integrity algorithm (e.g., AES algorithm) (e.g., the AES-GCM-SIV) to generate the handle 416. In certain embodiments, the handle 416 is written to a register (e.g., register(s) 108 in FIG. 1). In one embodiment, the handle is written into memory 102 (e.g., handle 126 in FIG. 1).

In certain embodiments, execution of a handle generation instruction also causes a destination register to be updated with a value to indicate the loader of the internal key (e.g., and software or random internal key) and if backup of the internal key is allowed. In one embodiment, software that wants only random internal key can delete handle if non-random. In certain embodiments, the execution of a handle generation instruction is allowed in all privilege levels (e.g., OS, application, enclave, etc.). In certain embodiments, the encryption/integrity algorithm does not use a key derivation function when a load internal key (e.g., encryption and integrity keys) instruction is utilized. For example, with the handle generation instruction not utilizing a nonce in its execution (e.g., not utilizing a nonce in the encryption/integrity algorithm).

In certain embodiments, a handle generation instruction takes as input not only the key, but also restrictions on how the handle can be used. In certain embodiments, a handle generation instruction takes a restriction type field in a source (e.g., source register). Example restriction is not allowing a handle to be used for encrypt/decrypt at ring greater than zero. In certain embodiments, restriction type can be seen in additional authentication data of resulting handle (e.g., in bits 127:0). In certain embodiments, restriction type and qualification can be seen in additional authentication data of resulting handle (e.g., in bits 127:0). In one embodiment, additional authentication data (AAD) of resulting handle is integrity protected (e.g., by authentication tag), but not encrypted. In certain embodiments, a single handle can indicate multiple restrictions, for example, a handle that only works in ring zero and only encrypts (not decrypt). In certain embodiments, the restriction type is evident in the handle, but restriction cannot be changed without breaking the crypto (e.g., it will destroy the original data, which in the example above in an (e.g., AES) encryption key).

In certain embodiments, a handle generation instruction (e.g., for a 128-bit key that is being converted to ciphertext) has the format below in Table 1.

TABLE 1

Example format for a handle generation instruction (e.g., ENCODEKEY128 instruction).

| Inputs | Description |
|---|---|
| XMM0 | Input key (e.g., [127:0]) |
| Src(GPR) | Bit 23-0: Handle restriction type.<br>Exception (e.g., #GP) if reserved encoding specified<br>Bit 31-24 are reserved and will #GP if non-0. Upper 32-bits ignored (e.g., ignores REX.W, CS.D) |

| Outputs | Description |
|---|---|
| XMM0-XMM2 | Output of handle:<br>XMM0 stores handle 127:0 (AAD)<br>XMM1 stores handle 255:128 (Tag)<br>XMM2 stores handle 383:256 (Ciphertext). |
| Dest(GPR) | Bit 0 will be set if and only if No Backup flag set<br>Bits 4:1 will be set KeySource (0 if LoadIKey software-specified, 1 if LoadIKey Random, other values reserved)<br>Bits 63-5 set to 0 |
| XMM4-6 | Zeroed or may optionally hold "internal key owner" identity |

In certain embodiments, a handle generation instruction (e.g., for a 256-bit key that is being converted to ciphertext) has the format below in Table 2.

TABLE 2

Example format for a handle generation instruction (e.g., ENCODEKEY256 instruction).

| Inputs | Description |
|---|---|
| XMM0 | Input key (e.g., [127:0]) |
| XMM1 | Input key (e.g., [255:128]) |
| Src(GPR) | Bit 23-0: Handle restriction type. Exception (e.g., #GP) if reserved encoding specified. Bit 31-24 are reserved and will #GP if non-0. Upper 32-bits ignored (e.g., ignores REX.W, CS.D) |

| Outputs | Description |
|---|---|
| XMM0-XMM2 | Output of handle: XMM0 stores handle 127:0 (AAD) XMM1 stores handle 255:128 (Tag) XMM2 stores handle 383:256 (Ciphertext [127:0]) XMM2 stores handle 511:384 (Ciphertext [255:128]) |
| Dest(GPR) | Bit 0 will be set if and only if No Backup flag set. Bits 4:1 will be set KeySource (0 if LoadIKey software-specified, 1 if LoadIKey Random, other values reserved) Bits 63-5 set to 0 |
| XMM4-6 | Zeroed or may optionally hold "internal key owner" identity |

Referring again to FIG. 1, control and capabilities of the functionality discussed herein may be controlled and delineated, e.g., by control register 114 and capabilities register 116, respectively. Table 3 below discuses example bits for control and capabilities. Use of a handle may be part of a set of KeyLocker (KL) functionality.

handle restrictions and on that same system or (ii) by an agent who know the internal key (IKey), for example, where the agent can decrypt a handle to recover original key. In certain embodiments, (ii) may be prevented by proper internal key maintenance. Handle restrictions can be used to prevent malicious software from using handles elsewhere, e.g., even if it manages to steal them.

The embodiments herein may be used as a restriction to limit handle use to an enclave. For example, if an "enclave restricted" bit in a handle is set, then that handle is only usable inside an enclave whose (e.g., 64 bit) enclave TD (EID) matches additional authenticated data field bits (e.g., 127:64) of the handle (e.g., bits that are integrity protected but not encrypted). This may prevent an attacker who steals the handle from using it outside the enclave presuming the attacker does not have the internal key. An enclave may require hardware random internal key (e.g., unknown to any software).

The embodiments herein may be used as a restriction to limit handle use to a process. For example, if a "process restricted" bit in handle is set, then that handle is only usable inside a process whose (e.g., 64 bit) process ID matches handle bits (e.g., bits [95:32]). In one embodiment, new IA32_PROCESS_ID MSR holds process ID in bits 63:0. When less bits are needed for process ID (e.g., only 48 bits), OS can use extra MSR bits for other usages (e.g., handle revocation). A particular application can use the "process restricted" bit to ensure that any handles that are stolen by another application on the system cannot use the handle.

In virtualization, virtual machine monitors (e.g., hypervisors) often pause or migrate guests (e.g., virtual machines). It may be desirable to pause a guest and resume it (e.g., months) later (e.g., after several reboots). It may be desirable to move the guest to another system (migration). In certain embodiments, a handle makes keys ephemeral so they cannot be used after reboot or on another system. As a solution to meet the desires mentioned above, an internal key may be software specified (for example, with the virtual

TABLE 3

Example Enumeration of Control and Capabilities.

| CPUID Bit | When set | Indicates support for |
|---|---|---|
| KL_SUPPORTED | Hardware supports KL | CR4.KL, Basic LoadIKey instructions, KL CPUID leaf |
| ENC.DEC_KL_ENABLED | KL fully enabled (CR4.KLset, feature activation done if needed) | Load Internal Key {128, 256} and Encryption or Decryption instructions {ENC, DEC} {128, 256}KL instructions |
| KL Wide | HW supports WIDE*KLinstructions | Encryption or Decryption instructions {ENC, DEC}WIDE{128, 256}KL instructions |
| IKeyBackup | System supports IKeyBackup | KeyLocker MSRs (IA32_COPY_LOCAL_TO_PLATFORM, IA32_COPY_PLATFORM_TO_LOCAL, IA32_COPY_STATUS, IA32_IKEYBACKUP_STATUS) |
| NoBackup | System supports NoBackup | LoadIKey with EAX[0] set |
| Random LoadIKey | System supports LoadIKey of HW with random key | LoadIKey with EAX[1] set |
| Restrictions Supported bitmap | Indicates which restrictions are supported | Which bits can be set in the source register for Load Internal Key {128, 256} |

The embodiments herein may be used as infrastructure for permission checks. In certain embodiments, a (e.g., Key-Locker) handle is only usable in two ways: (i) as allowed by machine monitor recording an internal key, e.g., when a guest uses a load internal key instruction) and/or the virtual machine monitor hiding/preventing usage of a load internal key instruction (e.g., with EAX[1] or can take VM exit and replace with software (SW) specified key or even with host's internal key). In one embodiment, a virtual machine monitor backups hypervisor internal key using platform scope IKey-Backup before loading guest key.

Figure 5:
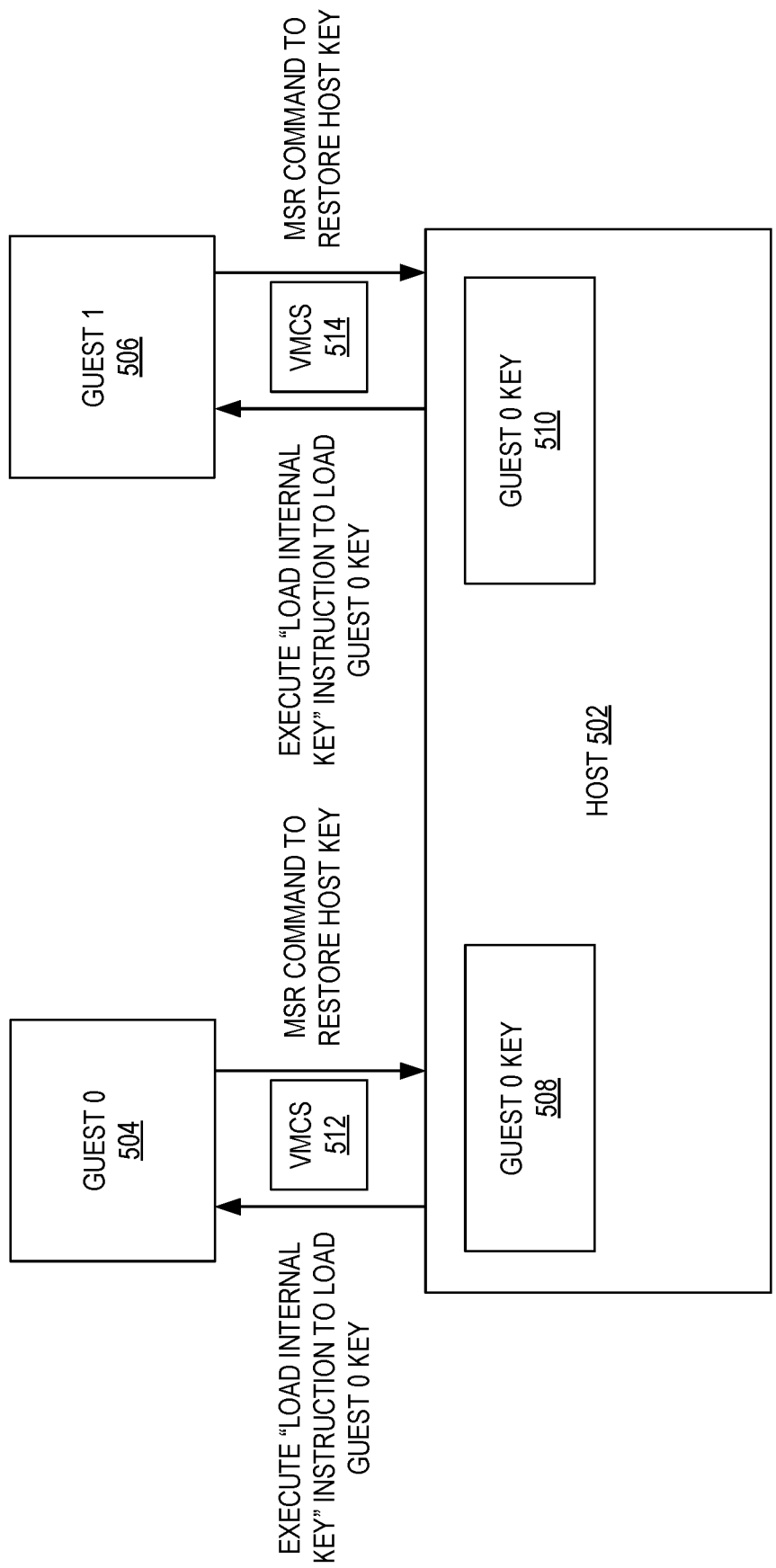
FIG. 5 illustrates execution of a first "load internal key" instruction to load a first guest key and execution of a second "load internal key" instruction to load a second guest key according to embodiments of the disclosure.

FIG. 5 illustrates execution of a first "load internal key" instruction to load a first guest key and execution of a second "load internal key" instruction to load a second guest key according to embodiments of the disclosure. Host 502 has two guests, i.e., guest 0 504 and guest 506. Depicted guest 504 includes a virtual machine control structure 512 and depicted guest 506 includes a virtual machine control structure 514. As depicted, guest 504 executes a load internal key instruction to load host 502 with guest 0 key 508. In one embodiment, on exit of guest 504, an MSR command is issued to restore host internal key instead of the guest 0 internal key. As depicted, guest 506 executes a load internal key instruction to load host 502 with guest 1 key 510. In one embodiment, on exit of guest 506, an MSR command is issued to restore host internal key instead of the guest 1 internal key.

In certain embodiments, a control register (e.g., CR4.KL (bit 19)) is used to prevent guests of legacy virtual machine monitors from writing internal key (e.g., Key Locker) state. In one embodiment, the control register is to prevent reading/writing internal key(s), e.g., with an exception (e.g., undefined (#UD)) on all handle/internal key related instructions (e.g., on all read or write internal key instructions), for example, when CR4.KL is 0. In certain embodiments, the exception does not affect the internal key value, it just causes those instructions to generate an exception. In one embodiment, a virtual machine monitor is to use an MSR bitmap to protect unknown MSRs (and thus IKeyBackup if utilized). In one embodiment, CR4.KL existence enumerated by CPUID.KL_SUPPORTED (CPUID.(07H,0).ECX[23]).

The embodiments herein may be used as a restriction to limit a handle to a guest. For example, if a "virtual machine extensions (VMX) guest" bit in handle is set, then that handle is only usable inside a VMX guest whose (e.g., 32 bit) VM ID is equal to handle bits (e.g., bits [127:96]). Certain embodiments herein allow the linking of a handle to a specific VMX guest. In one embodiment, VM ID is a field in a virtual machine control structure, e.g., different from a virtual machine control structure pointer and an extended-page-table pointer field which identify guests but change on migration and are physical addresses. For example, where it is desirable to not expose platform physical addresses to guests. A restriction to limit a handle to a guest may be utilized if a victim and attacker guests need to sometimes share handles and use the same internal key(s). In one embodiment when a victim and attacker guests use different internal keys, then they already cannot use each other's handles.

Figure 6:
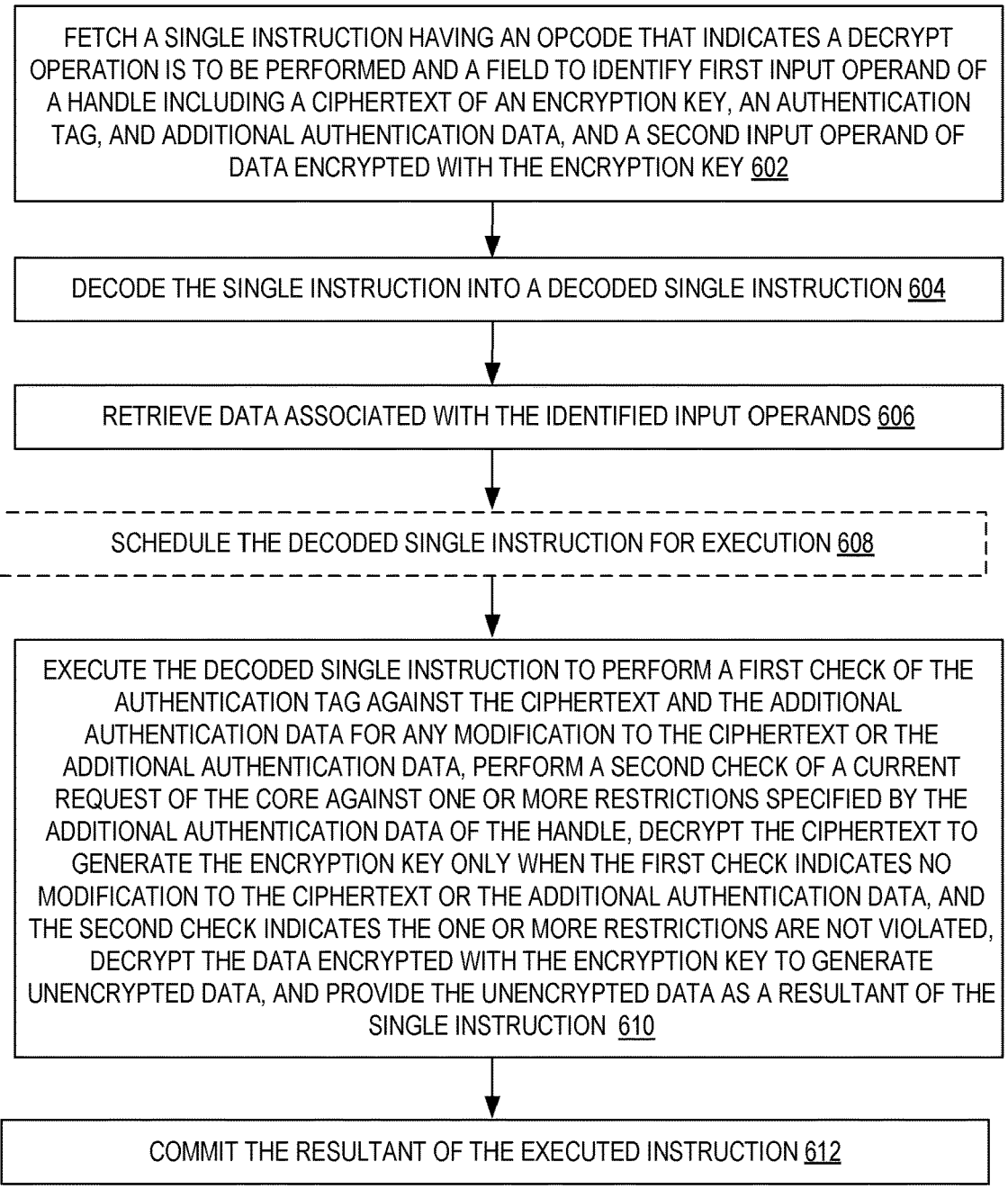
FIG. 6 illustrates a method of processing a decryption instruction utilizing a handle according to embodiments of the disclosure.

FIG. 6 illustrates a method 600 of processing a decryption instruction utilizing a handle according to embodiments of the disclosure. Depicted method 600 includes to fetch a single instruction having an opcode that indicates a decrypt operation is to be performed and a field to identify first input operand of a handle including a ciphertext of an encryption key, an authentication tag, and additional authentication data, and a second input operand of data encrypted with the encryption key 602, decode the single instruction into a decoded single instruction 604, retrieve data associated with the identified input operands 606, (optionally) schedule the decoded single instruction for execution 608, execute the decoded single instruction to perform a first check of the authentication tag against the ciphertext and the additional authentication data for any modification to the ciphertext or the additional authentication data, perform a second check of a current request of the core against one or more restrictions specified by the additional authentication data of the handle, decrypt the ciphertext to generate the encryption key only when the first check indicates no modification to the ciphertext or the additional authentication data, and the second check indicates the one or more restrictions are not violated, decrypt the data encrypted with the encryption key to generate unencrypted data, and provide the unencrypted data as a resultant of the single instruction 610, and commit the resultant of the executed instruction 612.

Certain embodiments herein are directed to an instruction that is passed in the input data (including the original data) and specified restrictions and creates a handle. In one embodiment, the original data is an encryption key. In one embodiment, the original data is an AES-128 or AES-256 encryption key. In one embodiment, the metadata (e.g., additional authentication data) is encrypted as well. In one embodiment, the metadata is not encrypted but is in the clear (but still integrity protected). In one embodiment, the original data is a key that is used for signed hashing. In one embodiment, the restriction(s) limit usage of the handle (e.g., and the original data encrypted/integrity protected within the handle) to: encrypt (e.g., specific to the data being a key), decrypt (e.g., specific to the data being a key), to ring 0 (OS/kernel), and/or a specific process. In one embodiment, the restriction(s) limit usage of the handle when a specific piece of OS controlled state is set in a specific way. In one embodiment, a mask is utilized so usage of the handle is allowed only when the specified portion of the OS controlled state is set in a specific way. In one embodiment, the restriction(s) limit usage of the handle (e.g., prevent usage of the handle) outside a specific trusted execution environment, such as, but not limited to, a specific Software Guard extension (SGX) enclave, a specific trust domain (TD) (e.g., TDX guest), or system management mode (SMM). In one embodiment, the restriction(s) limit usage of the handle when a specific piece of application-controlled state is not set in the specified way, for example, to limit sub-process (e.g., only when in a specific protection key, or to use a handle for a specific bank's database accesses only when processing data for that specific bank). In one embodiment, the restriction(s) limit usage of the handle outside a virtual machine monitor. In one embodiment, the restriction(s) limit usage of the handle to a specific instruction pointer. In one embodiment, the restriction(s) limit usage of the handle when a revocation field indicates it has been revoked. In one embodiment, multiple restrictions are combined (e.g., encrypt only and only within a specific process).

Exemplary architectures, systems, etc. that the above may be used in are detailed below.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
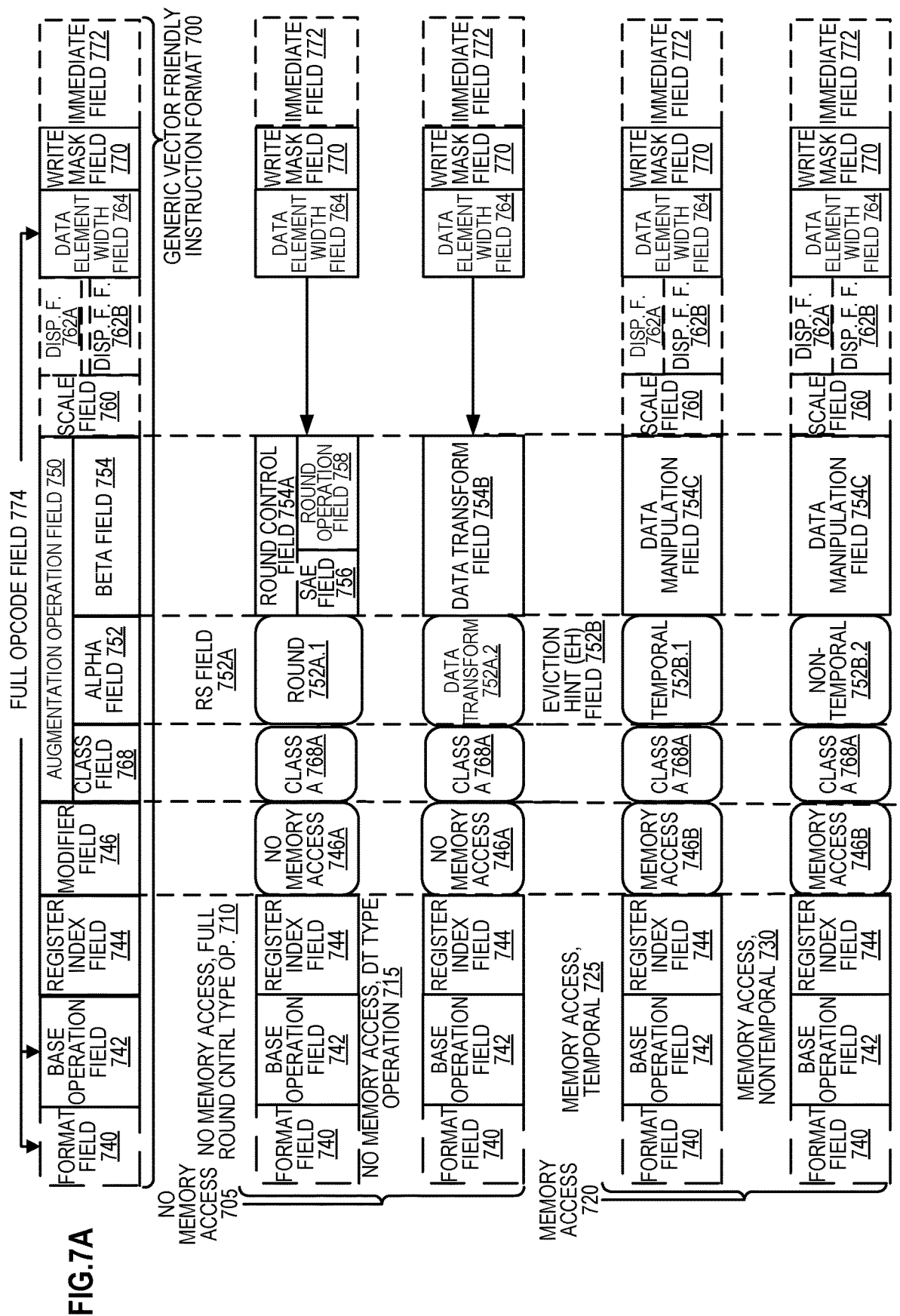
FIG. 7A is a block diagram illustrating a generic vector friendly instruction format and class A instruction templates thereof according to embodiments of the disclosure.
Figure 7B:
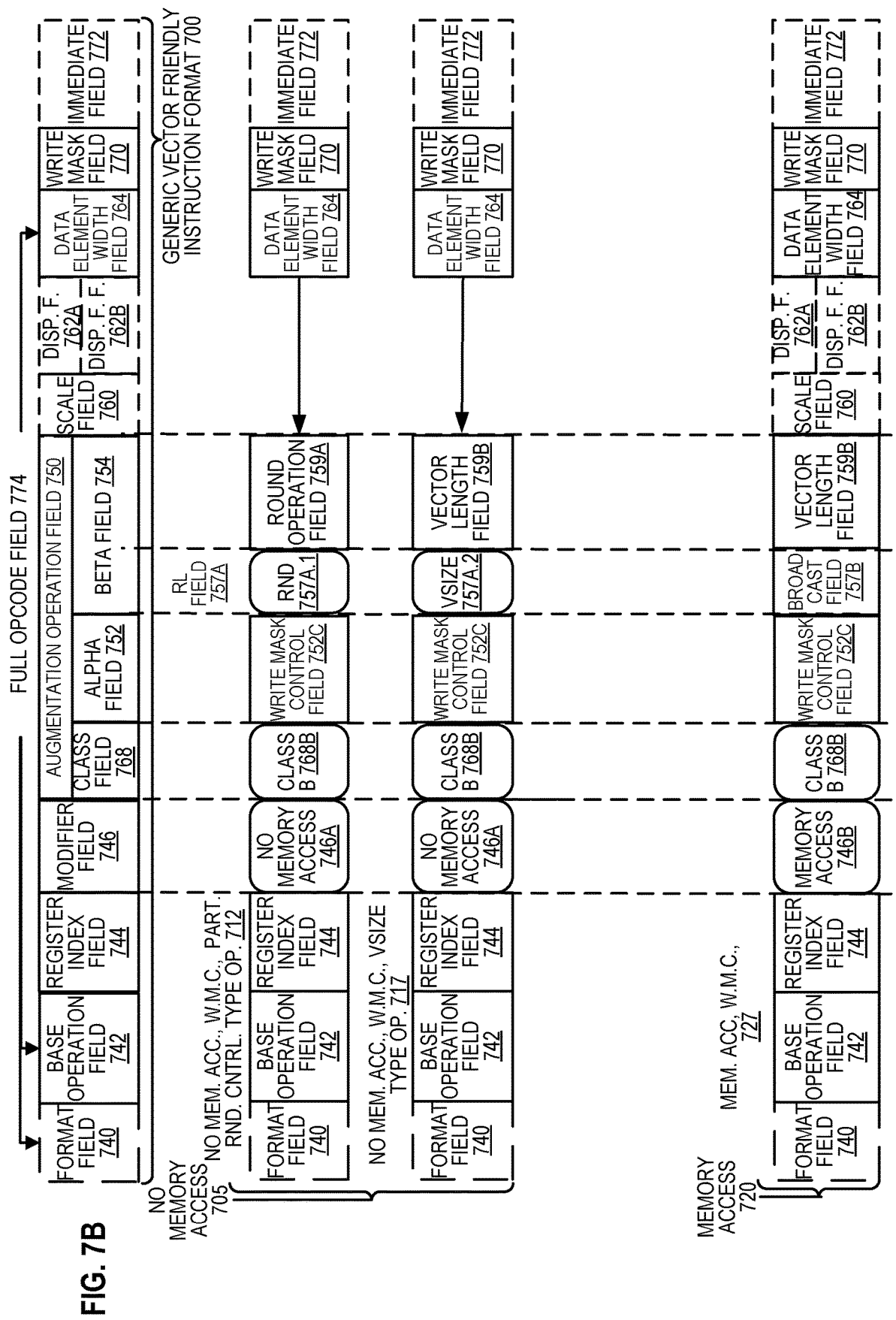
FIG. 7B is a block diagram illustrating the generic vector friendly instruction format and class B instruction templates thereof according to embodiments of the disclosure.

FIGS. 7A-7B are block diagrams illustrating a generic vector friendly instruction format and instruction templates thereof according to embodiments of the disclosure. FIG. 7A is a block diagram illustrating a generic vector friendly instruction format and class A instruction templates thereof according to embodiments of the disclosure, while FIG. 7B is a block diagram illustrating the generic vector friendly instruction format and class B instruction templates thereof according to embodiments of the disclosure. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740— a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742— its content distinguishes different base operations.

Register index field 744— its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the disclosure, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*\text{index}+\text{base}$).

Displacement Field 762A—its content is used as part of memory address generation (e.g., for address generation that uses $2^{scale}*\text{index}+\text{base}+\text{displacement}$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the disclosure are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the disclosure the round control field 754A includes a suppress all floating-point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating-point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the disclosure where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating-point exception handler).

Round operation control field 759A —just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the disclosure where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to embodiments of the disclosure. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the disclosure are described with reference to the specific vector friendly instruction format 800 in the context of the generic vector friendly instruction format 700 for illustrative purposes, the disclosure is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one-bit field in the specific vector friendly instruction format 800, the disclosure is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the disclosure).

The second-fourth bytes (EVEX Bytes 1-3) include a number of bit fields providing specific capability.

REX field 805 (EVEX Byte 1, bits [7-5])—consists of an EVEX.R bit field (EVEX Byte 1, bit [7]—R), EVEX.X bit field (EVEX byte 1, bit [6]-X), and 757BEX byte 1, bit[5]-B). The EVEX.R, EVEX.X, and EVEX.B bit fields provide the same functionality as the corresponding VEX bit fields, and are encoded using is complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710 —this is the first part of the REX' field 710 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (0F, 0F 38, or 0F 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 111 lb. Thus, EVEX.vvvv field 820 encodes the 4 low-order bits of the first source register specifier stored in inverted (is complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 752 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]-SSS, also known as EVEX.$_{S2-0}$, EVEX.$_{S2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the disclosure. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the disclosure. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
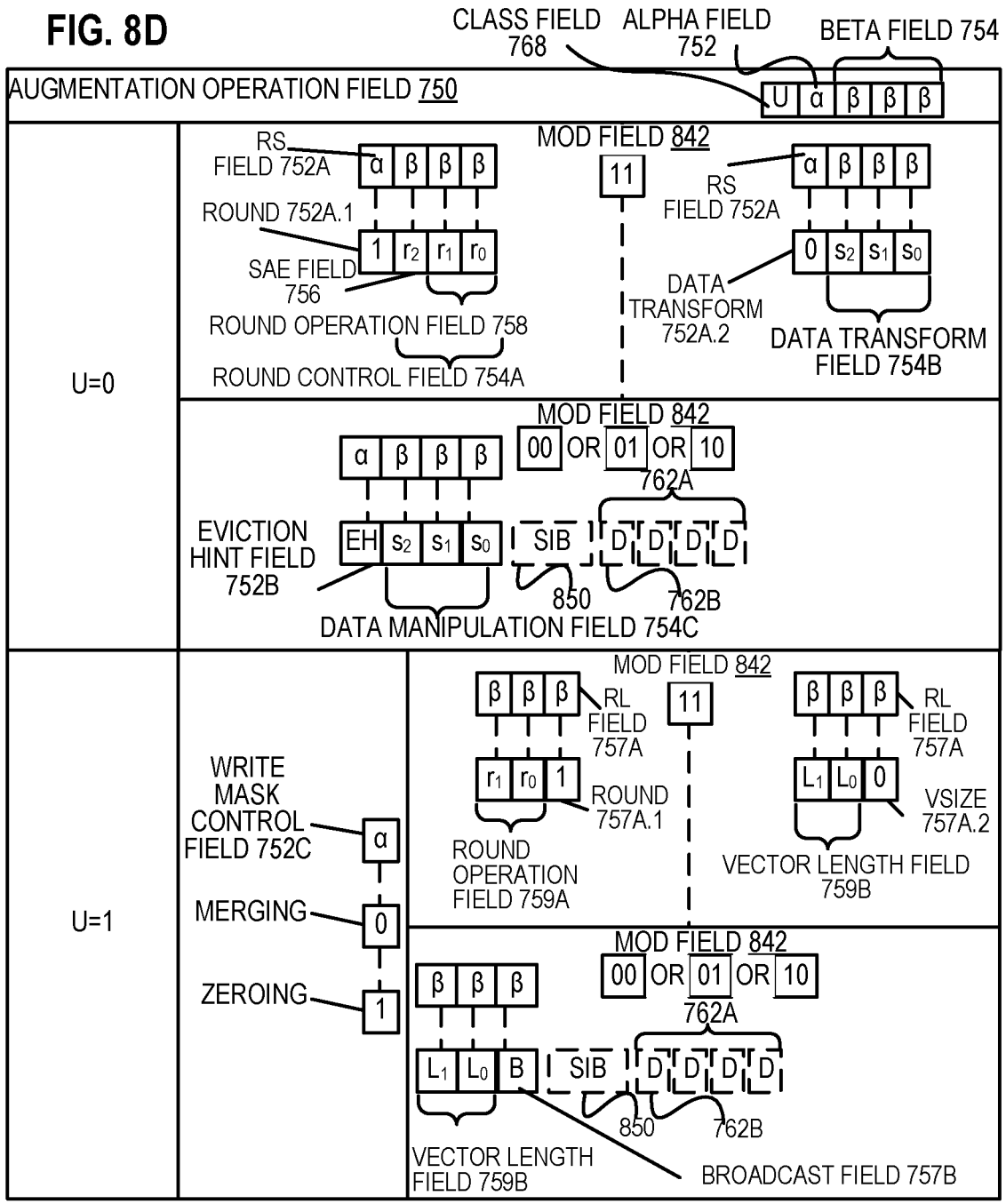
FIG. 8D is a block diagram illustrating the fields of the specific vector friendly instruction format in FIG. 8A that make up the augmentation operation field 750 according to one embodiment of the disclosure.

FIG. 8D is a block diagram illustrating the fields of the specific vector friendly instruction format 800 that make up the augmentation operation field 750 according to one embodiment of the disclosure. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one-bit SAE field 756 and a two-bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three-bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-$S_0$) is interpreted as the RL field 757A; when it contains a 1 (round 757A.1) the rest of the beta field 754 (EVEX byte 3, bit [6-5]-$S_{2-1}$) is interpreted as the round operation field 759A, while when the RL field 757A contains a 0 (VSIZE 757.A2) the rest of the beta field 754 (EVEX byte 3, bit [6-5]-$S_{2-1}$) is interpreted as the vector length field 759B (EVEX byte 3, bit [6-5]-$L_{1-0}$). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-$L_{1-0}$) and the broadcast field 757B (EVEX byte 3, bit [4]-B).

Exemplary Register Architecture

Figure 9:
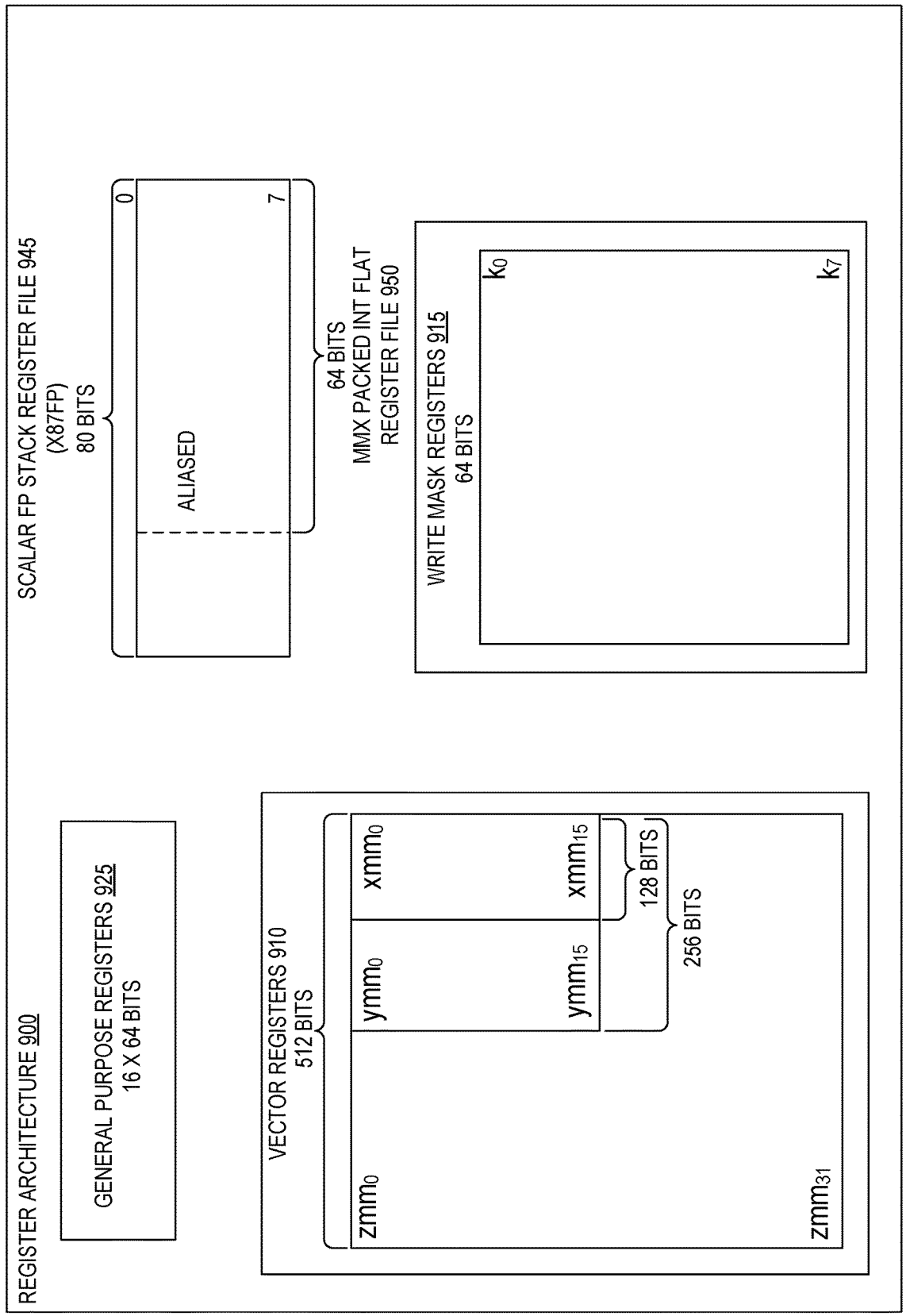
FIG. 9 is a block diagram of a register architecture according to one embodiment of the disclosure

FIG. 9 is a block diagram of a register architecture 900 according to one embodiment of the disclosure. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64-byte, 32-byte, or 16-byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 10A, 10B:
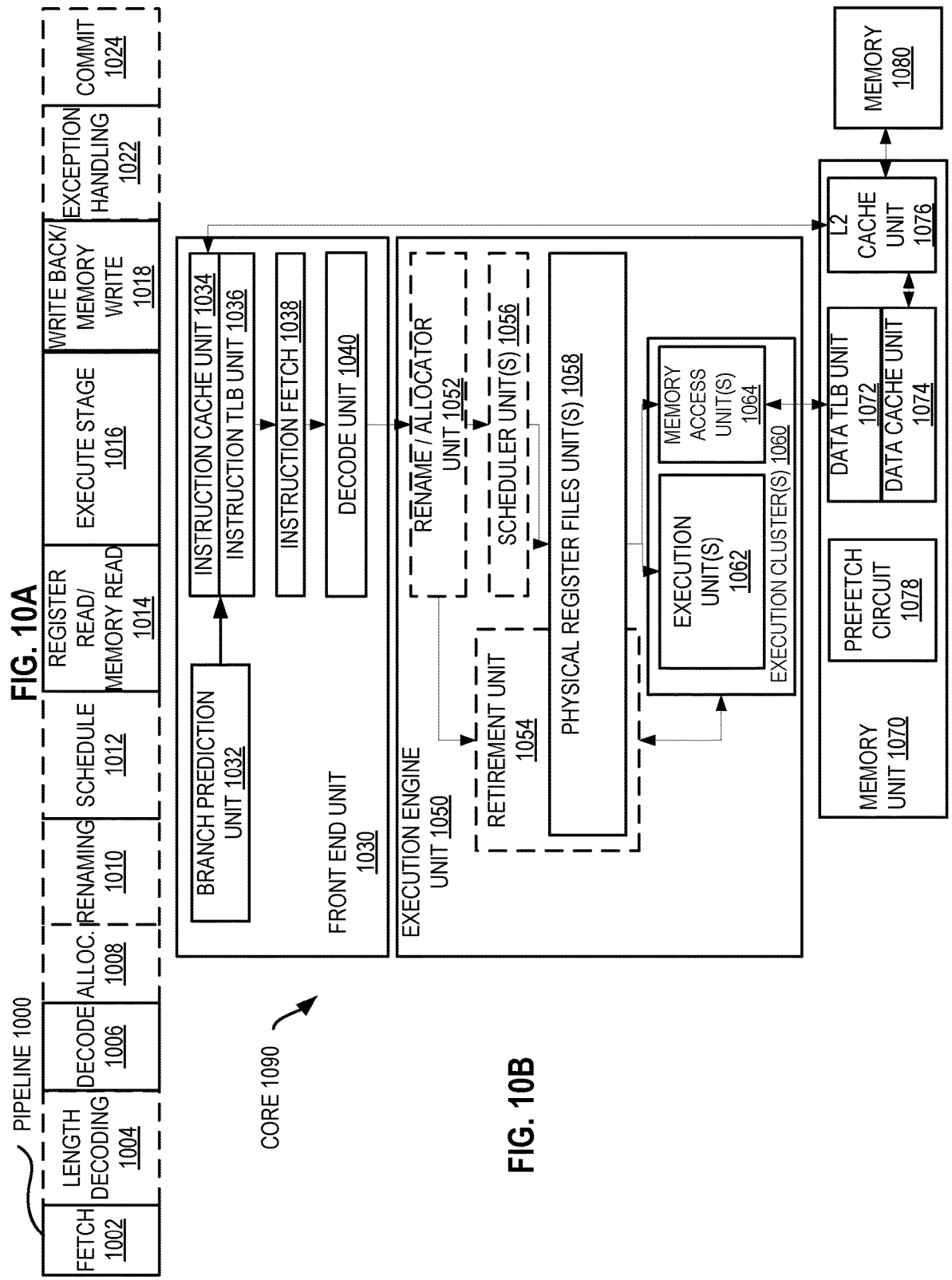
FIG. 10A is a block diagram illustrating both an exemplary in-order pipeline and an exemplary register renaming, out-of-order issue/execution pipeline according to embodiments of the disclosure.
FIG. 10B is a block diagram illustrating both an exemplary embodiment of an in-order architecture core and an exemplary register renaming, out-of-order issue/execution architecture core to be included in a processor according to embodiments of the disclosure.

FIG. 10A is a block diagram illustrating both an exemplary in-order pipeline and an exemplary register renaming, out-of-order issue/execution pipeline according to embodiments of the disclosure. FIG. 10B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front-end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1040 may be implemented using various mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macro-instructions (e.g., in decode unit 1040 or otherwise within the front-end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general-purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

In certain embodiments, a prefetch circuit 1078 is included to prefetch data, for example, to predict access addresses and bring the data for those addresses into a cache or caches (e.g., from memory 1080). In one embodiment, prefetch circuit 1078 is an instance of the prefetch circuit in FIG. 3B.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the disclosure. In one embodiment, an instruction decode unit 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the disclosure may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the disclosure. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
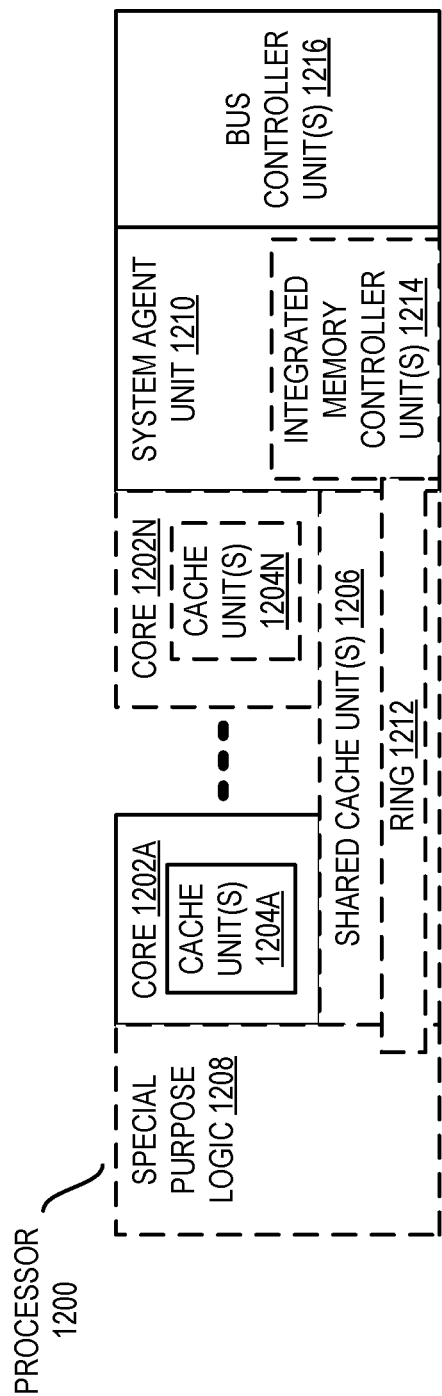
FIG. 12 is a block diagram of a processor that may have more than one core, may have an integrated memory controller, and may have integrated graphics according to embodiments of the disclosure.

FIG. 12 is a block diagram of a processor 1200 that may have more than one core, may have an integrated memory controller, and may have integrated graphics according to embodiments of the disclosure. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring-based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 13:
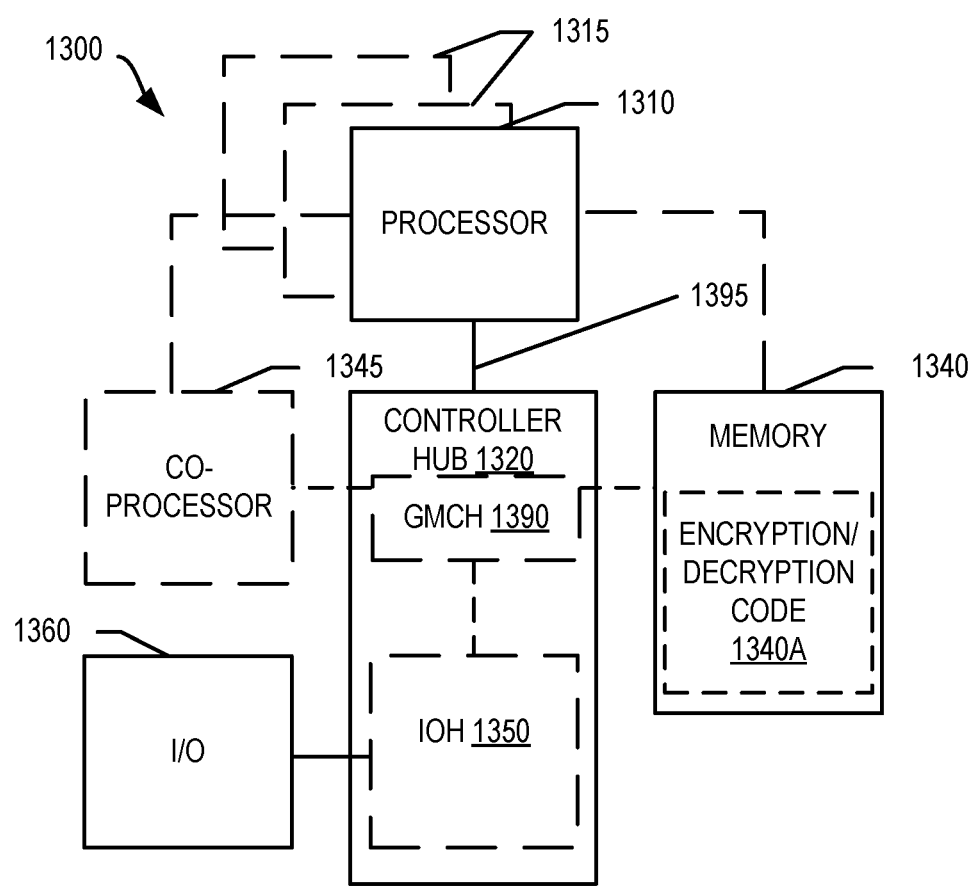
FIG. 13 is a block diagram of a system in accordance with one embodiment of the present disclosure.

Referring now to FIG. 13, shown is a block diagram of a system 1300 in accordance with one embodiment of the present disclosure. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350. Memory 1340 may include encryption/decryption code 1340A, for example, to store code that when executed causes a processor to perform any method of this disclosure.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random-access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as Quickpath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
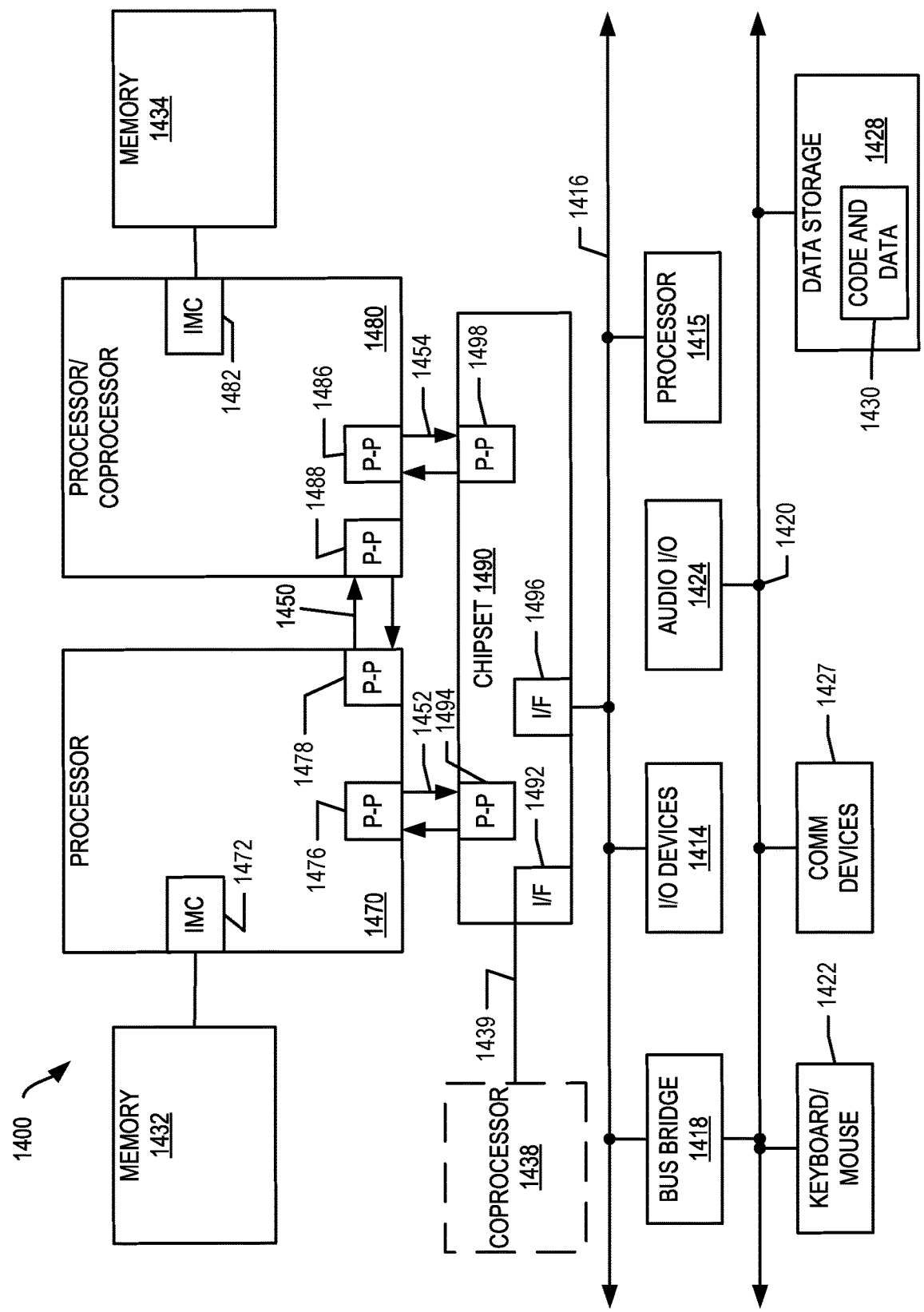
FIG. 14 is a block diagram of a more specific exemplary system in accordance with an embodiment of the present disclosure.

Referring now to FIG. 14, shown is a block diagram of a first more specific exemplary system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the disclosure, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
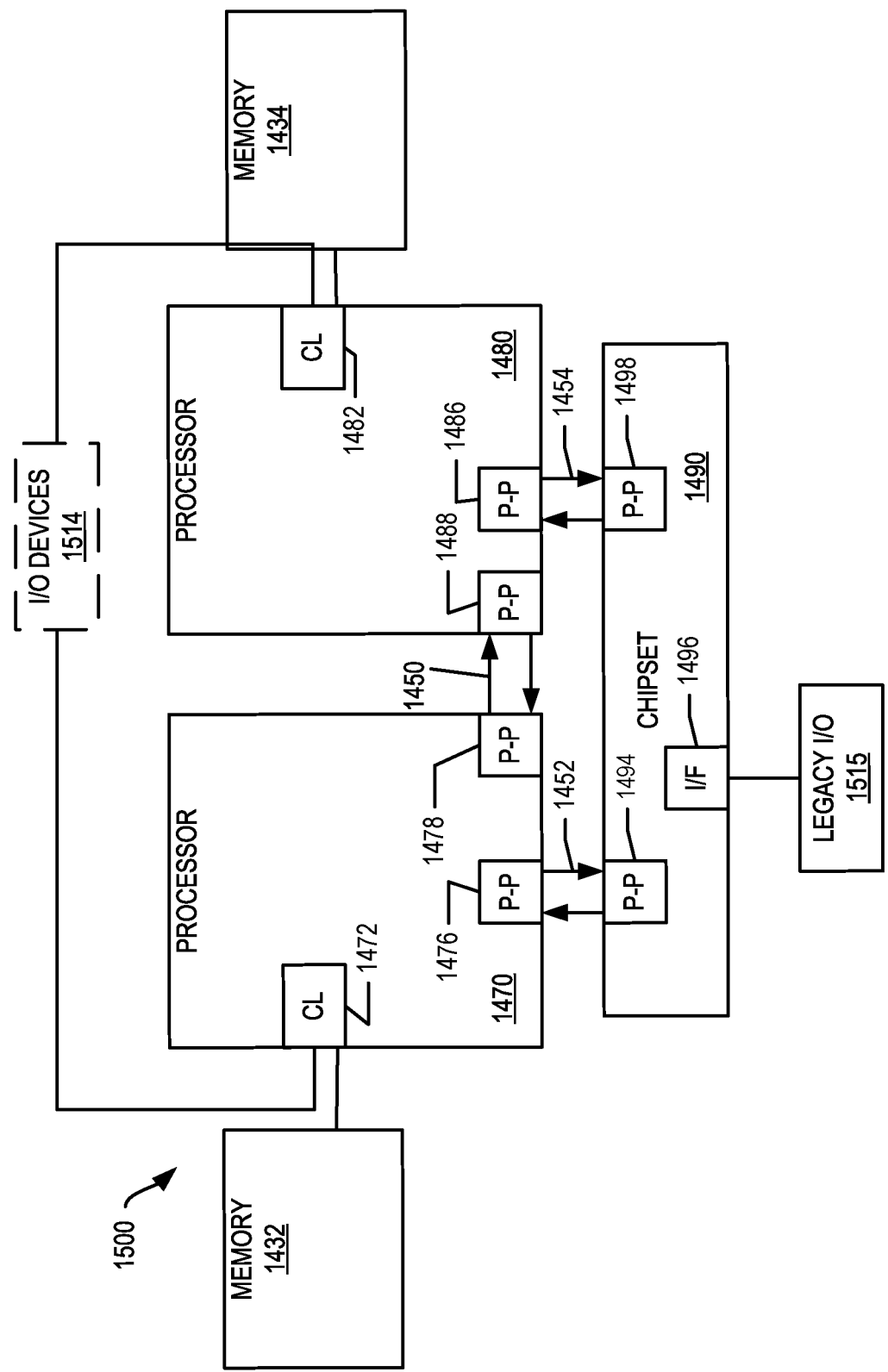
FIG. 15, shown is a block diagram of a second more specific exemplary system in accordance with an embodiment of the present disclosure.

Referring now to FIG. 15, shown is a block diagram of a second more specific exemplary system 1500 in accordance with an embodiment of the present disclosure. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
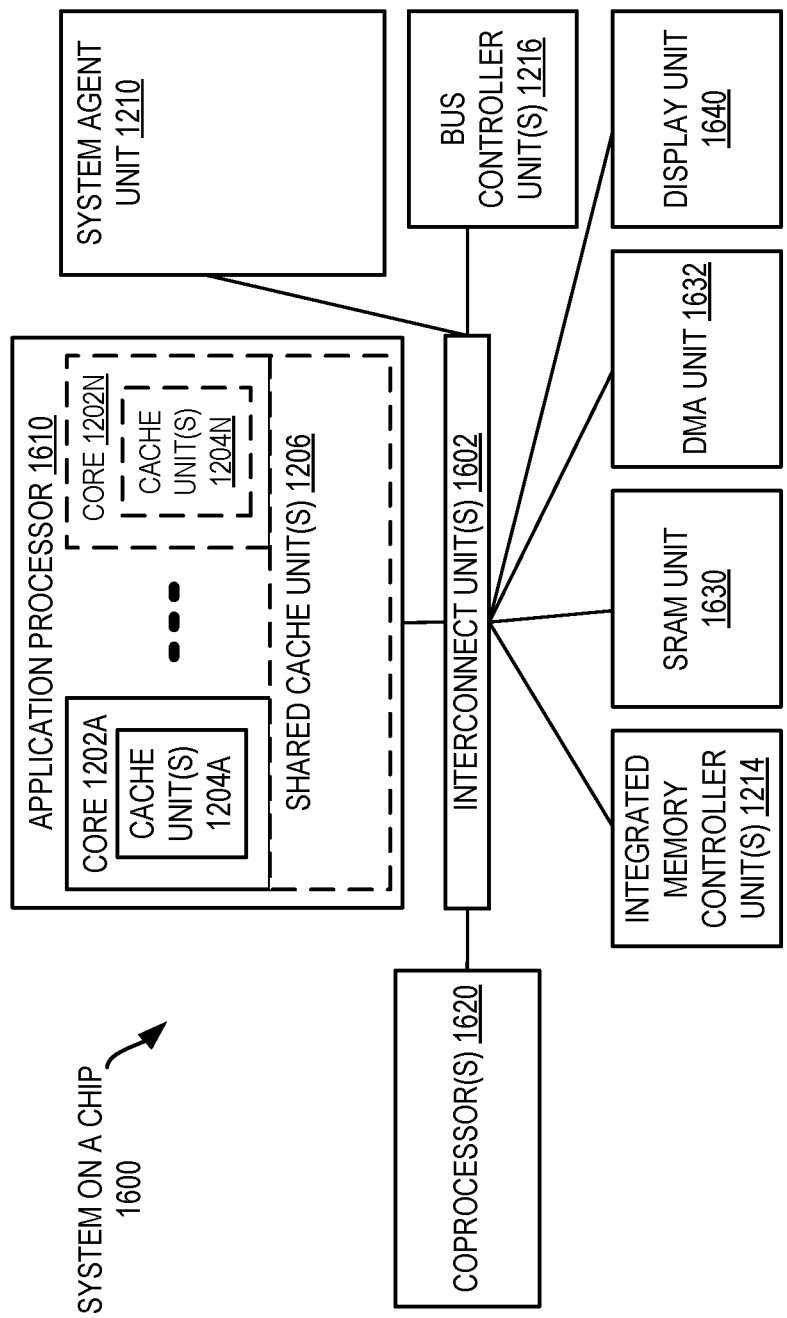
FIG. 16, shown is a block diagram of a system on a chip (SoC) in accordance with an embodiment of the present disclosure.

Referring now to FIG. 16, shown is a block diagram of a SoC 1600 in accordance with an embodiment of the present disclosure. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
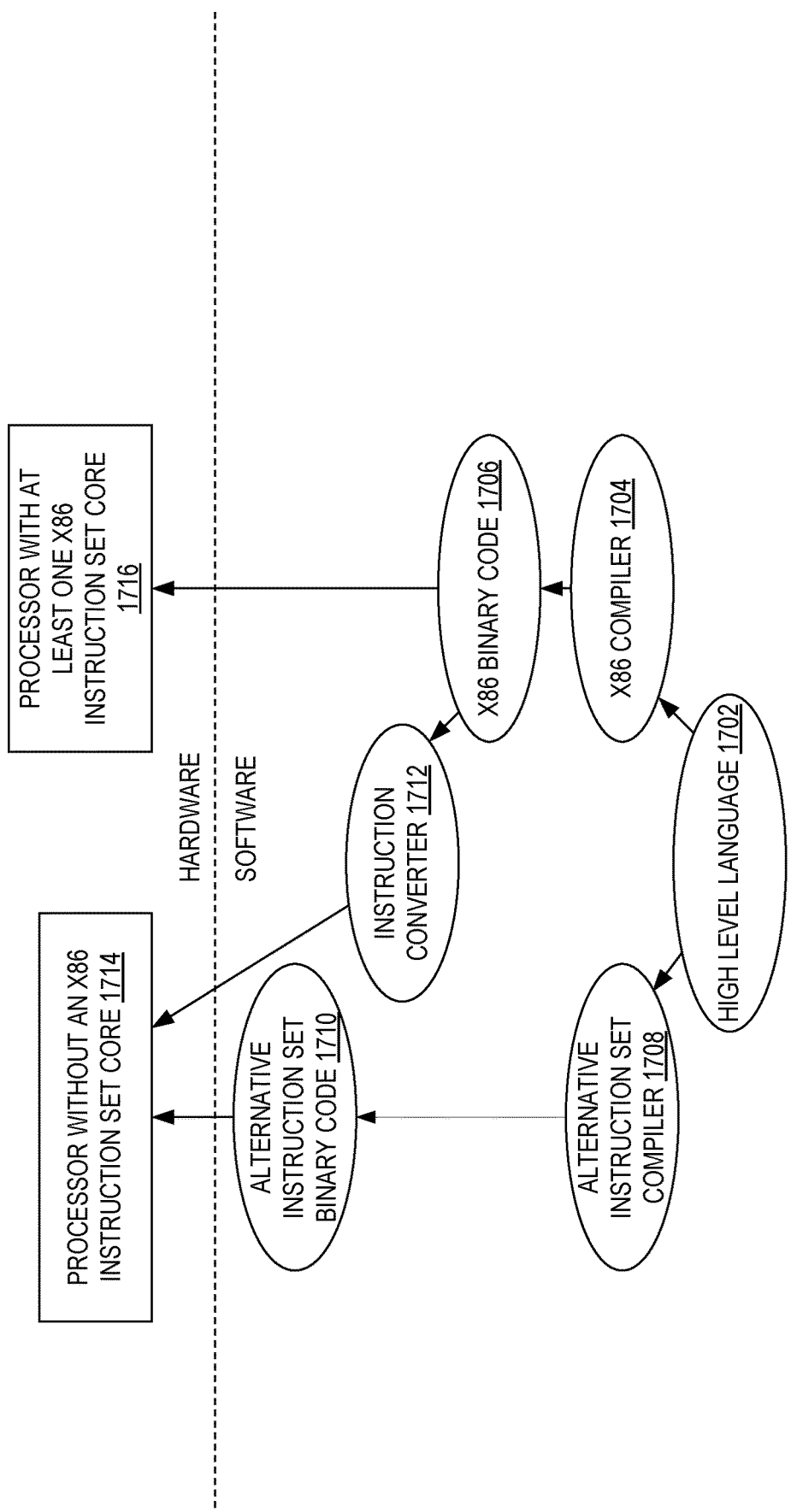
FIG. 17 is a block diagram contrasting the use of a software instruction converter to convert binary instructions in a source instruction set to binary instructions in a target instruction set according to embodiments of the disclosure.

FIG. 17 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 17 shows a program in a high-level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation, or any other process, allows a processor or other electronic device that does not have an x86 instruction set processor or core to execute the x86 binary code 1706.

Further Description of Embodiments

Further description of embodiments described above and/or other embodiments is provided below. In these descriptions, as in the descriptions above, details such as names of architectures, features, instructions, operations, registers, implementations, etc. (e.g., Key Locker) may be used without limitation, for example, they may be included in descriptions of embodiments without limiting other details of those descriptions to those embodiments, and/or without limiting details of a description using a first name (e.g., ENCODEKEY128, ENCODEKEY256) and details of a description using a second name (e.g., KEYTRANSFORM) to different embodiments.

Embodiments for Protecting Encryption Keys

Systems and methods for protecting symmetric encryption keys when performing host-based encryption are described. In one embodiment, a computer-implemented method includes retrieving at least one real key from a secure area and executing, with a processor, a key transform instruction to generate at least one transformed key based on receiving the at least one real key. The at least one transformed key is an encrypted version of at least one round key that is encrypted by the processor using the at least one real key. The processor is able to decrypt the at least one transformed key and encrypt the at least one round key. Data is encrypted at the moment it is created for host-based encryption.

Embodiments of the invention may mitigate many hardware and software attack scenarios that steal the underlying keys. The design for symmetric key protection proposes enhancements for protection of symmetric keys. For example, the design includes enhancements to the AES-NI implementation that enables AES-NI to be used for efficient implementations of the AES algorithm with the added benefit that the underlying keys would not be exposed in memory and therefore mitigate some of the risks in using AES-NI in lieu of a dedicated hardware crypto accelerator. It should be noted that the proposed enhancements to AES-NI is an example implementation of the present design and that it would have a similar capability on any set of instructions that implement symmetric cryptographic operations (or portions of cryptographic operations such as rounds).

In order to mitigate loss of keying material when software vulnerabilities exist, the present design includes a method that uses an encrypted form of the AES round keys that are passed to the AESNI instructions instead of the true round keys. These round keys are encrypted by the CPU using either a session key that is randomly derived at power initialization or a unique key to each CPU (or system on chip (SOC)) that is derived and persisted internally through a derived key based on fusing. The derived key for each CPU/SOC may also be derived using a combination of fuses, hidden keys in the register transfer language (RTL), and possibly physical unclonable functions.

Potential implementations are described below and any one or any combination of more than one may implemented on a platform.

Figure 18:
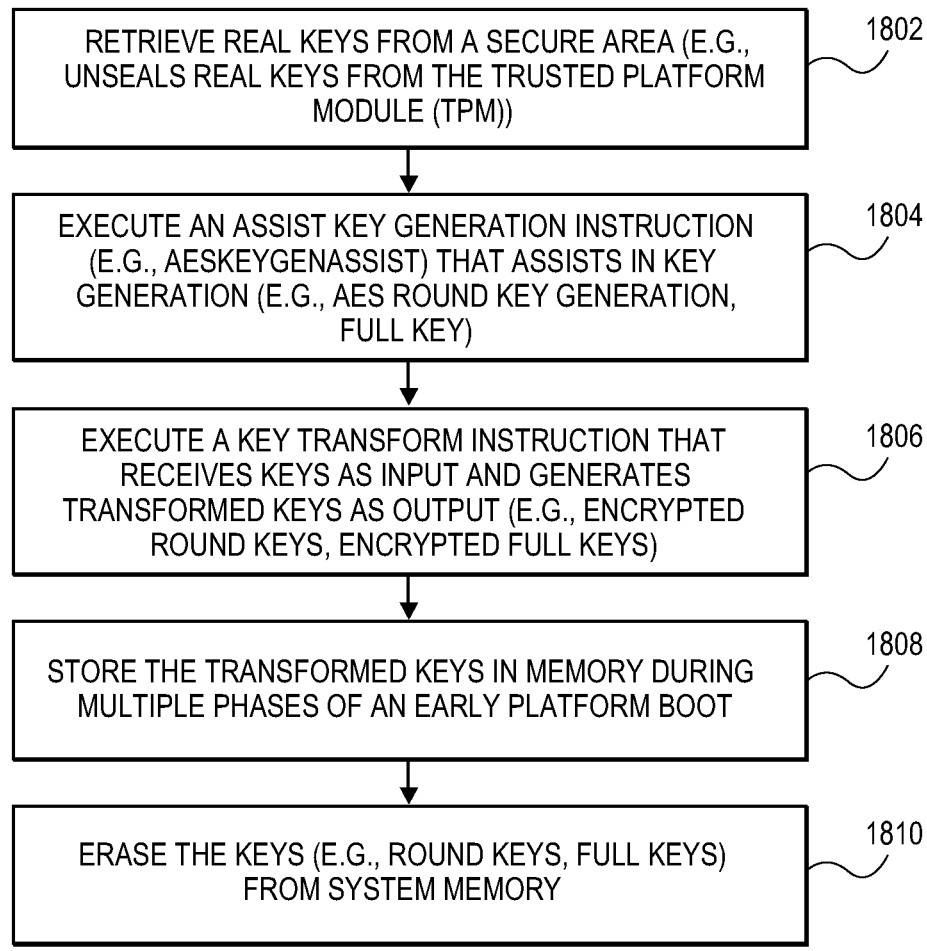
FIG. 18 is a flow diagram a computer-implemented method of protecting symmetric encryption keys when performing host-based encryption in accordance with one embodiment.

FIG. 18 illustrates a flow diagram of one embodiment for a computer-implemented method of protecting symmetric encryption keys when performing host-based encryption in accordance with one embodiment. The method is performed by processing logic that may comprise hardware (circuitry, dedicated logic, etc.), software (such as is run on a general-purpose computer system or a dedicated machine or a device), or a combination of both. In one embodiment, the method is performed by processing logic associated with the host-based platform discussed herein.

At block 1802, the processing logic retrieves real keys from a secure area (e.g., unseals real keys from the trusted platform module (TPM)). At block 1804, the processing logic executes an assist key generation instruction (e.g., AESKEYGENASSIST) that assists in key generation (e.g., AES round key generation, full key). At block 1806, the processing logic executes a key transform instruction that receives keys as input and generates transformed keys as output (e.g., encrypted round keys, encrypted full keys). At block 1808, the transformed keys are stored in memory during multiple phases of an early platform boot. The transformed keys are only valid for the current boot cycle and platform. At block 1810, the keys (e.g., round keys, full keys) are erased from system memory.

As a host platform boots from reset, the number of code paths increase and accumulate the code base of the operating system, device drivers, and other large quantities of code that contain potential current or future vulnerabilities. Therefore, the probability that the system is vulnerable to exploitation grows as a function of T, where T is equal to an amount of software code executed and correlates with an amount of time after reset. If critical keys can be transformed into a form that is only useable on the platform CPU core(s) for this particular boot, then loss of the transformed keys does not reveal the untransformed key and the stolen transformed keys are worthless after the next reboot even if stolen by an attacker. This only applies if a random number is used to encrypt those keys instead of using a key that is randomly generated at manufacture and fused or permanently configured into the CPU, which will be the same each boot.

Figure 19:
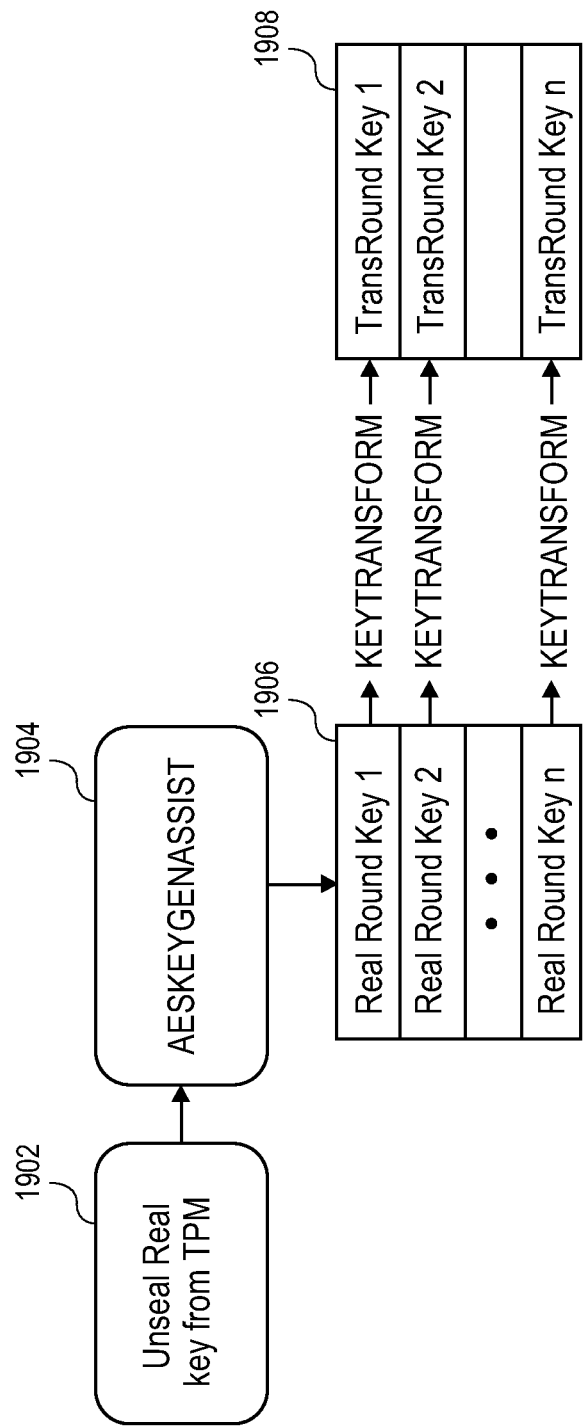
FIG. 19 is a block diagram that shows a mechanism to create transformed keys in accordance with one embodiment.

FIG. 19 illustrates a block diagram that shows a mechanism to create the transformed keys in accordance with one embodiment. The mechanism includes unsealing a real key from the TPM at block 1902, executing an assist key generation instruction (e.g., AESKEYGENASSIST) that assists in AES key generation (e.g., AES round key generation), and introducing a new instruction (e.g., KEYTRANSFORM) that will take as input a true round key (e.g., real round key 1, 2, etc.) of block 1906 and store to a memory location 1908 an encrypted version of the key (e.g., TransRound key 1, TransRound key 2, etc.). The actual key used to do the encryption is only available to the CPU and is not extractable. This enables encrypted keys to be placed in memory during multiple phases of early boot including boot-loader execution or early stages of the OS boot process. The encrypted keys are only valid for the current boot cycle and platform. In another embodiment, a single key is given for encryption and after a number of rounds the CPU automatically builds up the round keys and stores them.

It is assumed that the true keys are sealed in IP and the IP will only release them during these early stages of the boot process such as through sealing to platform configured registers on the platform's trusted platform module (TPM). The TPM offers facilities for the secure generation of cryptographic keys, and limitation of their use, in addition to a hardware pseudo-random number generator. It also includes capabilities such as remote attestation and sealed storage. In one embodiment, round keys are transformed instead of the full native AES keys because the round keys are fixed 128-bit keys and independent of AES key size and mode requirements. In an embodiment, the full keys are transformed by the new instruction. Once the key transform instruction executes to store the encrypted form of the key in memory, the true round key should be erased from system memory. The "keytransform" instruction can operate at any privilege level although it will generally be most useful at CPL0.

The encrypted round key may be stored in an internal table. An instruction can be designed to more easily look up the encrypted round key in the internal table (e.g., having the round number passed in and using the round number to look up in the table).

In an embodiment, the CPU has limited storage for the encrypted keys and software specifies an index of which key that it is desired to use. One advantage of the index is that because there is no cache (i.e., either hit in the table or it doesn't work), the design may include internal performance optimization mechanisms like only allowing the lookup of the decrypted round key if the linear address of the instruction requesting the decryption matches what was logged before. In this case, the encrypt instruction would read "store my round key X into entry 3 of the table."

An alternative implementation could be created where the internal encryption key is persisted in the CPU. This has the benefit that keys can be bound to the platform by any application and do not need to rely on early boot code. When applications are initially installed, the applications would generate transformed keys for the platform and then the true keys would not be needed again. This approach provides protection against the keys being usable on another platform but does not prevent stolen transformed keys from being used by a rogue alternate malware software stack.

Figure 20:
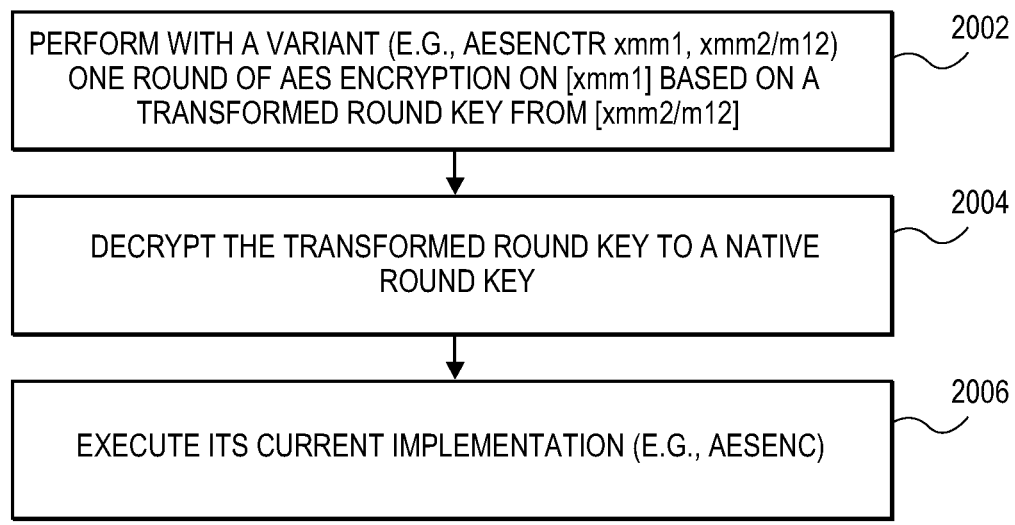
FIG. 20 is a flow diagram of a computer-implemented method for encryption using symmetric encryption keys in accordance with one embodiment.

FIG. 20 illustrates a flow diagram of one embodiment for a computer-implemented method for encryption using symmetric encryption keys in accordance with one embodiment. The method is performed by processing logic that may comprise hardware (circuitry, dedicated logic, CPU, etc.), software (such as is run on a general-purpose computer system or a dedicated machine or a device), or a combination of both. In one embodiment, the method is performed by a CPU.

In one embodiment, in order to use a transformed round key a new variant of the four AES-NI instructions (e.g., AESENC, AESENCLAST, AESDEC, and AESDELAST) would be implemented. The new instructions may be called AESENCTR, AESENCLASTTR, AESDECTR, and AESDELASTTR. Each of these variants would operate identically to their current implementation except that these variants would accept a transformed round key in lieu of a native round key. For example, at block 2002, the processing logic with the variant (AESENCTR xmm1, xmm2/m12) performs one round of AES encryption on [xmm1] based on a transformed round key from [xmm2/m12]. Internally, the processing logic (e.g., CPU) decrypts the transformed round key to a native round key at block 2004 and then executes its current implementation (e.g., AESENC) at block 2006.

When AES is used to encrypt or decrypt a block of data, it will iterate through the roundkeys for every 16-byte block. The set of round keys for the entire block remain unchanged throughout the encryption or decryption operation. This property enables aggressive internal caching of a mapping that maps transformed round keys to its corresponding real round key. Decryption of the transformed round key only needs to occur on a cache miss. As an example, assume that the design needs to perform an AES-256 encryption operation, which requires 14 round keys, on a 4K block of data. In an embodiment, a round key transform cache can accommodate all 14 keys and only one AES operation using the transform paradigm is running at a time. As a baseline, a normal AES-NI encryption requires 256*14=3484 calls to AESENC (e.g., 4K/16B=256 and 14 rounds for 256-bit AES). In comparison, if it is assumed that the micro architecture implementation uses AESDEC to decrypt the round key on a cache miss, then there would be an additional 140 calls to AESDEC. Each 128-bit round key is encrypted with AES-128 which requires 10 rounds, so 14*10=140 for a total of 3724 AESENC/AESDEC calls which is roughly a 7% overhead (plus transform cache lookup overhead) on the first block processed. It should be noted that all subsequent 4K blocks in the data set will not incur a cache miss and will return to the initial 3484 calls. Thus, the overhead only includes the transform key cache lookup.

In another embodiment, a table or other structure is used instead of a cache. The CPU may want to store the round keys generated from the random number/fuses that it uses in the beginning and not store the actual random number/fuses. Having those hardware-based round keys speeds up significantly when an encrypt or decrypt of a software-specified round key is needed. If the hardware-based round keys are not present, then the original random number or fuses are not needed. The random number may be combined with something else (e.g., fuses or hidden values on the CPU) just in case someone is able to perturb the random number. In a similar manner, the fuses may be combined with something else.

Currently, symmetric encryption can occur either in an accelerator (or IP block) in which case the key can be protected. In current software approaches, which may be better suited for certain workloads, the key protection properties do not exist from the attacks described herein.

In current software or AES-NI implementations of an encryption or decryption algorithm, security vulnerabilities in the operating system or application enable the attacker to steal both the encryption keys and the clear-text data. There is substantial value in providing enhanced protection of the keys even if encrypted data is compromised or stolen during an incident as described below. This enhanced protection minimizes the implication of vulnerability when exploitation is unknown. One of the challenges with an identified vulnerability in an operating system is that it is not always clear whether an exploit has occurred. When organizations identify that a vulnerability exists, then corrective action can be taken such as deploying a software patch to prevent the vulnerability from being exploited. One issue associated with an unknown exploitation is that an organization does not necessarily know which platforms (if any) the exploit has been used by a malicious attacker. Operating system vulnerabilities can provide access to memory where symmetric keys are stored in current software implementations in addition to the ability to use the decryption implementation to access data. Thus, the organization would need to change encryption keys on all platforms impacted as well as re-encrypt all the data on every device that the vulnerability was present on if the organization wanted to ensure that an attacker could not use keys that may have been stolen. If keys were stolen, the keys not only would be useful in accessing data that was present at the time of the vulnerability, but future data that would be encrypted with the same key. If the encryption capability is implemented in a manner such that merely the decryption implementation is vulnerable during the period of vulnerability, but the keys are protected, then the systems can be patched without revocation of keys and without the need to re-encrypt all the current data. This is a massive benefit when common software is applied to large sets of devices such as PC clients, phones, tablets, and consumer electronics devices because an OS vulnerability will impact very large populations of users and protection of the underlying symmetric keys will greatly reduce cost and effort in returning platforms to a known secure state.

There is substantial value in providing enhanced protection of the keys because decryption can be moved to another platform or software stack. Obtaining the key enables the attacker to implement decryption in a secondary implementation outside of the compromised system and is not constrained to using the compromised implementation as the only means to monitor or force conversion of data from encrypted to plaintext. For example, consider the classic "Cold-Boot" attack. In this scenario, once the key is obtained, the attacker can reboot the machine to an OS and access/decrypt any data on the platform. If the vulnerability was a software exploit that allowed access to the decryption implementation, the attacker could monitor data conversion but would need to force any data that the attacker desired conversion on through the compromised implementation. This may be impractical in many scenarios when there is a vast amount of data, and it is unknown where the valuable data to be accessed is located. One scenario in which this can be demonstrated is when a system identifies an exploit at a point in time after boot. In a system where the exploit can steal the keys, there is an opportunity to go after the data at any point in the future. In a scenario where merely access to the encryption capability is compromised, the data loss will be limited to the quantity of data that can be passed through the compromised implementation between exploit and exploit detection.

There is substantial value in providing enhanced protection of the keys because symmetric key re-keying and revocation is expensive and often impractical. Symmetric keys used in AES are generally used as the lowest level of encryption to protect both data at rest (in storage) and in motion (being transferred) for every block of data that the key is protecting. Because the key is required for access to every block of data that it has every encrypted, revoking a compromised key is challenging because every block of data that has been encrypted needs to be accessible such that it can be re-encrypted with new keying material. This not only includes active data on the system being protected, but also any additional copies that may have been persisted in other mediums such as backup or offline storage. Theft of keys would enable attacks on all data that was ever encrypted with the keys including data that is no longer accessible on the device.

The present design provides the concept of creating an encrypted round key (or true key) that only the platform's application processor is able to transform to the real round (or true) key. The present design provides the use of encrypted platform bound/power up unique keys in host based software crypto operations, the interaction between key sealing mechanisms (such as a TPM) and early platform boot to move keys into a transformed state when the host has executed limited code to reduce the trusted code base and area of attack, and a mechanism to efficiently cache the transformed keys to make it such that minimal overhead is introduced by encrypting all of the round keys.

In one embodiment, a system includes a processor having access to at least one real key. Memory is coupled to the processor. The memory stores at least one transformed key, the processor is configured to execute a key transform instruction to generate at least one transformed key based on the at least one real key. The memory may include a cache to store a mapping to map transformed keys to corresponding round keys that are based on the at least one real key. The processor is further configured to decrypt the transformed keys if a cache miss occurs. The mapping stored in the cache introduces a limited overhead of a transform key cache lookup. In an embodiment, the memory has limited storage for the transformed keys and the processor executes instructions to specify an index for selecting a transformed key. The memory may include a table or other structure, rather than the cache, to store a mapping to map transformed keys to corresponding real keys.

In an alternative embodiment, the processor is configured to receive a single key and automatically generate round keys to be stored and accessed by the processor. The processor is configured to execute the key transform instruction to generate at least one transformed key in response to generating at least one round key.

In one embodiment, a processor includes a processing unit to retrieving at least one real key from a secure area and to generate at least one round key based on the at least one real key. Memory is coupled to the processing unit. The processing unit is configured to execute a key transform instruction to generate at least one transformed key based on the at least one round key. The cache stores the at least one round key and the at least one transformed key. The at least one transformed key is an encrypted version of the at least one round key that is encrypted by the processor unit using a session key that may be randomly derived at power initialization. The processing unit (and no other machine) is able to decrypt the at least one transformed key and encrypt the at least one round key. In another embodiment, the at least one transformed key is an encrypted version of the at least one round key that is encrypted by the processor unit using a unique key for the processing unit that is derived and persisted internally through a derived key. The derived key may be obtained by fusing.

Embodiments for Loading and Virtualizing Cryptographic Keys

Many techniques for using, transferring, and storing private or confidential information involve cryptographic keys. Therefore, the use of embodiments of the present invention may be desired to provide protection for cryptographic keys and mitigate the vulnerability to attack of information processing systems and devices.

Figure 21:
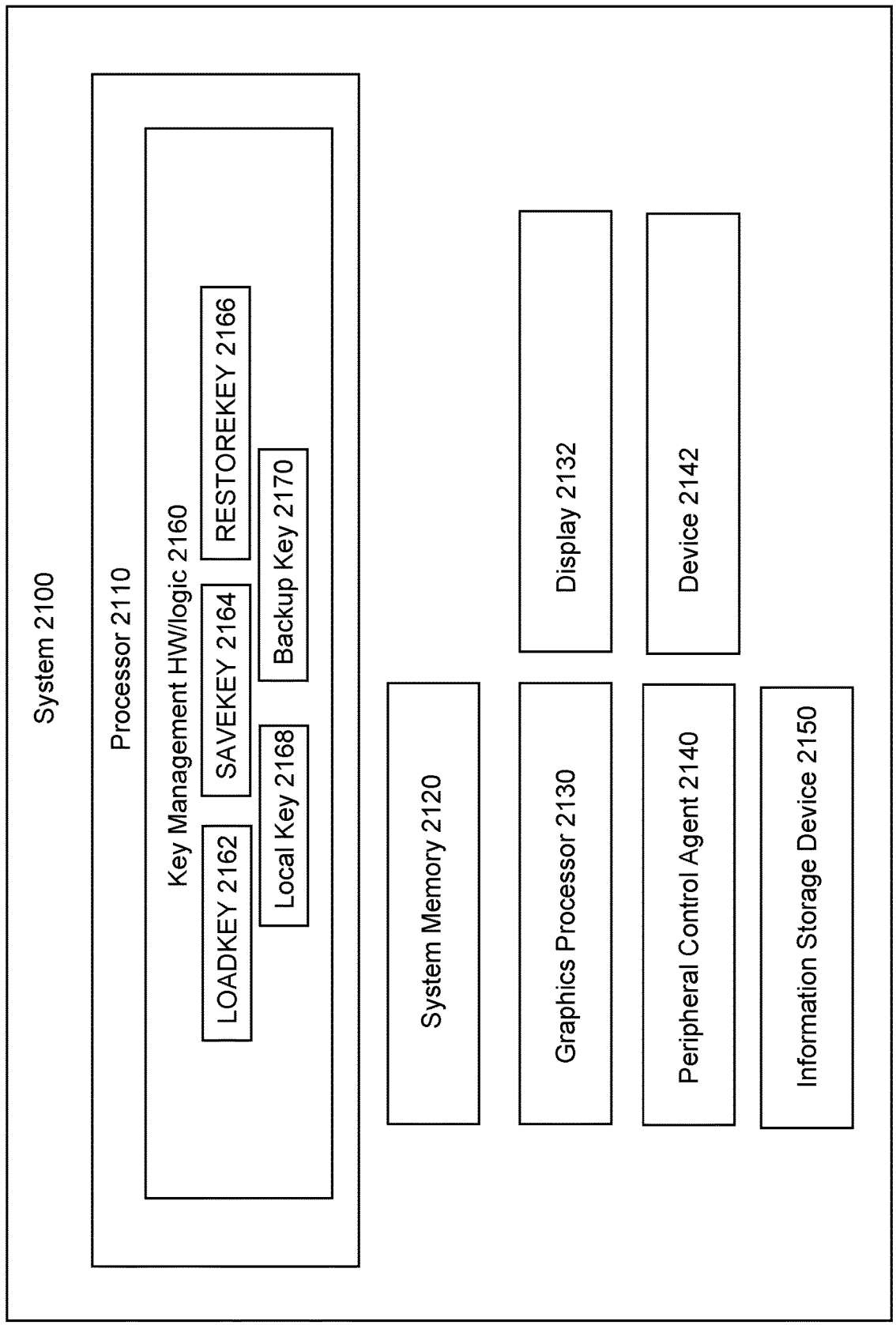
FIG. 21 illustrates an information processing system according to an embodiment of the present invention for loading and virtualizing cryptographic keys.

FIG. 21 illustrates system 2100, an information processing system including an embodiment of the present invention for loading and virtualizing cryptographic keys. System 2100 may represent any type of information processing system, such as a server, a desktop computer, a portable computer, a set-top box, a hand-held device such as a tablet or a smart phone, or an embedded control system. System 2100 includes processor 2110, system memory 2120, graphics processor 2130, peripheral control agent 2140, and information storage device 2150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 2100, whether shown in FIG. 21 or not shown in FIG. 21, may be integrated or otherwise included on or in a single chip (a system-on-a-chip or SOC), die, substrate, or package.

System memory 2120 may be dynamic random-access memory (DRAM) or any other type of medium readable by processor 2110. Graphics processor 2130 may include any processor or other component for processing graphics data for display 2132. Peripheral control agent 2140 may represent any component, such as a chipset component, including or through which peripheral, input/output (I/O), or other components or devices, such as device 2142 (e.g., a touchscreen, keyboard, microphone, speaker, other audio device, camera, video or other media device, network adapter, motion or other sensor, receiver for global positioning or other information, etc.) and/or information storage device 2150, may be connected or coupled to processor 2110. Information storage device 2150 may include any type of persistent or non-volatile memory or storage, such as a flash memory and/or a solid state, magnetic, or optical disk drive.

Processor 2110 may represent one or more processors or processor cores integrated on a single substrate or packaged within a single package, each of which may include multiple threads and/or multiple execution cores, in any combination. Each processor represented as or in processor 2110 may be any type of processor, including a general-purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 2110 may be architected and designed to operate according to any instruction set architecture, with or without being controlled by microcode.

Support for loading and virtualizing a cryptographic key according to an embodiment of the present invention may be implemented in a processor, such as processor 2110, using any combination of circuitry and/or logic embedded in hardware, microcode, firmware, and/or other structures arranged as described below or according to any other approach, and is represented in FIG. 21 as key management hardware and/or logic 2160, which may include load-key hardware/logic 2162 to support a LOADKEY operation, save-key hardware/logic 2164 to support a SAVEKEY operation, restore-key hardware/logic 2166 to support a RESTOREKEY instruction, local key register(s) 2168, and backup key register(s) 2170, each of which is described below.

Figure 22:
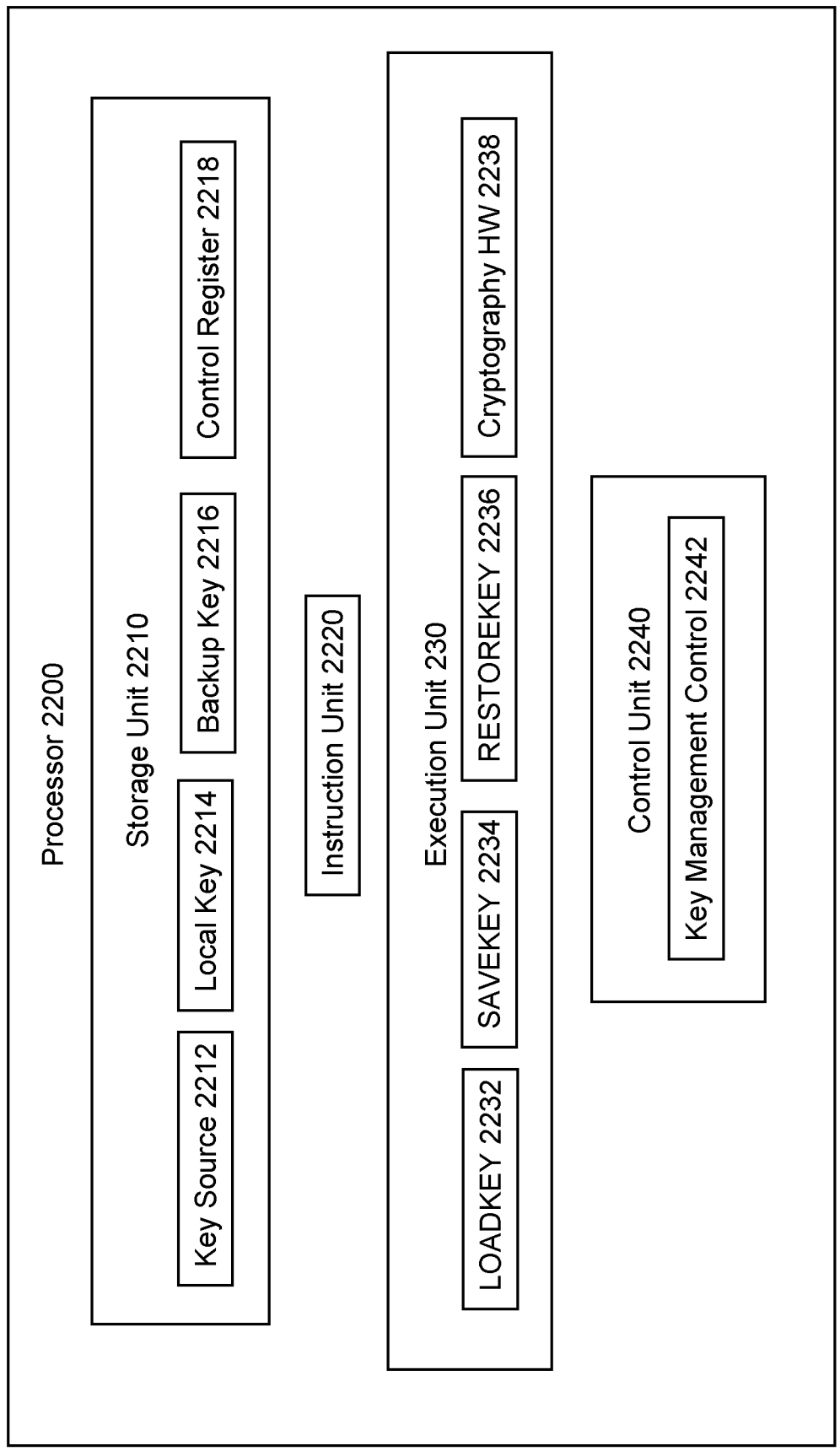
FIG. 22 illustrates a processor or an execution core of a multicore processor which may be in a system according to an embodiment as in FIG. 21.

FIG. 22 illustrates processor 2200, which may represent an embodiment of processor 2110 in FIG. 21 or an execution core of a multicore processor embodiment of processor 2110 in FIG. 21. Processor 2200 may include storage unit 2210, instruction unit 2220, execution unit 2230, and control unit 2240, where the circuitry, structure, and functionality of key management hardware/logic 2160 of FIG. 21 is distributed among each unit of processor 2200 as described below. Processor 2200 may also include any other circuitry, structures, or logic not shown in FIG. 21.

Storage unit 2210 may include any combination of any type of storage usable for any purpose within processor 2200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 2200, as well as circuitry usable to access such storage and/or to cause or support various operations and/or configurations associated with access to such storage.

Storage unit 2210 may include one or more key source registers 2212, local key registers 2214, and/or backup key registers 2216. Key source register 2212 may be a data register or other register or storage location of any size, from which a cryptographic key, a value to be used as a cryptographic key, a value from which a cryptographic key may be derived, or a portion of such a key or value may be loaded in a LOADKEY operation. Note that although key source register(s) 2212 may be readable by software, its content in connection with a LOADKEY operation may be protected by one or more known security techniques (e.g., by loading the content into it, performing the LOADKEY operation, then clearing it, all by or within a secure boot process, an authenticated code module, a secure or trusted execution environment, etc.).

Local key register 2214 may be a register or other storage location of any size, into which a cryptographic key or a value to be used as a cryptographic key may be loaded in a LOADKEY operation. Local key register 2214 may be protected by hardware such that its content may not be discovered or revealed. For example, access to local key register 2214 may be limited such that its content may be used by hardware within processor 2200 (e.g., used as a wrapping or other key by cryptographic hardware), but copied or moved only in connection with a SAVEKEY operation, according to embodiments of the present invention as described below, or in connection with other techniques that provide for its limited accessibility to be maintained (e.g., by a cryptographic security engine, other privileged hardware agent or entity, or firmware or software within a secure or trusted execution environment). In other words, local key register 2214 is inaccessible through the use of a read instruction or any other instruction with which software could make its content openly readable outside of processor 2200.

Backup key register 2216 may be a register or other storage location of any size, in which a cryptographic key or a value to be used as a cryptographic key may be stored. In an embodiment of the present invention, the content of backup key register 2216 may persist or be retained across power cycles, for example, during standby, sleep, suspend, hibernate, and/or other power management states. For example, backup key register 2216 may receive power from one or more pins or other electrical connectors on the package of processor 2200 when other circuitry in processor 2200, such as local key register 2214, may be powered down. Alternatively, backup key register 2216 may be implemented in non-volatile (e.g., flash) memory or storage on the same die or in the same package as processor 2200. Alternatively, backup key register 2216 may be implemented in volatile memory or storage on the same die or in the same package as processor 2200, but with a secure backup mechanism that allows its content to be securely (e.g., using encryption, authentication, integrity checking, and/or replay protection techniques) moved or copied to other storage that is non-volatile or powered at times when processor 2200 or portions of processor 2200 may be powered down. Various other embodiments may be possible within the scope of the present invention. Note that the use of any such technique to retain the content of backup key register 2216 across power cycles need not be dedicated to backup key register 2216; in other words, other information and/or processor state may also be retained using the same technique for the same purpose.

Backup key register 2216 may be protected by hardware such that its content may not be discovered or revealed. For example, access to backup key register 2216 may be limited such that its content may be copied or moved only in connection with a RESTOREKEY operation, according to embodiments of the present invention as described below, or in connection with other techniques that provide for its limited accessibility to be maintained (e.g., by a cryptographic security engine, other privileged hardware agent or entity, or firmware or software within a secure or trusted execution environment). In other words, backup key register 2216 is inaccessible through the use of a read instruction or any other instruction with which software could make its content openly readable outside of processor 2200.

Storage unit 2210 may also include control register 2218, which may represent one or more registers, other storage locations, or portions of registers or storage locations into which control and/or configuration information may be programmed. Control register 2218 may represent one or more control registers specified or defined according to an existing processor or instruction set architecture, one or more new control registers added to an existing processor or instruction set architecture, or one or more bits/fields in an existing or new register. In various embodiments, control register 2218 may include one or more bits to enable one or more features of the present invention. For example, control register 2218 may include a LOADKEY_ENABLE bit, a SAVEKEY_ENABLE bit, and/or a RESTOREKEY enable bit, each of which may be set to enable the use of a LOADKEY operation, a SAVEKEY operation, and/or a RESTOREKEY operation, respectively, and/or a combined enable bit which may be set to enable the use of two or more operations, where the attempted use of such an operation when the corresponding enable bit is not set causes an exception.

In various embodiments, control register 2218, a different control register, or a virtual machine control structure (VMCS) may include bits or fields to enable a SAVEKEY operation to occur automatically in connection with a virtual machine (VM) exit and/or enable the RESTOREKEY operation to occur automatically in connection with a VM entry, as further described below.

Instruction unit 2220 may include any circuitry, logic, structures, and/or other hardware, such as an instruction decoder, to fetch, receive, decode, interpret, schedule, and/or handle instructions to be executed by processor 2200. Any instruction format may be used within the scope of the present invention; for example, an instruction may include an opcode and one or more operands, where the opcode may be decoded into one or more micro-instructions or micro-operations for execution by execution unit 2230. Operands or other parameters may be associated with an instruction implicitly, directly, indirectly, or according to any other approach.

In an embodiment, instruction unit 2220 may receive a LOADKEY instruction, a SAVEKEY instruction, and/or a RESTOREKEY instruction, the execution of which by processor 2200 is described below. Note that the names of these instructions are provided merely for convenience, and embodiments of the present invention may include such instructions having any names desired. In various embodiments, the LOADKEY, SAVEKEY, and RESTOREKEY instructions may be different instructions received by instruction unit 230, they may be leaves of the same instruction, or they may be the same instruction with different operands. Note that various embodiments of the present invention are described and more may be possible, including various differences in the parameters of each instruction and the response of a processor to each instruction. Note also that the processor's execution of and/or response to these instructions, as described below, may also or instead be performed (and referred to below as a LOADKEY, SAVEKEY, or RESTOREKEY operation) in response to or in connection with other events (e.g., a write to or setting (by software, firmware, or hardware) of bits of a command, model-specific, or other register; a VM entry or exit (whether triggered by an instruction, interrupt, exception, or other event; etc.), some of which may be described below. Embodiments of the present invention may include any one or more of these variations.

In an embodiment, a LOADKEY instruction may include one or more source operands to specify a source of a cryptographic key or other value to be used as a cryptographic key or from which a cryptographic key may be derived. Various embodiments may provide for any set or subset of registers of a processor to be used as the source by causing an exception if a source operand does not specify a valid source. In the embodiment of FIG. 22, key source register 2212 is shown for convenience, and may be one of any number of valid source registers.

In other embodiments, a cryptographic key (or other value to be used as a cryptographic key or from which a cryptographic key may be derived) to be loaded in connection with a LOADKEY operation (as described below) may be provided by another source (e.g., a random number generator, fuse array, physically uncloneable function, etc.), in which case a LOADKEY instruction may be used without a source operand or have a format that does not include a source operand field. Note that embodiments of the present invention may provide for a processor to use a default key source (e.g., hardware) that may be overridden (e.g., by software) using a LOADKEY instruction.

In an embodiment, instruction unit 2220 may also or instead receive one or more instructions to access one or more registers, such as local key register 2214 and/or backup key register 2216, where the access to the register may cause data to be moved in or out of the register, from or to another register, such as key source register 2212, local key register 2214, and/or backup key register 2216, without the content of either register being accessible to software. Such an instruction may be an instruction in the instruction set architecture of a processor that may be used to access one or more other registers or other storage locations. For example, such an instruction may be a read, write, or move instruction having one or more operands to specify a register or other storage location to be read, written, or in or out of which to have content moved or copied. When such an operand specifies a register other than local key register 2214 or backup key register 2216, the content of such a register may be accessed by the software issuing the instruction. However, when such an operand specifies local key register 2214 or backup key register 2216, hardware in execution unit 2230 may provide for content to be moved between key source register 2212, local key register 2214, and/or backup key register 2216 without the content being readable or otherwise observable (during or in connection with the LOADKEY, SAVEKEY, and/or RESTOREKEY operation) by the software issuing the instruction or by any other software.

Execution unit 2230 may include any circuitry, logic, structures, and/or other hardware, such as arithmetic units, logic units, floating point units, shifters, etc., to process data and execute instructions, micro-instructions, and/or micro-operations. Execution unit 2230 may represent any one or more physically or logically distinct execution units. Execution unit 2230 may include load-key hardware 2232 to execute a LOADKEY instruction/operation, save-key hardware 2234 to execute a SAVEKEY instruction/operation, and restore-key hardware 2236 to execute a RESTOREKEY instruction/operation, each as further described below. Although shown as separate elements in FIG. 22, load-key hardware 2232, save-key hardware 2234, and restore-key hardware 2236 may include circuitry that is also used to execute other instructions and/or operations.

Execution unit 2230 may also include cryptographic hardware 2238 to implement any one or more cryptographic algorithms. In an embodiment, local key register 2214 may be hardwired or otherwise connected to cryptographic hardware 2238 such that the content of local key register 2214 may be used as a cryptographic key in such an algorithm, without exposing the content of local key register 2214 to software.

In an embodiment, load-key hardware 2232 may, in response to a LOADKEY instruction, perform a LOADKEY operation, where a LOADKEY operation includes loading, moving, or copying a key value into a private, internal storage location in processor 2200, from which hardware in processor 2200 may access content for use as a cryptographic or other key in any special purpose cryptographic hardware or general purpose hardware with which a cryptographic or other key-based algorithm may be performed, but from which software cannot read content. For example, in response to a LOADKEY instruction, load-key hardware 2232 may load the content of the source register into local key register 2214 for use by cryptographic hardware 2236.

Various embodiments of a load-key operation are possible within the scope of the present invention. In various embodiments, the key value may be a wrapping key, a session key, any other type of key, or any value from which any such key may be derived. In an embodiment, the key value may be loaded from a register or registers specified by a source operand or operands of a LOADKEY instruction. In other embodiments, the key value may be any other software-specified value, for example, a value from another storage location within the processor or from a specified location in a system memory. In other embodiments, the key value may be provided by a random number generator, a fuse array, a physically uncloneable function, or some other source. Embodiments of the present invention may provide for a processor to use a default key source (e.g., hardware) that may be overridden (e.g., by software) in a LOADKEY operation.

In an embodiment, load-key hardware 2232 may also or instead perform a LOADKEY operation in response to any LOADKEY command, where a LOADKEY command may include one or more register access instructions as described above, such as a write to local key register 2214, or any other instruction or command specified by the processor or instruction set architecture to be used to cause a LOADKEY operation.

In an embodiment, save-key hardware 2234 may, in response to a SAVEKEY instruction, perform a SAVEKEY operation, where a SAVEKEY operation includes moving or copying the content of core-scoped or logical-processor-scoped key storage to package-scoped key storage. For example, in response to a SAVEKEY instruction, save-key hardware 2234 may move/copy the content of local key register 2214 to backup key register 2216.

In an embodiment, save-key hardware 2234 may also or instead perform a SAVEKEY operation in response to any SAVEKEY command, where a SAVEKEY command may include one or more register access instructions as described above, such as a write to backup key register 2216, or any other instruction or command specified by the processor or instruction set architecture to be used to cause a SAVEKEY operation.

In an embodiment, restore-key hardware 2236 may, in response to a RESTOREKEY instruction, perform a RESTOREKEY operation, where a RESTOREKEY operation includes moving or copying the content of package-scoped key storage to core-scoped or logical-processor-scoped key storage to package-scoped key storage. For example, in response to a RESTOREKEY instruction, restore-key hardware 2236 may move/copy the content of backup key register 2216 to local key register 2214.

In an embodiment, restore-key hardware 2236 may also or instead perform a RESTOREKEY operation in response to any RESTOREKEY command, where a RESTOREKEY command may include one or more register access instructions as described above, such as a read from backup key register 2216, or any other instruction or command specified by the processor or instruction set architecture to be used to cause a RESTOREKEY operation.

In various embodiments, save-key and restore-key commands and operations may be associated with instructions in different ways. For example, a single execution of a first instruction may cause only a save-key command and operation, and a single execution of a second instruction may cause only a restore-key command and operation. Alternatively, a single execution of a third instruction may cause a save-key command and operation along with other commands and/or operations, such as the saving of other elements of processor state, and a single execution of a fourth instruction may cause a restore-key command and operation along with other commands and/or operations, such as the restoring of other elements of processor state. Various embodiments may include any number and variety of instructions and instruction formats that may result in save-key and restore-key commands and operations in isolation or in connection with any number of other commands and/or operations.

Save-key hardware 2234 and restore-key hardware 2236 may perform save-key and restore-key operations in response to save-key and restore-key commands such that the data being moved/copied between local key register 2214 and backup key register 2216 cannot be read by software.

Control unit 2240 may include any microcode, firmware, circuitry, logic, structures, and/or hardware to control the operation of the units and other elements of processor 2200 and the transfer of data within, into, and out of processor 2200. Control unit 2240 may cause processor 2200 to perform or participate in the performance of method embodiments of the present invention, such as the method embodiments described below, for example, by causing processor 2200, using execution unit 2230 and/or any other resources, to execute instructions received by instruction unit 2220 and micro-instructions or micro-operations derived from instructions received by instruction unit 2220. The execution of instructions by execution 2230 may vary based on control and/or configuration information stored in storage unit 2210, where such control and/or configuration information may be stored in or programmed into control/configuration registers such as control register 2218.

In an embodiment, control unit 2240 may include key management control hardware/logic 2242 to control load-key hardware 2232, save-key hardware 2234, restore-key hardware 2236, any other hardware in processor 2200 that supports key management techniques of embodiments of the present invention.

In an embodiment, key management control hardware/logic 2242 may cause or be configurable to cause a virtual machine exit in response to an attempt to execute a LOADKEY instruction in a virtual machine (VM). Therefore, a virtual machine monitor (VMM) may intercept a LOADKEY instruction in order to manage the use of cryptographic keys by guest software.

Figure 24:
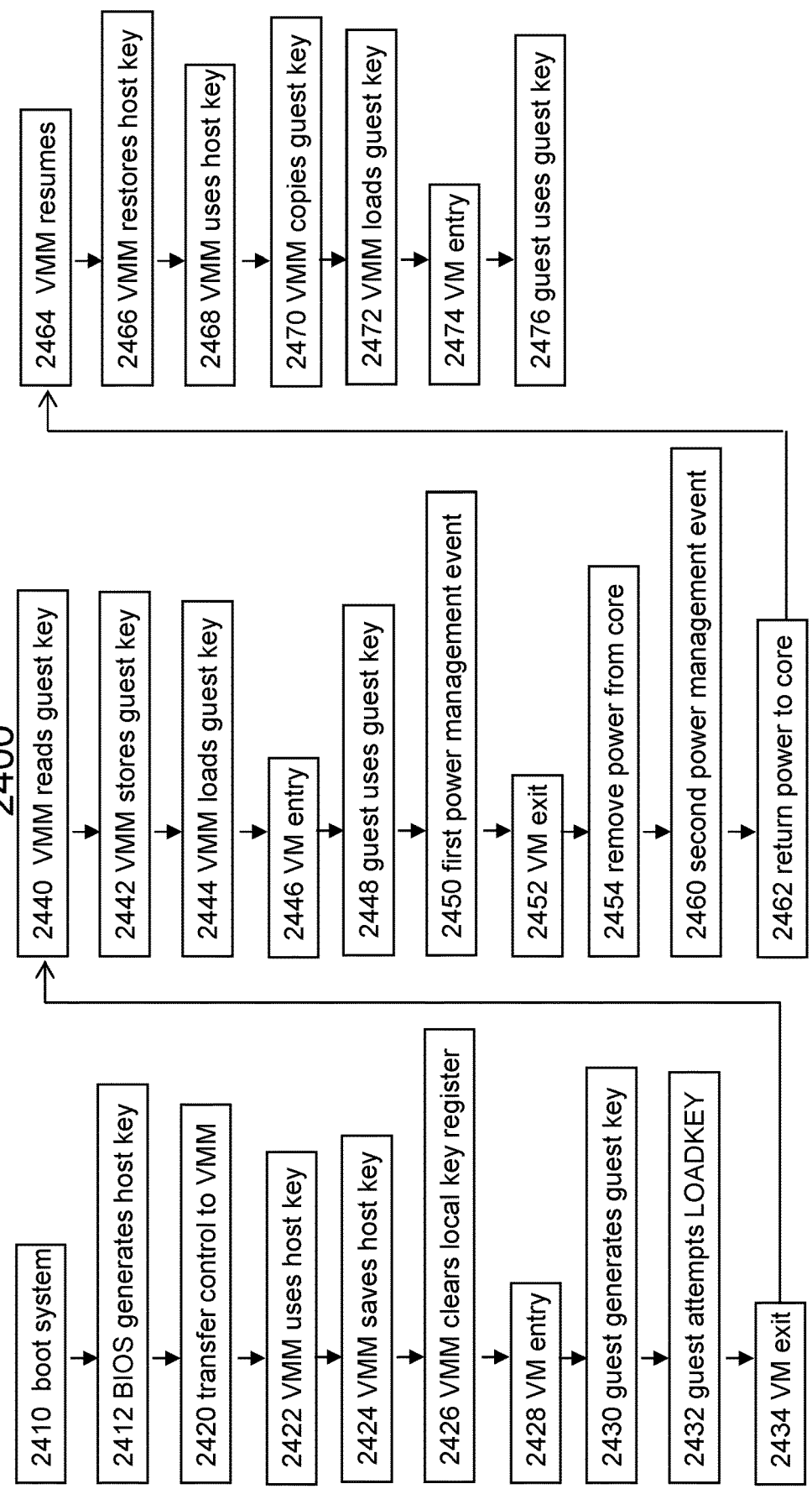
FIG. 24 illustrates a method for loading and virtualizing cryptographic keys according to an embodiment.

For example, a guest running in a VM on a core or logical processor may attempt to use a LOADKEY instruction to load a second cryptographic key into the local key register corresponding to the core or logical processor (where a first cryptographic key has been reserved for use by the VMM; for example, see the description of FIG. 24 below). In response, key management control hardware/logic 2242 may cause a VM exit, allowing a VMM to intercept the LOADKEY instruction. The VMM may then copy the second cryptographic key from the source register, load it into the local key register (using its own LOADKEY instruction or through a VM entry that includes loading the second cryptographic key into the local key register from guest state stored in a VMCS), and subsequently use it as described below (e.g., context switches, migrations, etc.).

This approach may be desired for any of several reasons. In an embodiment, it may provide for using separate keys for a guest and a host (e.g., the second key for use by the guest and the first key for use by the host key), and/or separate keys for each guest. In an embodiment, it may facilitate context switches in which a VMM moves guests from core to core or logical processor to logical processor, because it provides for each guest to have its own key that is not specific to any particular core or logical processor and which the VMM may move from core to core or logical processor or logical processor. In an embodiment, it may provide for migration of guests between VMMs; for example, a first VMM may load a guest-specific key into a local key register for a guest, then, that same guest-specific key may be provided (e.g., in a VMCS) to a second VMM to which the guest is migrated.

Other usages of embodiments of the present invention are possible. For example, a VMM may intercept a guest's LOADKEY instruction (e.g., to load the second key into the local key register for use within the VM), then load or cause to be loaded a third key into the local key register for use within the VM (instead of the second key).

Figure 23:
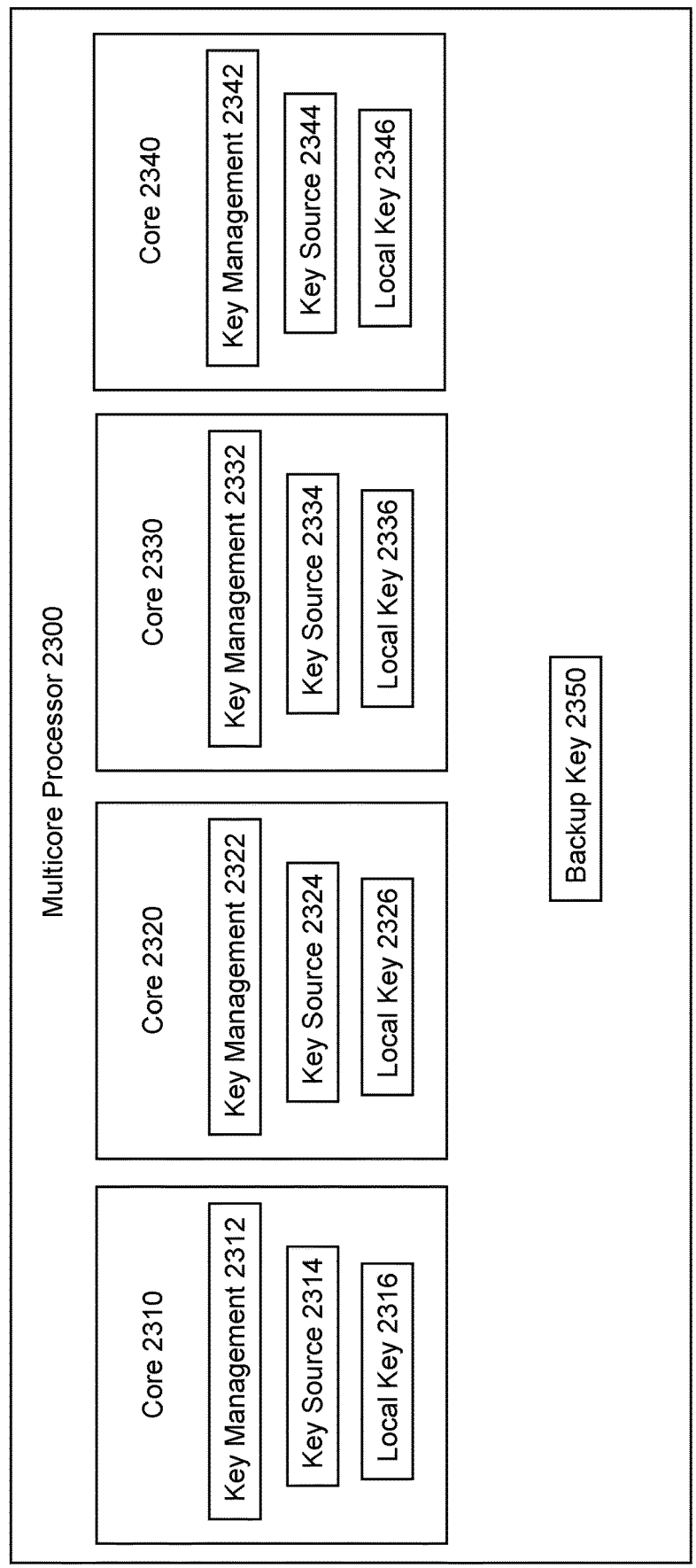
FIG. 23 illustrates a multicore processor according to an embodiment.

Although FIG. 22 shows a single instance of each of various hardware elements associated with embodiments of the present invention, various embodiments may include any number of such elements. For example, FIG. 23 illustrates an embodiment of the present invention in multicore processor 2300. Multicore processor 2300 may include any number of execution cores, each having its own storage unit, instruction unit, execution unit, control unit, and/or any other units, and/or any circuitry, structures, logic, and/or hardware of any such units, such as a second level cache, may be shared in an "uncore" area of multicore processor 2300.

Multicore processor 2300 includes core 2310, core 2320, core 2330, and core 2340, each of which may include a key management unit 2312, 2322, 2332, and 2342 respectively, a key source register 2314, 2324, 2334, and 2344, respectively, and a local key register 2316, 2326, 2336, and 2346, respectively. Each of key management units 2312, 2322, 2332, and 2342 may represent and/or include the hardware and/or control logic described above to support key management techniques of embodiments of the present invention.

Multicore processor 2300 may also include one or more backup key registers 2350, which may be powered by a separate power plane from any or all of cores 2310, 2320, 2330, and/or 2340 (such that power may be removed from any or all of cores 2310, 2320, 2330, and/or 2340 without removing power from backup key register(s) 2350), or which may be non-volatile, or which may have its content securely copied and stored elsewhere. Therefore, embodiments of the present invention provide for maintaining the value of a local cryptographic key through various power management cycles and/or states in which power may be removed from one or more processor cores. For example, system software, such as an operating system, may use a save-key command to save the content of any of local key registers 2316, 2326, 2336, and/or 2346 in backup key register(s) 350 in connection with entry into a power management state in which power is removed from a core. Then, in connection with restoring power to the core, system software may use a restore-key command to restore the content from backup key register(s) 2350 to any of local key registers 2316, 2326, 2336, and/or 2346. In an embodiment, backup key register(s) 2350 may be cleared by a reset.

Furthermore, the use of SAVEKEY and RESTOREKEY operations according to embodiments of the present invention may provide for one or more keys to be moved and/or shared among one or more of cores 2310, 2320, 2330, and or 2340, through backup key register(s) 2350, without being copied to DRAM or system memory.

The use of key management hardware according to various embodiments of the present invention may be desired to provide various techniques for cryptography key management according to various method embodiments of the present invention.

An embodiment may include the use of a cryptographic key by software without allowing the software to read the key. For example, host or system software may use a LOADKEY command to load a key into a core's local key register for use by guest or application software running on that core.

An embodiment may include the generation or modification of a cryptographic key by software to provide for customized key generation. For example, software may use any desired approach to key generation, alone or in connection with any root key, key generation instructions, and/or random number generation support provided by hardware, to generate a custom key or modify (e.g., add randomness to) a hardware or hardware-generated key, then use a LOADKEY command to load the custom key into a local key register.

An embodiment may include the migration of a cryptographic key from one execution core, logical processor, or hardware thread to a different execution core, logical processor, or hardware thread. For example, a VMM may use a save-key command to save a guest's key in connection with the VM exit of a guest running on a first core, then use a restore-key command to restore that same key to a different core before restarting the guest on that other core. Embodiments of the present invention provide for such context switches to be performed without allowing the VMM to read the key.

An embodiment may include the use and management of separate guest-specific keys and a separate host key. For example, FIG. 24 illustrates method 2400 for loading and virtualizing cryptographic keys. Although method embodiments of the invention are not limited in this respect, reference may be made to elements of FIGS. 21, 22, and 23 to help describe the method embodiment of FIG. 24. Various portions of method 2400 may be performed by hardware, firmware, software, and/or a user of a system or device.

In box 2410 of method 2400, an information processing system is booted. In box 2412, trusted system firmware such as a secure basic input/output system (BIOS) may cause, during a secure boot process, a first cryptographic key to be loaded into a local key storage location of a processor core. The first cryptographic key may be copied directly from or derived from (e.g., using dedicated key generation or transformation instructions of the processor) a hardware, real, or root key programmed or embedded in the processor using fuses, metal tie-ups or tie-downs, or any register transfer language technique, or from a key provided by a trusted platform module. Generation, derivation, or transformation of the first key may include the injection of randomness using a hardware random number generator, physically unclonable function, or other obfuscation technique. The local key storage location may be accessible by cryptographic hardware of the processor but is not readable by software.

In box 2420, control of the processor core may be transferred to a VMM. In box 2422, the VMM may execute instructions on the processor core, including using the first key as a host key to encrypt and/or decrypt host-specific information. In box 2424, the VMM may use a SAVEKEY command to copy the first key from the local key storage location to a backup key storage location in the uncore of the processor, without being able to read the value of the key. In box 2426, in preparation for a VM entry, the VMM may clear or replace the content of the local key storage location to prevent the use of the first key by a guest. In box 2428, the VMM may start or resume execution of a guest in a VM on the processor core. Note that box 2426 may be performed automatically in connection with box 2428.

In box 2430, the guest may perform one or more key generation, transformation, or derivation instructions or operations to generate a second cryptographic key in a key source register. In box 2432, the guest may attempt a LOADKEY instruction to load a second key from the key source register into the local key storage location for use to encrypt and/or decrypt guest-specific information. In box 2434, the LOADKEY attempt may cause a VM exit to the VMM.

In box 2440, the VMM may read the value of the second key from the key source register designated by the source operand of the attempted LOADKEY instruction. In box 2442, the VMM may store the value of the second key in a guest-key field of a VMCS or other memory location (which may be protected by any known technique, such as but not limited to access control mechanisms including the use of extended or nested page tables) for use as a guest-specific key. In box 2444, the VMM may load the guest-specific key from the key source register to the local key storage location using LOADKEY instruction. In box 2446, the VMM may resume execution of the guest in the VM. Note that box 2446 may include automatically loading the guest-specific key from the guest-key field of the VMCS, in which case box 2444 may be omitted. In box 2448, the guest may execute in the VM, including using the guest-specific key from the local key storage location to encrypt and/or decrypt information, without being able to read the value of the key.

In box 2450, a first power management event may occur, as a result of which the system is to enter a power management state in which power is to be removed from the processor core supporting the VM in which the guest is executing. In box 2452, the first power management event causes a VM exit to the VMM. In box 2454, power is removed from the processor core (but not to the backup key storage location or the memory in which the VMCS or guest-specific key is stored).

In box 2460, a second power management event may occur, as a result of which power is to be returned to the processor core. In box 2462, power is returned to the processor core. In box 2464, the VMM resumes execution on the processor core. In box 2466, the VMM uses a restore-key command to copy the host key from the backup key storage location to the local key storage location, without being able to read the value of the key. In box 2468, the VMM may execute instructions on the processor core, including using the host key to encrypt and/or decrypt host-specific information.

In box 2470, in preparation for a VM entry, the VMM may copy the value of the guest-specific key from its memory location to a key source register. In box 2472, the VMM may load the guest-specific key from the key source register into the local key storage location using a LOADKEY instruction. In box 2474, the VMM may resume execution of the guest in the VM. Note that box 2474 may include automatically loading the guest-specific key from the guest-key field of the VMCS, in which case boxes 2470 and 2472 may be omitted. In box 2476, the guest may execute in the VM, including using the guest-specific key from the local key storage location to encrypt and/or decrypt information, without being able to read the value of the key.

Embodiments for a Software Programming Interface

The following describes a software programming interface for instruction set extensions pertaining a feature (which may be referred to as Key Locker and is described as an extension to a particular instruction set architecture (Intel Architecture or IA), for convenience but without limiting the scope of the invention to this architecture) according to embodiments and/or an implementation including details, some or all of which may be included in embodiments. Any description of details as required means that such details may be required in a particular implementation but does not mean that any such details are required in all or any other embodiments of the invention. Furthermore, the use of any specific names, such as the Key Locker and/or names of instructions, registers, etc., does not limit the details and descriptions to the implementations and/or embodiments described, in other words, details and descriptions may or may not be used and/or implemented in embodiments described elsewhere in this description.

Key Locker provides a mechanism to encrypt and decrypt data with an AES key without having access to the raw key value by converting AES keys into "handles". These handles can be used to perform the same encryption and decryption operations as the original AES keys, but they only work on the current system and only until they are revoked. If software revokes Key Locker handles (e.g., on a reboot), then any previous handles can no longer be used.

Most adversaries cannot steal the actual AES keys, except during a brief period when software is requesting that the key handles be created. Once a key handle has been created, the original keys that were wrapped into those handles can be erased from memory.

If the OS chooses a policy that revokes the handles on each reboot, then any handles that may have been stolen are no longer useful to the attacker after the reboot.

There is no arbitrary limit on the number of key handles that can be created. An internal wrapping key is used to create the handles, each of which is essentially an encrypted form of an underlying AES key. The internal wrapping key can be created and loaded by privileged software, or it can be randomly generated by the CPU so that it is never revealed to software.

On many platforms, software can back up the current internal wrapping key and also restore it. This can enable the OS to save and restore the keys across the S3 (sleep) and S4 (hibernate) system sleep states, as well as provide a method to distribute an internal wrapping key across the entire platform without putting it in memory.

Software cryptographic libraries may be able to use the Key Locker instructions without fundamentally changing their API, providing an easy way for software to gain improved security for their AES keys without having to directly add support for the Key Locker instructions.

Basic Instructions and Usage

Key Locker consists of three types of instructions:

Instructions to create handles from an AES key (ENCODEKEY128 and ENCODEKEY256).

Instructions to use handles to perform AES encryption or decryption (AESDEC128KL, AESDEC256KL, AESDECWIDE128KL, AESDECWIDE256K, AESENC128KL, AESENC256KL, AESENCWIDE128KL, and AESENCWIDE256KL).

Instruction to load an internal wrapping key (LOAD-IWKEY).

Instructions to Create Handles

Key Locker adds two instructions that take AES keys and create handles. They also take input on which restrictions are requested on how the handle can be used. They use the current IWKey to create a handle. The output handle contains an encrypted version of the AES key as well as metadata. The entire handle is integrity protected, such that any modification of the handle (e.g., to edit the metadata) or usage of the handle with a different IWKey will be detected.

ENCODEKEY128 takes a 128-bit AES key as input and produces a 384-bit handle.

ENCODEKEY256 takes a 256-bit AES key as input and produces a 512-bit handle.

Many software usages will want to overwrite the AES key after the handle is generated so that later vulnerabilities are limited to a stolen handle, not the original AES key.

More details on the algorithm used to create the handle are available below.

In addition to producing the handle, the ENCODEKEY* instructions also indicate the type of IWKey that was loaded and zero registers XMM4, XMM5 and XMM6. It is possible that future enhancements to Key Locker will produce non-zero values for XMM4-6 (e.g., to indicate further information about the IWKey specified).

Handle Restrictions

Each handle includes an AAD (Additional Authentication Data) field which is integrity protected but not encrypted. It is used to hold metadata of the handle, including its restrictions.

When a Key Locker handle is created via one of the ENCODEKEY* instructions, SW can specify the following restrictions by setting the indicated bit the handle's AAD field:

Ring 0 only (bit 0 of AAD): Handle can be used only in CPL 0 (supervisor mode); it cannot be used in application modes (CPL>0).

No-Encrypt (bit 1 of AAD): Handle cannot be used for encryption.

No-Decrypt (bit 2 of AAD): Handle cannot be used for decryption.

Multiple restriction bits may be set in a single handle. Handle restriction failures (including AAD reserved bits set) will result in the AES*KL instructions setting RFLAGS.ZF and not performing the requested encryption or decryption.

Ring 0 only handles may be useful for OS keys that are not intended for usage by applications. If a malicious application manages to steal such a handle, it will be unable to use it within the application itself. Note that ring 0 handles can be created at any privilege level despite only being usable for encryption/decryption at ring 0.

No-decrypt and no-encrypt handles may be useful in pairs when one side of a protocol only needs to create messages (with encryption) and the other side of the protocol only needs to read messages (with decryption). This would require using an AES mode that uses both AES encryption and decryption (e.g., AES-CBC), rather than an AES mode that only uses encryption (e.g., AES-CTR).

Instructions to Use Handles to Perform AES Encryption or Decryption

Key Locker instructions can take a handle and either plaintext or cipher text and encrypt/decrypt it. Details on different Key Locker instructions are show in Table 4.

TABLE 4

Key Locker Instructions

| Instruction | AES Key Size | Encrypt or Decrypt | Single 128-bit Block vs. Eight 128-bit Blocks |
|---|---|---|---|
| AESENC128KL | 128-bit | Encrypt | Non-wide (single 128-bit block) |
| AESENCWIDE128KL | | | Wide (eight 128-bit blocks) |
| AESDEC128KL | | Decrypt | Non-wide (single 128-bit block) |
| AESDECWIDE128KL | | | Wide (eight 128-bit blocks) |
| AESENC256KL | 256-bit | Encrypt | Non-wide (single 128-bit block) |
| AESENCWIDE256KL | | | Wide (eight 128-bit blocks) |
| AESDEC256KL | | Decrypt | Non-wide (single 128-bit block) |
| AESDECWIDE256KL | | | Wide (eight 128-bit blocks) |

The 'wide' instructions that operate on eight 128-bit blocks have higher performance on parallel AES modes like AES-CTR than executing eight iterations of a non-wide Key Locker instruction.

After every Key Locker AES encryption/decryption operation, software should check ZF in order to ensure that the operation did not fail (e.g., due to a corrupted handle or a restriction failure). Failure to do this check might lead to using plaintext as ciphertext (or vice versa) when the instruction fails.

Instruction to Load the Internal Wrapping Key

The internal wrapping key (Key Locker IWKey) is used to convert between handles and the original keys. The internal wrapping key is written by the LOADIWKEY instruction and should be kept secret from attackers in order to prevent them from manually unwrapping handles in order to obtain the original keys. For this reason, there is no operation to read out the internal wrapping key, although there are "IWKeyBackup" MSRs that can be used to back up the internal wrapping key without revealing its value (see section 4).

As the internal wrapping key is considered system state, LOADIWKEY can only execute in supervisor mode (CPL 0). In order to support VM context switch and migration, a VMM can also cause a VM exit on guest execution of LOADIWKEY so as to capture the IWKey value.

It is recommended that LOADIWKEY be executed early in the OS boot in order to minimize the chance that software has been loaded that an attacker can exploit to watch the LOADIWKEY's data.

It is possible for LOADIWKEY to specify that the internal wrapping key it loads cannot be backed up through the IWKeyBackup MSRs. This can be used to ensure that the internal wrapping key cannot be revealed through any flaws found in the future in the backup or restore mechanisms; but blocks usages that require those MSRs (like maintaining handles across S3 or S4 sleep states).

LOADIWKEY can either directly load the specified argument or can request a hardware generated random internal wrapping key. When LOADIWKEY requests a hardware generated random key, the processor reads 384 bits of random data (from the same on-chip random number generator that supplied the random data read by RDSEED) and XORs it with the LOADIWKEY's arguments. Because the data is XORed, software can combine their own entropic data with that supplied by the hardware random bit generator.

Software cannot read the values of hardware generated random internal wrapping keys. This fact limits the ability of a virtual-machine monitor (VMM) to move a virtual machine from one processor to another. Because of this limitation, a VMM may choose not to enumerate support for hardware generated random internal wrapping keys when it virtualizes the CPUID instruction.

Hardware random internal wrapping keys can be backed up and restored (unless the LOADIWKEY specified that no such backup is allowed) through MSRs. The output of the ENCODEKEY* instructions indicate properties of the internal wrapping key that was used to create the handle, including whether it was from the on-chip hardware random number generator and whether it can be backed up through MSRs.

IWKey

The IWKey is an internal wrapping key used by the Key Locker ENCODEKEY* and AES*KL instructions. It is logical processor scoped and is written through the LOADIWKEY instruction. It cannot be directly read by software.

The internal wrapping key currently consists of:

IntegrityKey[127:0]—A 128-bit integrity key used to check that handles have not been tampered with.

EncryptionKey[255:0]—A 256-bit encryption key used in wrapping/unwrapping to protect confidentiality of the keys indicated by the handles.

KeySource [3:0]—The only allowed values are 0 (AES GCM SIV wrapping algorithm with SW specified keys) and 1 (AES GCM SIV wrapping algorithm with random keys enforced by hardware).

NoBackup flag—when set, this IWKey cannot be backed up.

IWKeyBackup (described below) has the same format as IWKey.

CR4.KL

Key Locker introduces a new "KL" bit in CR4 (bit 19) in order to prevent usage of Key Locker when it is not properly enabled by system software. This can also prevent guests of legacy VMMs from using Key Locker.

CR4.KL existence is enumerated by CPUID.KL (CPUID. (EAX=07H, ECX=0H).ECX.KL[bit 23]).

When CR4.KL is 0, CPUID.AESKLE (CPUID.19H:EBX [0]) will also be 0. This will cause all AES Key Locker instructions to generate a #UD exception, including the AES*KL, ENCODEKEY128, ENCODEKEY256 and LOADIWKEY instructions. The Key Locker IWKeyBackup MSRs (described later) are not affected by the value of CR4.KL as they are enumerated by CPUID.KL and not CPUID.

Handle Format

Handles for 128-bit AES keys are 384 bits in size and have the following format:

Handle[127:0]=AAD
Handle[255:128]=Integrity Tag
Handle[383:256]=Ciphertext

Handles for 256-bit AES keys are 512 bits in size and have the following format:

Handle[127:0]=AAD
Handle[255:128]=Integrity Tag
Handle[383:256]=Ciphertext[127:0]
Handle[511:384]=Ciphertext[255:128]

The AAD (Additional Authentication Data) format for both types of handles has the following format:

AAD[0]=Handle is not usable if CPL>0
AAD[1]=Handle is not usable for encryption
AAD[2]=Handle is not usable for decryption
AAD[23:3]=Reserved
AAD[27:24]=Key Type. 0 indicates AES-128 handle and 1 indicates AES-256 handle. All other key types are currently reserved.
AAD[127:28]=Reserved Intel® Transactional Synchronization Extensions (Intel® TSX) Operation On some implementations, Key Locker instructions will cause Intel TSX aborts when executed inside an Intel TSX transaction.

CPUID Enumeration of Key Locker Support

Hardware support for Key Locker is enumerated through CPUID.KL: CPUID.(07H,0).ECX[23]=1. This indicates that the Key Locker feature is supported by the processor and CPUID leaf 19H gives more information about Key Locker capabilities.

A separate CPUID bit, CPUID.AESKLE: CPUID.19H.EBX[0]=1 indicates that the operating system and system firmware (e.g., BIOS) have enabled Key Locker AES instructions (AES KL is enabled). As it is part of CPUID 19H, software should first determine that CPUID leaf 19H is supported (by checking that CPUID.KL is enumerated) before looking at leaf 19H bits like CPUID.AESKLE. This bit will be 0 unless CR4.KL is set. Some implementations may need system firmware enabling of Key Locker. If CR4.KL is set but AESKLE is not enumerated (reads as 0) then it may be that system firmware enabling of Key Locker is needed on that implementation and was not performed.

When deciding whether to enable Key Locker, the operating system should check CPUID.KL.

Software that wishes to use Key Locker to protect AES keys (e.g., applications) should check that CPUID.KL and the CPUID.AESKLE bits are both set. CPUID.KL will indicate that CPUID.19H (and thus AESKLE) is valid and AESKLE will indicate that the OS (and, if needed, system firmware) have enabled Key Locker.

For determining the other features of Key Locker, use the definitions shown in Table 5. Invoke CPUID as (instantiating the register and bit fields appropriately): CPUID.19H: REG[bit #].

TABLE 5

Key Locker CPUID Definitions for Leaf 19H

| Register | Bit Position(s) | Contents |
| --- | --- | --- |
| EAX | 0 | KL restriction of CPL0-only supported. |
| EAX | 1 | KL restriction of no-encrypt supported. |
| EAX | 2 | KL restriction of no-decrypt supported. |
| EAX | 31:3 | Reserved. |
| EBX | 0 | AESKLE: When 1, the AES Key Locker instructions are fully enabled. |
| EBX | 1 | Reserved. |
| EBX | 2 | WIDE_KL: When 1, the AES wide Key Locker instructions are supported. |
| EBX | 3 | Reserved. |
| EBX | 4 | When 1, the platform supports the IWKeyBackup MSRs and backing up the internal wrapping key. |
| EBX | 31:5 | Reserved. |
| ECX | 0 | When 1, the NoBackup parameter to LOADIWKEY is supported. |
| ECX | 1 | When 1, KeySource encoding of 1 (randomization of the internal wrapping key) is supported. |
| ECX | 31:2 | Reserved. |
| EDX | 31:0 | Reserved. |

Instructions
    AESDEC128KL

| Opcode/Instruction | Op/En | 64/32-bit Mode Support | CPUID Flag | Description |
|---|---|---|---|---|
| F3 0F 38 DD !(11):rrr:bbb AESDEC128KL xmm, m384 | A | V/V | AESKLE | Decrypt xmm using 128-bit AES key indicated by handle at m384 and store result in xmm. |

Instruction Operand Encoding

| Op/En | Tuple | Operand 1 | Operand 2 | Operand 3 | Operand 4 |
|---|---|---|---|---|---|
| A | NA | ModRM:reg (r, w) | ModRM:r/m (r) | NA | NA |

DESCRIPTION

The AESDEC128KL instruction performs 10 rounds of AES to decrypt the first operand using the 128-bit key indicated by the handle from the second operand. It stores the result in the first operand.
Operation

```
AESDEC128KL (DEST, SRC) {
    Handle := UnalignedLoad of 384 bit (SRC); // Load is not guaranteed to be atomic.
    Illegal Handle = (HandleReservedBitSet (Handle) ||
        (Handle[0] AND (CPL > 0)) ||
        Handle [2] ||
        HandleKeyType (Handle) != HANDLE_KEY_TYPE_AES128);
    If (Illegal Handle) {
        RFLAGS.ZF := 1;
    } ELSE {
        (UnwrappedKey, Authentic) := UnwrapKeyAndAuthenticate384 (Handle[383:0], IWKey);
        If (Authentic == 0) {
            RFLAGS.ZF := 1;
        } ELSE {
            DEST := AES128Decrypt (DEST, UnwrappedKey);
            RFLAGS.ZF := 0;
        }
    }
    RFLAGS.OF, SF, AF, PF, CF := 0;
}
```

Flags Affected
    ZF is set to 0 if the operation succeeded and set to 1 if the operation failed due to a handle violation. The other arithmetic flags (OF, SF, AF, PF, CF) are cleared to 0.
Exceptions

| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |
| #PF | If a page fault occurs. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics
    unsigned char_mm_aesdec128kl_u8(_m128i* odata, __m128i idata, const void* h);
AESDEC256KL

| Opcode/Instruction | Op/En | 64/32-bit Mode Support | CPUID Flag | Description |
|---|---|---|---|---|
| F3 0F 38 DF !(11):rrr:bbb AESDEC256KL xmm, m512 | A | V/V | AESKLE | Decrypt xmm using 256-bit AES key indicated by handle at m512 and store result in xmm. |

Instruction Operand Encoding

| Op/En | Tuple | Operand 1 | Operand 2 | Operand 3 | Operand 4 |
|---|---|---|---|---|---|
| A | NA | ModRM:reg (r, w) | ModRM:r/m (r) | NA | NA |

Description

The AESDEC256KL instruction performs 14 rounds of AES to decrypt the first operand using the 256-bit key indicated by the handle from the second operand. It stores the result in the first operand.

Operation

```
AESDEC256KL (DEST, SRC) {
  Handle := UnalignedLoad of 512 bit (SRC); // Load is not guaranteed to be atomic.
  Illegal Handle = (HandleReservedBitSet (Handle) ||
       (Handle[0] AND (CPL > 0)) ||
       Handle [2] ||
       HandleKeyType (Handle) != HANDLE_KEY_TYPE_AES256);
  If (Illegal Handle) {
    RFLAGS.ZF := 1;
  } ELSE {
    (UnwrappedKey, Authentic) := UnwrapKeyAndAuthenticate512 (Handle[511:0], IWKey);
    If (Authentic == 0) {
      RFLAGS.ZF := 1;
    } ELSE {
      DEST := AES256Decrypt (DEST, UnwrappedKey);
      RFLAGS.ZF := 0;
    }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics
    unsigned char _mm_aesdec256kl_u8(__m128i* odata, __m128i idata, const void* h);
AESDECWIDE128KL

| Opcode/Instruction | Op/En | 64/32-bit Mode Support | CPUID Flag | Description |
|---|---|---|---|---|
| F3 0F 38 D8 !(11):001:bbb AESDECWIDE128KL m384, <XMM0-7> | A | V/V | AESKLE WIDE_KL | Decrypt XMM0-7 using 128-bit AES key indicated by handle at m384 and store each resultant block back to its corresponding register. |

Instruction Operand Encoding

| Op/En | Tuple | Operand 1 | Operands 2-9 |
|---|---|---|---|
| A | NA | ModRM:r/m (r) | Implicit XMM0-7 (r, w) |

Description

The AESDECWIDE128KL instruction performs ten rounds of AES to decrypt each of the eight blocks in XMM0-7 using the 128-bit key indicated by the handle from the second operand. It replaces each input block in XMM0-7 with its corresponding decrypted block.

Operation

```
AESDECWIDE128KL (SRC) {
  Handle := UnalignedLoad of 384 bit (SRC); // Load is not guaranteed to be atomic.
  Illegal Handle = (HandleReservedBitSet (Handle) ||
       (Handle[0] AND (CPL > 0)) ||
       Handle [2] ||
       HandleKeyType (Handle) != HANDLE_KEY_TYPE_AES128);
  If (Illegal Handle) {
    RFLAGS.ZF := 1;
  } ELSE {
    (UnwrappedKey, Authentic) := UnwrapKeyAndAuthenticate384 (Handle[383:0], IWKey);
    If Authentic == 0 {
      RFLAGS.ZF := 1;
    } ELSE {
      XMM0 := AES128Decrypt (XMM0, UnwrappedKey);
      XMM1 := AES128Decrypt (XMM1, UnwrappedKey);
      XMM2 := AES128Decrypt (XMM2, UnwrappedKey);
      XMM3 := AES128Decrypt (XMM3, UnwrappedKey);
      XMM4 := AES128Decrypt (XMM4, UnwrappedKey);
      XMM5 := AES128Decrypt (XMM5, UnwrappedKey);
      XMM6 := AES128Decrypt (XMM6, UnwrappedKey);
      XMM7 := AES128Decrypt (XMM7, UnwrappedKey);
      RFLAGS.ZF := 0;
    }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| | If CPUID.19H:EBX.WIDE_KL [bit 2] = 0. |
| #NM | IfCR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char_mm_aesdecwide128kl_u8(_m128i odata [8], const__m128i idata[8], const void* h);

AESDECWIDE256KL

| Opcode/Instruction | Op/En | 64/32-bit Mode Support | CPUID Flag | Description |
|---|---|---|---|---|
| F3 0F 38 D8 !(11):011 :bbb AESDECWIDE256KL m512, <XMM0-7> | A | V/V | AESKLE WIDE_KL | Decrypt XMM0-7 using 256-bit AES key indicated by handle at m512 and store each resultant block back to its corresponding register. |

Instruction Operand Encoding

| Op/En | Tuple | Operand 1 | Operands 2-9 |
|---|---|---|---|
| A | NA | ModRM:r/m (r) | Implicit XMM0-7 (r, w) |

Description

The AESDECWIDE256KL instruction performs 14 rounds of AES to decrypt each of the eight blocks in XMM0-7 using the 256-bit key indicated by the handle from the second operand. It replaces each input block in XMM0-7 with its corresponding decrypted block.

Operation

```
AESDECWIDE256KL (SRC) {
  Handle := UnalignedLoad of 512 bit (SRC); // Load is not guaranteed to be atomic.
  Illegal Handle = (HandleReservedBitSet (Handle) ||
      (Handle[0] AND (CPL > 0)) ||
      Handle [2] ||
      HandleKeyType (Handle) != HANDLE_KEY_TYPE_AES256);
  If (Illegal Handle) {
    RFLAGS.ZF := 1;
  } ELSE {
    (UnwrappedKey, Authentic) := UnwrapKeyAndAuthenticate512 (Handle[511:0],
IWKey);
    If (Authentic == 0) {
      RFLAGS.ZF := 1;
    } ELSE {
      XMM0 := AES256Decrypt (XMM0, UnwrappedKey);
      XMM1 := AES256Decrypt (XMM1, UnwrappedKey);
      XMM2 := AES256Decrypt (XMM2, UnwrappedKey);
      XMM3 := AES256Decrypt (XMM3, UnwrappedKey);
```

-continued

```
        XMM4 := AES256Decrypt (XMM4, UnwrappedKey);
        XMM5 := AES256Decrypt (XMM5, UnwrappedKey);
        XMM6 := AES256Decrypt (XMM6, UnwrappedKey);
        XMM7 := AES256Decrypt (XMM7, UnwrappedKey);
        RFLAGS.ZF := 0;
      }
    }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| | If CPUID.19H:EBX.WIDE_KL [bit 2] = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char_mm_aesdecwide256kl_u8(__m128i odata [8], const __m128i idata[8], const void* h);

AESENC128KL

| Opcode/Instruction | OP/En | 64/32-bit Mode Support | CPUID Flag | Description |
|---|---|---|---|---|
| F3 0F 38 DC !(11):rrr:bbb AESENC128KL xmm, m384 | A | V/V | AESKLE | Encrypt xmm using 128-bit AES key indicated by handle at m384 and store result in xmm. |

Instruction Operand Encoding

| Op/En | Tuple | Operand 1 | Operand 2 | Operand 3 | Operand 4 |
|---|---|---|---|---|---|
| A | NA | ModRM:reg (r,w) | ModRM:r/m (r) | NA | NA |

Description

The AESENC128KL instruction performs ten rounds of AES to encrypt the first operand using the 128-bit key indicated by the handle from the second operand. It stores the result in the first operand.

Operation

```
AESENC128KL (DEST, SRC) {
  Handle := UnalignedLoad of 384 bit (SRC); // Load is not guaranteed to be atomic.
  Illegal Handle = (
      HandleReservedBitSet (Handle) ||
      (Handle[0] AND (CPL > 0)) ||
      Handle [1] ||
```

```
        HandleKeyType (Handle) != HANDLE_KEY_TYPE_AES128
      );
  If (Illegal Handle) {
    RFLAGS.ZF := 1;
  } ELSE {
    (UnwrappedKey, Authentic) := UnwrapKeyAndAuthenticate384 (Handle[383:0],
IWKey);
    If (Authentic == 0) {
      RFLAGS.ZF := 1;
    } ELSE {
      DEST := AES128Encrypt (DEST, UnwrappedKey);
      RFLAGS.ZF := 0;
    }
  }
 }
 RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char _mm_aesenc128kl_u8(__m128i* odata, __m128i idata, const void* h);

AESENC256KL

| Opcode/Instruction | Op/En | 64/32-bit Mode Support | CPUID Flag | Description |
|---|---|---|---|---|
| F3 0F 38 DE !(11):rrr:bbb AESENC256KL xmm, m512 | A | V/V | AESKLE | Encrypt xmm using 256-bit AES key indicated by handle at m512 and store result in xmm. |

Instruction Operand Encoding

| Op/En | Tuple | Operand 1 | Operand 2 | Operand 3 | Operand 4 |
|---|---|---|---|---|---|
| A | NA | ModRM:reg (r,w) | ModRM:r/m (r) | NA | NA |

Description

The AESENC256KL instruction performs 14 rounds of AES to encrypt the first operand using the 256-bit key indicated by the handle from the second operand. It stores the result in the first operand.

Operation

```
AESENC256KL (DEST, SRC) {
  Handle := UnalignedLoad of 512 bit (SRC); // Load is not guaranteed to be atomic.
  Illegal Handle = (
        HandleReservedBitSet (Handle) ||
        (Handle[0] AND (CPL > 0)) ||
        Handle [1] ||
        HandleKeyType (Handle) != HANDLE_KEY_TYPE_AES256
  );
   If (Illegal Handle) {
    RFLAGS.ZF := 1;
  } ELSE {
    (UnwrappedKey, Authentic) := UnwrapKeyAndAuthenticate512 (Handle[511:0],
  IWKey);
    If (Authentic == 0) {
      RFLAGS.ZF := 1;
    } ELSE {
      DEST := AES256Encrypt (DEST, UnwrappedKey);
      RFLAGS.ZF := 0;
    }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char_mm_aesenc256kl_u8(m128i* odata, __m128i idata, const void* h);

AESENCWIDE128KL

| Opcode/Instruction | Op/En | 64/32-bit Mode Support | CPUID Flag | Description |
|---|---|---|---|---|
| F3 0F 38 D8 !(11):000:bbb AESENCWIDE128KL m384, <XMM0-7> | A | V/V | AESKLEWIDE_KL | Encrypt XMM0-7 using 128-bit AES key indicated by handle at m384 and store each resultant block back to its corresponding register. |

Instruction Operand Encoding

| Op/En | Tuple | Operand 1 | Operands 2-9 |
|---|---|---|---|
| A | NA | ModRM:r/m (r) | Implicit XMM0-7 (r, w) |

Description

The AESENCWIDE128KL instruction performs ten rounds of AES to encrypt each of the eight blocks in XMM0-7 using the 128-bit key indicated by the handle from the second operand. It replaces each input block in XMM0-7 with its corresponding encrypted block.

Operation

```
AESENCWIDE128KL (SRC) {
  Handle := UnalignedLoad of 512 bit (SRC); // Load is not guaranteed to be atomic.
  Illegal Handle = (
          HandleReservedBitSet (Handle) ||
          (Handle[0] AND (CPL > 0)) ||
          Handle [1] ||
          HandleKeyType (Handle) != HANDLE_KEY_TYPE_AES128
          );
  If (Illegal Handle) {
    RFLAGS.ZF := 1;
  } ELSE {
      (UnwrappedKey, Authentic) := UnwrapKeyAndAuthenticate384 (Handle[383:0],
  IWKey);
      If Authentic == 0 {
        RFLAGS.ZF := 1;
      } ELSE {
        XMM0 := AES128Encrypt (XMM0, UnwrappedKey);
        XMM1 := AES128Encrypt (XMM1, UnwrappedKey);
        XMM2 := AES128Encrypt (XMM2, UnwrappedKey);
        XMM3 := AES128Encrypt (XMM3, UnwrappedKey);
        XMM4 := AES128Encrypt (XMM4, UnwrappedKey);
        XMM5 := AES128Encrypt (XMM5, UnwrappedKey);
        XMM6 := AES128Encrypt (XMM6, UnwrappedKey);
        XMM7 := AES128Encrypt (XMM7, UnwrappedKey);
          RFLAGS.ZF := 0;
      }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.AESKLE = 0. |
| | If CR0.EM = 1. |
| | If CR4.OSFXSR = 0. |
| | If CPUID.19H:EBX.WIDE_KL [bit 2] = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char_mm_aesencwide128kl_u8(_m128i odata
     [8], const _m128i idata[8], const void* h);

AESENCWIDE256KL

| Opcode/Instruction | Op/En | 64/32-bit Mode Support | CPUID Flag | Description |
|---|---|---|---|---|
| F3 0F 38 D8 !(11):010:bbb AESENCWIDE256KL m512, <XMM0-7> | A | V/V | AESKLE WIDE_KL | Encrypt XMM0-7 using 256-bit AES key indicated by handle at m512 and store each |

-continued

| Opcode/Instruction | Op/En | 64/32-bit Mode Support | CPUID Flag | Description |
|---|---|---|---|---|
| | | | | resultant block back to its corresponding register. |

Instruction Operand Encoding

| Op/En | Tuple | Operand 1 | Operands 2-9 |
|---|---|---|---|
| A | NA | ModRM:r/m (r) | Implicit XMM0-7 (r, w) |

Description

The AESENCWIDE256KL instruction performs 14 rounds of AES to encrypt each of the eight blocks in XMM0-7 using the 256-bit key indicated by the handle from the second operand. It replaces each input block in XMM0-7 with its corresponding encrypted block.

Operation

```
AESENCWIDE256KL (SRC) {
  Handle := UnalignedLoad of 512 bit (SRC); // Load is not guaranteed to be atomic.
  Illegal Handle = (
        HandleReservedBitSet (Handle) ||
        (Handle[0] AND (CPL > 0)) ||
        Handle [1] ||
        HandleKeyType (Handle) != HANDLE_KEY_TYPE_AES256
  );
  If (Illegal Handle) {
    RFLAGS.ZF := 1;
  } ELSE {
    (UnwrappedKey, Authentic) := UnwrapKeyAndAuthenticate512 (Handle[511:0], IWKey);
    If (Authentic == 0) {
      RFLAGS.ZF := 1;
    } ELSE {
        XMM0 := AES256Encrypt (XMM0, UnwrappedKey);
        XMM1 := AES256Encrypt (XMM1, UnwrappedKey);
        XMM2 := AES256Encrypt (XMM2, UnwrappedKey);
        XMM3 := AES256Encrypt (XMM3, UnwrappedKey);
        XMM4 := AES256Encrypt (XMM4, UnwrappedKey);
        XMM5 := AES256Encrypt (XMM5, UnwrappedKey);
        XMM6 := AES256Encrypt (XMM6, UnwrappedKey);
        XMM7 := AES256Encrypt (XMM7, UnwrappedKey);
      RFLAGS.ZF := 0;
    }
  }
  RFLAGS.OF, SF, AF, PF, CF := 0;
}
```

Flags Affected

ZF is set to 0 if the operation succeeded and set to 1 if the operation fails due to a handle violation. The other arithmetic flags (OF, SF, AF, PF, CF) are cleared to 0.

Exceptions

| | |
|---|---|
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| | If CPUID.19H:EBX.WIDE_KL [bit 2] = 0. |
| #NM | If CR0.TS = 1. |
| #GP(0) | If a memory operand effective address is outside the CS, DS, ES, FS, or GS segment limit. |
| | If the DS, ES, FS, or GS register is used to access memory and it contains a NULL segment selector. |
| #SS(0) | If a memory operand effective address is outside the SS segment limit. |

Intrinsics unsigned char_mm_aesdecwide256kl_u8(_m128i odata [8], const _m128i idata[8], const void* h);
ENCODEKEY128

| Opcode/Instruction | Op/En | 64/32-bit Mode Support | CPUID Flag | Description |
|---|---|---|---|---|
| F3 0F 38 FA 11:rrr:bbb ENCODEKEY128 r32, r32, <XMM0-2>, <XMM4-6> | A | V/V | AESKLE | Wrap a 128-bit AES key from XMM0 into a key handle and output handle in XMM0-2. |

Instruction Operand Encoding

| Op/En | Tuple | Operand 1 | Operand 2 | Operands 3 | Operands 4-5 | Operands 6-8 |
|---|---|---|---|---|---|---|
| A | NA | ModRM:reg (w) | ModRM:r/m (r) | Implicit XMM0 (r, w) | Implicit XMM1-2 (w) | Implicit XMM4-6 (w) |

Description

The ENCODEKEY128 instruction wraps a 128-bit AES key from the implicit operand XMM0 into a key handle that is then stored in the implicit destination operands XMM0-2.

The explicit source operand specifies handle restrictions, if any.

The explicit destination operand is populated with information on the source of the key and its attributes. XMM4 through XMM6 are reserved for future usages and software should not rely upon them being zeroed.

Operation

```
ENCODEKEY128 (DEST, SRC) {
  #GP (0) if a reserved bit in SRC[31:0] is set
  InputKey[127:0] := XMM0;
  KeyMetadata[2:0] = SRC[2:0];
  KeyMetadata[23:3] = 0; // Reserved for future usage
  KeyMetadata[27:24] = 0; // KeyType is AES-128 (value of 0)
  KeyMetadata[127:28] = 0; // Reserved for future usage
      // KeyMetadata is the AAD input and InputKey is the Plaintext input for WrapKey128
  Handle[383:0] := WrapKey128(InputKey[127:0], KeyMetadata[127:0], IWKey.Integrity
      Key[127:0], IWKey.Encryption Key[255:0]);
  DEST[0] := IWKey.NoBackup;
  DEST[4:1] := IWKey.KeySource[3:0];
  DEST[31:5] = 0;
  XMM0 := Handle[127:0]; // AAD
  XMM1 := Handle[255:128]; // Integrity Tag
  XMM2 := Handle[383:256]; // CipherText
```

```
XMM4 := 0; // Reserved for future usage
XMM5 := 0; // Reserved for future usage
XMM6 := 0; // Reserved for future usage
RFLAGS.OF, SF, ZF, AF, PF, CF := 0;
}
```

SRC[31:3] are currently reserved for future usages. SRC[2], which indicates a no-decrypt restriction, is reserved if CPUID.19H:EAX[2] is 0. SRC[1], which indicates a no-encrypt restriction, is reserved if CPUID.19H:EAX[1] is 0. SRC[0], which indicates a CPL0-only restriction, is reserved if CPUID.19H:EAX[0] is 0.

Flags Affected

All arithmetic flags (OF, SF, ZF, AF, PF, CF) are cleared to 0. Although they are cleared for the currently defined operations, future extensions may report information in the flags.

Exceptions

| | |
|---|---|
| #GP | If reserved bit is set in source register value. |
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |

Intrinsics
   unsigned int _mm_encodekey128_u32(unsigned int htype, __m128i key, void* h);

ENCODEKEY256

| Opcode/Instruction | Op/En | 64/32-bit Mode Support | CPUID Flag | Description |
|---|---|---|---|---|
| F3 0F 38FB 11:rrr:bbb ENCODEKEY256 r32, r32 <XMM0-6> | A | V/V | AESKLE | Wrap a 256-bit AES key from XMM1:XMM0 into a key handle and store it in XMM0-3. |

Instruction Operand Encoding

| Op/En | Tuple | Operand 1 | Operand 2 | Operands 3-4 | Operands 5-9 |
|---|---|---|---|---|---|
| A | NA | ModRM:reg (w) | ModRM:r/m (r) | Implicit XMM0-1 (r, w) | Implicit XMM2-6 (w) |

Description

The ENCODEKEY256 instruction wraps a 256-bit AES key from the implicit operand XMM1:XMM0 into a key handle that is then stored in the implicit destination operands XMM0-3.

The explicit source operand is a general-purpose register and specifies what handle restrictions should be built into the handle.

The explicit destination operand is populated with information on the source of the key and its attributes. XMM4 through XMM6 are reserved for future usages and software should not rely upon them being zeroed.

Operation

```
ENCODEKEY256 (DEST, SRC) {
    #GP (0) if a reserved bit in SRC[31:0] is set
    InputKey[255:0] :=XMM1:XMM0;
    KeyMetadata[2:0] = SRC[2:0];
    KeyMetadata[23:3] = 0; // Reserved for future usage
    KeyMetadata[27:24] = 1; // KeyType is AES-256 (value of 1)
    KeyMetadata[127:28] = 0; // Reserved for future usage
    // KeyMetadata is the AAD input and InputKey is the Plaintext input for WrapKey128
    Handle[511:0] := WrapKey256(InputKey[255:0], KeyMetadata[127:0], IWKey.Integrity
        Key[127:0], IWKey.Encryption Key[255:0]);
    DEST[0] := IWKey.NoBackup;
    DEST[4:1] := IWKey.KeySource[3:0];
    DEST[31:5] = 0;
    XMM0 := Handle[127:0]; // AAD
    XMM1 := Handle[255:128]; // Tag
    XMM2 := Handle[383:256]; // CipherText[127:0]
    XMM3 := Handle[511:384]; //CipherText[255:128]
    XMM4 := 0; // Reserved for future usage
    XMM5 := 0; // Reserved for future usage
    XMM6 := 0; Integrity// Reserved for future usage
    RFLAGS.OF, SF, ZF, AF, PF, CF := 0;
}
```

SRC[31:3] are currently reserved for future usages. SRC[2], which indicates a no-decrypt restriction, is reserved if CPUID.19H:EAX[2] is 0. SRC[1], which indicates a no-encrypt restriction, is reserved if CPUID.19H:EAX[1] is 0. SRC[0], which indicates a CPL0-only restriction, is reserved if CPUID.19H:EAX[0] is 0.

Flags Affected

All arithmetic flags (OF, SF, ZF, AF, PF, CF) are cleared to 0. Although they are cleared for the currently defined operations, future extensions may report information in the flags.

Exceptions

| | |
|---|---|
| #GP | If reserved bit is set in source register value. |
| #UD | If the LOCK prefix is used. |
| | If CPUID.07H:ECX.KL [bit 23] = 0. |
| | If CR4.KL = 0. |
| | If CPUID.19H:EBX.AESKLE [bit 0] = 0. |
| | If CR0.EM = 1. |
| | If CR4.OSFXSR = 0. |
| #NM | If CR0.TS = 1. |

Intrinsics unsigned int _mm_encodekey256_u32(unsigned int htype, __m128i key_lo, __m128i key_hi, void* h);

LOADIWKEY

| Opcode/Instruction | Op/En | 64/32-bit Mode Support | CPUID Flag | Description |
|---|---|---|---|---|
| F3 0F 38 DC 11:rrr:bbb LOADIWKEY xmm1, xmm2, <EAX>, <XMM0> | A | V/V | AESKLE | Load internal wrapping key from xmm1, xmm2, and XMM0. |

Instruction Operand Encoding

| Op/En | Tuple | Operand 1 | Operand 2 | Operand 3 | Operand 4 |
|---|---|---|---|---|---|
| A | NA | ModRM:reg (r) | ModRM:r/m (r) | Implicit EAX (r) | Implicit XMM0 (r) |

Description

The LOADIWKEY instruction writes the Key Locker internal wrapping key, which is called IWKey. This IWKey is used by the ENCODEKEY* instructions to wrap keys into handles. Conversely, the AESENC/DEC* instructions use IWKey to unwrap those keys from the handles and verify the handle integrity. For security reasons, no instruction allows software to directly read the IWKey value.

IWKey includes two cryptographic keys as well as metadata. The two cryptographic keys are loaded from register sources so that LOADIWKEY can be executed without the keys ever being in memory.

The key input operands are:
The 256-bit encryption key is loaded from the two explicit operands.
The 128-bit integrity key is loaded from the implicit operand XMM0.

The implicit operand EAX specifies the KeySource and whether backing up the key is permitted:
EAX[0]—When set, the wrapping key being initialized is not permitted to be backed up to platform-scoped storage.
EAX[4:1]—This specifies the KeySource, which is the type of key. Currently only two encodings are supported. A KeySource of 0 indicates that the key input operands described above should be directly stored as the internal wrapping keys. LOADIWKEY with a KeySource of 1 will have random numbers from the on-chip random number generator XORed with the source registers (including XMM0) so that the software that executes the LOADIWKEY does not know the actual IWKey encryption and integrity keys. Software can choose to put additional random data into the source registers so that other sources of random data are combined with the hardware random number generator supplied value. Software should always check ZF after executing LOADIWKEY with KeySource of 1 as this operation may fail due to it being unable to get sufficient full-entropy data from the on-chip random number generator. Both KeySource of 0 and 1 specify that IWKey be used for and only for the AES-GCM-SIV algorithm. CPUID.19H.ECX[1] enumerates support for KeySource of 1. All other KeySource encodings are reserved.
EAX[31:5]—Reserved.

Operation

```
LOADIWKEY (SRC1, SRC2) {
    IF CPL > 0 { // LOADKWKEY only allowed at ring 0 (supervisor mode)
        #GP (0);
    }
    IF "LOADIWKEY exiting" VM execution control set {
        VMexit;
    }
    IF EAX[4:1] > 1 { // Reserved KeySource encoding used
        #GP (0);
    }
    IF EAX[31:5] != 0 { // Reserved bit in EAX is set
        #GP (0);
    }
    IF EAX[0] AND (CPUID.19H.ECX[0] == 0) { // NoBackup is not supported on this part
        #GP (0);
    }
    IF (EAX[4:1] == 1) AND (CPUID.19H.ECX[1] == 0) { // KeySource of 1 is not
supported on this part
        #GP (0);
    }
    IF (EAX[4:1] == 0) { // KeySource of 0.
        IWKey.Encryption Key[127:0] := SRC2[127:0]:
        IWKey.Encryption Key[255:128] := SRC1[127:0];
        IWKey.IntegrityKey[127:0] := XMM0[127:0];
        IWKey.NoBackup = EAX [0];
        IWKey.KeySource = EAX [4:1];
        RFLAGS.ZF := 0;
    } ELSE { // KeySource of 1. See RDSEED definition for details of randomness
        IF HW_NRND_GEN.ready == 1 { // Full-entropy random data from RdSeed was
received
            IWKey.Encryption Key[127:0] := SRC2[127:0] XOR
            HW_NRND_GEN.data[127:0];
            IWKey.Encryption Key[255:128] := SRC1[127:0] XOR
            HW_NRND_GEN.data[255:128];
            IWKey.Encryption Key[255:0] := SRC2[127:0]:SRC1[127:0] XOR
            HW_NRND_GEN.data[255:0];
            IWKey.IntegrityKey[127:0] := XMM0[127:0] XOR
            HW_NRND_GEN.data[383:256];
            IWKey.NoBackup = EAX [0];
            IWKey.KeySource = EAX [4:1];
            RFLAGS.ZF := 0;
        } ELSE { // Random data was not returned from RdSeed. IWKey was not
loaded
            RFLAGS.ZF := 1;
        }
    }
    RFLAGS.OF, SF, AF, PF, CF := 0;
}
```

Flags Affected

ZF is set to 0 if the operation succeeded and set to 1 if the operation fails due to full-entropy random data not being received from RdSeed. The other arithmetic flags (OF, SF, AF, PF, CF) are cleared to 0.

Exceptions

| #GP | If CPL > 0. |
| | If EAX[4:1] > 1. |
| | If EAX[31:5] != 0. |
| | If (EAX[0] == 1) AND (CPUID.19H.ECX[0] == 0). |
| | If (EAX[4:1] == 1) AND (CPUID.19H.ECX[1] == 0). |
| #UD | If the LOCK prefix is used. |
| | If CPUID.07H:ECX.KL [bit 23] = 0. |
| | If CR4.KL = 0. |
| | If CR0.EM = 1. |
| | If CR4.OSFXSR = 0. |
| #NM | If CR0.TS = 1. |

Intrinsics void_mm_loadiwkey(unsigned int ctl, __m128i intkey, __m128i enkey_lo, __m128i enkey_hi);

Backup MSRs

Backing Up and Restoring the Internal Wrapping Key

When IWKeyBackup support is enumerated, the logical processor scoped IWKey can be copied to or from a platform-scope state called IWKeyBackup. Copying IWKey to IWKeyBackup is called 'backing up IWKey' and copying IWKeyBackup to IWKey is called 'restoring IWKey'.

IWKeyBackup and the path between it and IWKey are protected against software and simple hardware attacks (e.g., encrypted and integrity protected on physical buses between sockets). This means that IWKeyBackup can be used to distribute an IWKey within the logical processors in a platform in a protected manner. One logical processor can write IWKey with a secret value and then back up that IWKey to IWKeyBackup. The other logical processors can then copy IWKeyBackup to their own IWKey.

IWKeyBackup is also maintained across S3 (sleep) and S4 (hibernate) sleep states on platforms supporting those states. This allows the OS to use IWKeyBackup to back up a platform's IWKey across S3 and S4 sleep states to maintain handles using that IWKey across those sleep states.

IWKeyBackup may also be maintained across S5 (soft off) and G3 (mechanical off) state on some systems, but this is not architecturally guaranteed and thus software should not depend on that. Because it may be maintained, software that needs to ensure that all handles are truly revoked (e.g., before powering off the system) should overwrite IWKeyBackup in order to ensure that it cannot be later used to restore the IWKey needed to make those handles work.

It is also possible for a VMM to use IWKeyBackup to maintain the host's IWKey so that it can be restored after executing a guest (which ran with the guest's IWKey loaded). Because of the high latency of copying to and from IWKeyBackup on current processors, this would not be performant to execute frequently (e.g., before each VM entry or after each VM exit) and these MSRs should not be included in VM entry or VM exit MSR load areas.

Backing up or restoring IWKey involves several MSRs, all of which are enumerated by CPUID.19H:EBX[4]:

IA32_COPY_LOCAL_TO_PLATFORM (write-only, address D91H)

IA32_COPY_PLATFORM_TO_LOCAL (write-only, address D92H)

IA32_COPY_STATUS (read-only, address 990H)

IA32_IWKEYBACKUP_STATUS (read-only, address 991H)

IA32_COPY_LOCAL_TO_PLATFORM is a write-only MSR that can be used to issue commands to copy data from the current logical processor to a platform scoped state. It can be used to copy IWKey for this logical processor to the IWKeyBackup register for the platform.

IA32_COPY_PLATFORM_TO_LOCAL is a write-only MSR that can be used to issue commands to copy data from platform scoped state to the current logical processor. It can be used to copy IWKeyBackup for the platform to the IWKey for this logical processor.

IA32_COPY_STATUS is a read-only logical processor scoped MSR that indicates whether the most recent write to IA32_COPY_PLATFORM_TO_LOCAL or IA32_COPY_LOCAL_TO_PLATFORM executed from this logical processor succeeded or failed.

IA32_IWKEYBACKUP_STATUS is a read-only MSR that indicates attributes of IWKeyBackup.

On some systems, system firmware enabling of Key Locker may be needed in order for CPUID.19H:EBX[4] to enumerate as 1.

IA32_COPY_LOCAL_TO_PLATFORM MSR

IA32_COPY_LOCAL_TO_PLATFORM MSR supports copying IWKey content to the IWKeyBackup register when a WRMSR sets IA32_COPY_LOCAL_TO_PLATFORM [0]. It is possible for this write to fail, for example because IWKey.NoBackup is set, so software should always check after a write that it succeeded.

Software can determine whether a copy of IWKey to IWKeyBackup succeeded through checking IA32_COPY_STATUS[0] immediately after the WRMSR to set IA32_COPY_LOCAL_TO_PLATFORM[0]. A value of 1 in IA32_COPY_STATUS[0] indicates that the write to IWKeyBackup succeeded.

IWKeyBackup also includes an integrity measurement. It may be possible to corrupt IWKeyBackup due to two simultaneous writes from different logical processors that are writing different values. It is also possible to corrupt an IWKeyBackup read (restore) due to that read occurring simultaneously with a write of a different value. Because of the IWKeyBackup integrity measurement, the CPU can detect that the IWKeyBackup read would be of a corrupted value and will not mark the read valid (meaning IA32_COPY_STATUS[0] will be 0) or modify IWKey in that situation.

After IWKeyBackup is written, the platform will ensure it is written to persistent storage which is maintained across S3 or S4 sleep states. When in persistent storage, it will be encrypted, integrity protected and (when available) replay protected. An older write to IWKeyBackup (IA32_COPY_LOCAL_TO_PLATFORM[0] set) that has not yet completed updating the persistent storage (and thus has not yet set IA32_IWKEYBACKUP_STATUS[Backup/Restore Valid] may cause younger writes to fail.

Although younger writes to IWKeyBackup may be blocked by an older write that has not yet updated the persistent storage, reads are not blocked. A read of IWKeyBackup (using IA32_COPY_PLATFORM_TO_LOCAL [0]) may be initiated (e.g., on another logical processor) as soon as a write is verified to have completed successfully (IA32_COPY_STATUS[0] was set).

| Register address | | Architectural MSR | MSR/Bit | |
|---|---|---|---|---|
| Hex | Decimal | Name/Bit Fields | Description | Comment |
| D91 | 3473 | IA32_COPY_LOCAL_TO_PLATFORM | Copy local state to platform state (W) | IF ((CPUID.19H:EBX[4] == 1) && (CPUID.(07H,0).ECX[23] == 1)) |
| | | 0 | IWKeyBackup - Copy IWKey to IWKeyBackup | IF ((CPUID.19H:EBX[4] == 1) && (CPUID.(07H,0).ECX[23] == 1)) |
| | | 63:1 | Reserved | |

IA32_COPY_PLATFORM_TO_LOCAL MSR

IA32_COPY_PLATFORM_TO_LOCAL MSR supports copying IWKeyBackup content (a platform register) to the IWKey register of the current logical processor when a WRMSR sets IA32_COPY_PLATFORM_TO_LOCAL[0]. It is possible for this write to fail, for example if it is reading IWKeyBackup simultaneously with a write to IWKeyBackup, so software should always check after the write that it succeeded. Software can determine whether a copy of IWKeyBackup to IWKey succeeded through checking IA32_COPY_STATUS[0] after the WRMSR to set IA32_COPY_PLATFORM_TO_LOCAL[0]; a value of 1 in IA32_COPY_STATUS[0] indicates that the write to IWKey succeeded.

| Register address | | Architectural MSR | MSR/Bit | |
|---|---|---|---|---|
| Hex | Decimal | Name/Bit Fields | Description | Comment |
| D92 | 3474 | IA32_COPY_PLATFORM_TO_LOCAL | Copy platform state to local state (W) | IF ((CPUID.19H:EBX [4] == 1) && (CPUID.(EAX=07H, ECX=0H).ECX[23] == 1)) |
| | | 0 | IWKeyBackup - Copy IWKeyBackup to IWKey | IF ((CPUID.19H:EBX [4] == 1) && (CPUID.(EAX=07H, ECX=0H).ECX[23] == 1)) |
| | | 63:1 | Reserved | |

IA32_COPY_STATUS MSR

Each bit in the read-only IA32_COPY_STATUS MSR at address 990H indicates whether the most recent command executed through the corresponding bit in IA32_PLATFORM_TO_LOCAL MSR or IA32_LOCAL_TO_PLATFORM MSR was successful (a value of 1) or unsuccessful (a value of 0). The reset value is 0.

This MSR is logical processor scoped and can be read immediately after an MSR write to cause a backup or restore operation. It is cleared by cold/warm reset and unaffected by INIT.

| Register address | | Architectural MSR | MSR/Bit | |
|---|---|---|---|---|
| Hex | Decimal | Name/Bit Fields | Description | Comment |
| 990 | 2448 | IA32_COPYS_STATUS | Status of most recent platform to local or local to platform copies | IF ((CPUID.19H:EBX[4] == 1) && (CPUID.(07H,0).ECX [23] == 1)) |

-continued

| Register address | | Architectural MSR | MSR/Bit | |
|---|---|---|---|---|
| Hex | Decimal | Name/Bit Fields | Description | Comment |
| | | 0 | IWKEY_COPY_SUCCESSFUL: Status of most recent copy to or from IWKeyBackup | IF ((CPUID.19H:EBX[4] == 1) && (CPUID.(07H,0).ECX[23] == 1)) |
| | | 63:1 | Reserved | |

IA32_IWKEYBACKUP_STATUS MSR

The IA32_IWKEYBACKUP_STATUS MSR (read-only, platform scoped) provides information about the status of the Key Locker IWKeyBackup register. It is cleared on a successful copy of IWKey to IWKeyBackup by any logical processor (one that sets IA32_COPY_STATUS[IWKEY_COPY_SUCCESSFUL]) and becomes evaluated again at a later point. It is also cleared by cold/warm reset and unaffected by INIT.

| Register address | | Architectural MSR | MSR/Bit | |
|---|---|---|---|---|
| Hex | Decimal | Name/Bit Fields | Description | Comment |
| 991 | 2449 | IA32_IWKEYBACKUP_STATUS | Information about IWKeyBackup register | IF ((CPUID.19H:EBX[4] == 1) && (CPUID.(07H,0).ECX[23] == 1)) |
| | | 0 | Backup/restore valid. Cleared when a write to IWKeyBackup is initiated, and then set when the latest write of IWKeyBackup has been written to storage that persists across S3/S4 sleep state. If S3/S4 is entered between when an IWKeyBackup write occurs and when this bit is set, then IWKeyBackup may not be recovered after S3/S4 exit. During S3/S4 sleep state exit (system wakeup), this bit is cleared. It is set again when IWKeyBackup is restored from persistent storage and thus available to be copied to IWKey using IA32_COPY_PLATFORM_TO_LOCAL MSR. Another write to IWKeyBackup (via IA32_COPY_LOCAL_TO_PLATFORM MSR) may fail if a previous write has not yet set this bit. | IF ((CPUID.19H:EBX[4] == 1) && (CPUID.(07H,0).ECX[23] == 1)) |
| | | 1 | Reserved | |
| | | 2 | Backup key storage read/write error. Updated prior to backup/restore valid being set. Set when an error is encountering backing up or restoring a key. | IF ((CPUID.19H:EBX[4] == 1) && (CPUID.(07H,0).ECX[23] == 1)) |
| | | 3 | IWKeyBackup consumed. Set after the previous backup operation has been consumed by the platform. This does not indicate that the system is ready for a second IWKeyBackup write as the previous IWKeyBackup write may still need to set Backup/restore valid. | IF ((CPUID.19H:EBX[4] == 1) && (CPUID.(07H,0).ECX[23] == 1)) |
| | | 63:4 | Reserved | |

OS Enabling
  OS Boot
  On processors where CPUID.KL is enumerated, the OS boot process should set CR4.KL and then execute LOADIWKEY with a random number as input. When support for HW randomized IWKey and IWKeyBackup is enumerated (CPUID.19H.ECX[I] and CPUID.19H.EBX[4] are both set), software may wish LOADIWKEY to specify a KeySource of 1 in order to have hardware random numbers be combined with whatever is specified by software (e.g., random numbers from a software defined pool). When specifying a KeySource of 1, software should check after LOADIWKEY that RFLAGS.ZF is 0 and retry the LOADIWKEY if RFLAGS.ZF is 1 (which indicates that a lack of availability of full-entropy data caused LOADIWKEY to not complete). If repeated LOADIWKEYs do not succeed (RFLAGS.ZF set each time), then full-entropy data from the on-chip random number generator was unavailable and software may wish to instead use a KeySource of 0.

The OS should not allow applications to execute with CR4.KL set unless LOADIWKEY successfully loaded as applications may presume that IWKey is properly initialized when CR4.KL is set.

An OS should ensure that the IWKey is the same on each logical processor so that an application's handles work regardless of which logical processor it is executing on. This can be done by using a software specified IWKey (KeySource of 0) and passing that through memory to the other logical processors so that each can execute LOADIWKEY with the same value. Alternatively, it can be done by executing LOADIWKEY on one logical processor, then copying the IWKey from that logical processor to IWKeyBackup by using IA32_COPY_LOCAL_TO_PLATFORM MSR, and then, on every other logical processor, copying to IWKey from IWKeyBackup using IA32_COPY_PLATFORM_TO_LOCAL MSR. Software can immediately do a copy to IWKey from IWKeyBackup after a successful backup (write) to IWKeyBackup completed (IA32_COPY_STATUS[0] was set on the writing logical processor), without needing to check IA32_IWKEYBACKUP_STATUS MSR. A second write to IWKeyBackup may need to wait until the previous write has completed and set IA32_IWKEY_BACKUP_STATUS [Backup/Restore Valid]. Most usages will not need to do a second write to IWKeyBackup soon after boot, but it may occur when a system quickly does a kernel soft reset or revokes the handles by overwriting all IWKeys as well as IWKeyBackup; in particular in artificial test environments. IWKeyBackup supports both software specified IWKey (KeySource of 0) as well as keys combined with data from the on-chip hardware random number generator(KeySource of 1) and is enumerated through CPUID.19H.EBX[4].

By loading IWKey early in the boot process (before most software components are loaded) and not recording the IWKey value, vulnerabilities in later loaded software components will not be able to single step the system to watch the IWKey value being loaded (as the IWKey loading has already occurred).

On some platforms, system firmware enabling may be needed for Key Locker to be used. On such platforms, if the system firmware has not properly enabled Key Locker then CPUID.AESKLE may stay 0 even though CR4.KL is set. It is also possible that some systems will not enumerate support for IWKeyBackup if system firmware did not properly enable Key Locker.

On systems that support S3 and S4 sleep states, the OS may want to copy the LoadIWKey value to IWKeyBackup by setting IA32_COPY_LOCAL_TO_PLATFORM[0] at boot. This gives the platform more time to write IWKeyBackup into persistent storage (and set IA32_IWKEYBACKUP_STATUS[0]) before there is a request to enter S3 or S4 sleep states (in order that entry to those sleep states is not delayed. Platforms that support S3 and S4 sleep states but do not support IWKeyBackup may need to find some other means to maintain the IWKey across the S3/S4 sleep states. If no other means is available, they may choose to not enable Key Locker.

OS Shutdown
  Shutting down the system (either S5 soft off or G3 mechanical off) involves closing all applications and thus is a good time to revoke handles. Although the next boot of the OS will normally load a new IWKey and thus revoke those handles, some security usage models may not want to trust that next boot of the OS to perform that revocation (e.g., in case the OS is swapped with a malicious one).

In order to ensure that an attacker cannot re-use any handles across the shutdown even in such situations, the OS can overwrite IWKey and IWKeyBackup before powering off the system. Specifically, it can use LOADIWKEY on each logical processor to overwrite IWKey (e.g., with zeroes or a new random value) and can copy an overwritten IWKey from one of those logical processors to IWKeyBackup using IA32_COPY_LOCAL_TO_PLATFORM[0]. Note that this write to IWKeyBackup may fail if a previous write to IWKeyBackup (e.g., the boot write) has not already completed and set IA32_IWKEY_BACKUP_STATUS[Backup/Restore Valid]. Before resetting the processor, software can ensure that this new overwriting of IWKeyBackup has overwritten its persistent storage copy by waiting for IA32_IWKEYBACKUP_STATUS[Backup/Restore Valid] to be set again.

Entering S3 or S4 System Sleep States (Sleep or Hibernate)
  Entering S3 (sleep) or S4 (hibernate) states will power off all processors and thus will lead to losing the IWKey (as it is cleared by reset when the system is powered back on). In order to maintain IWKey (so that application handles created before entering S3 or S4 continue to work after waking up), software should make sure that IWKeyBackup is written (e.g., at boot) and IA32_IWKEYBACKUP_STATUS [Backup/Restore Valid] is set so that it is maintained across S3/S4. If there was an error when writing to persistent storage, then IA32_IWKEYBACKUP_STATUS[Backup key storage read/write error] will be set.

Exiting S3 or S4 System Sleep States (Waking from Sleep or Hibernate)
  On waking up from S3 or S4 sleep states, the OS will want to recover the previous IWKey so that application handles created before entering S3/S4 state continue to work after waking up from S3/S4.

If the previous IWKeyBackup completed its write to persistent storage before entering S3/S4 sleep states, then the restoration process will automatically start on exiting S3/S4 sleep states.

The OS should check that IWKeyBackup is ready to be copied by waiting until IA32_IWKEYBACKUP_STATUS [Backup/Restore Valid] is set. When IWKeyBackup is ready, WRMSR to set IA32_COPY_PLATFORM_TO_LOCAL[0] can be executed on each logical processor in order to restore IWKey on those logical processors. If the OS is unable to properly restore IWKey after an S3/S4 (e.g., IA32_IWKEYBACKUP_STATUS[Backup/restore valid] is not set after a retry or the IWKey restore from IWKey- Backup fails), then it may want to log an error and either clear CR4.KL or shutdown the system.

Application Enabling

Applications can either directly use the Key Locker instructions or can use a software library that allows selecting Key Locker for maintenance of its AES keys.

Software can use CPUID.AESKLE to determine that the system and OS support Key Locker. This CPUID bit is only set when the OS has set CR4.KL. Any OS which has done that should also have written IWKey to a random value. Note that if IWKey is not initialized (and thus all of its fields are 0), then an ENCODEKEY128 with input of 0 will create a handle with an integrity tag of 0x8720849214a248ad_898940a278c095dc and ciphertext of 0xd3e9d22b334fb3c2_3382228c8474c308. The AES GCM SIV algorithm's integrity check may require a non-zero IWKey to properly detect changes in the handle.

Once the application has obtained the AES key that it wants to use (e.g., the result of key negotiation with another entity or what is unsealed from a TPM), it should use ENCODEKEY128 (for 128-bit AES key) or ENCODE-KEY256 (for 256-bit AES key) to create the handle. Handle restrictions (e.g., no-encrypt or no-decrypt) can be specified through the SRC register.

Along with the handle, ENCODEKEY128 and ENCODEKEY256 also produce information about the IWKey used to create the handle. For example, bit 0 of the destination register indicates whether IWKey is forbidden from being written to IWKeyBackup. A value of 0 in bits 4:1 of the destination register indicates that the IWKey used to protect this handle was specified by system software and a value of 1 indicates that the IWKey is random and thus is not known by any software (including system software).

Intel SGX enclaves that do not have system software within their trust boundary can refuse to use an IWKey that does not use the on-chip hardware random number generator in order to ensure that Key Locker handles provide defense in depth against system software attackers that also obtain the handle; but this may limit Key Locker usage. An attacker knowing the IWKey (e.g., a system software attacker that loaded IWKey to an attacker specified value) does not by itself allow them to deduce handles/keys, but an attacker that has both a handle and IWKey can derive the original AES key by unwrapping the handle.

When the application wishes to perform encryption or decryption instructions, it should pass the handle along with the corresponding plaintext or ciphertext to the AES*KL instructions. Software doing parallel AES operations (like AES-CTR mode) may wish to use the wide instructions in order to encrypt/decrypt multiple blocks in parallel. Software doing serial AES operations (like AES-CBC encryption) should use the non-wide instructions. As an example, software doing an AES CBC encryption using a 256-bit AES key should use AESENC256KL.

If a handle or IWKey becomes corrupted (e.g., through malicious system software that changes the IWKey) or a restriction is violated, the AES*KL fails and sets RFLAGS.ZF. In this situation, the destination is unmodified and thus holds plaintext (if an encryption operation is being performed) or ciphertext (if a decryption operation is being performed). Software should thus be careful to check that ZF is 0 after each execution of an AES*KL instruction.

The application should protect the handle as it would normally protect a key; even though it cannot be used remotely or after handle revocation, it could still be used by an adversary on that system until handles are revoked (by the OS or VMM overwriting IWKey and any backup of it).

Virtualization Support

Virtualization Strategies

A VMM may need the ability to be able to context switch and migrate guests as well as have the ability to save a guest to disk and resume it later (e.g., after the host has rebooted and thus revoked its handles).

A VMM can do this by causing a VM exit when a guest loads IWKey and recording the IWKey that the guest expects. The VMM can then load this IWKey (using LOAD-IWKEY) before running that guest. This may mean doing a LOADIWKEY on each context switch to a guest that is using Key Locker (has CR4.KL set).

Note that a VMM may wish to enumerate no support for hardware generated random IWKeys to the guest (i.e., enumerate CPUID.19H:ECX[1] as 0) as such IWKeys cannot be easily context switched. A guest ENCODEKEY* will return the type of IWKey used (IWKey.KeySource) and thus will notice if a VMM virtualized a hardware generated random IWKey with a software specified IWKey.

Although a system using virtualization may need to hold the IWKey of guests so that they can be loaded on guest context switch, an attacker of a guest not only needs to recover the handle but also needs to observe the IWKey values maintained by the VMM in order to unwrap that handle and recover the AES key. This is more difficult for an attacker than simply stealing the handle.

Because the IWKey cannot be directly read from the processor, a VMM that starts after IWKey is loaded is unable to determine that IWKey value. If the VMM is also using Key Locker (separate from guest usage), then each loading of a guest IWKey will overwrite the VMM's IWKey. The VMM that needs to use Key Locker may either save away its own IWKey in memory/registers (which would impact security as an adversary that can observe arbitrary VMM memory may be able to steal both the handles and IWKey as well as require the VMM to be running before the first IWKey load) or use IWKeyBackup to restore its own IWKey before using VMM handles or not allow guest usage of Key Locker (so that no guest IWKey needs to be loaded). Initial implementations may take a significant amount of time to perform a copy of IWKey-Backup to IWKey (via an MSR write to IA32_COPY_PLATFORM_LOCAL[0]) so it may cause a significant performance impact to reload IWKey after each VM exit. It is thus recommended that VMMs only restore IWKey right before needing to use a handle, or even avoid using Key Locker for VMM usages if Key Locker is enumerated to guests (so that either the VMM uses Key Locker or the guests use Key Locker but not both).

The VMM can use the MSR bitmap to catch guest usage of IA32_COPY_LOCAL_TO_PLATFORM, IA32_COPY_PLATFORM_TO_LOCAL, IA32_COPY_STATUS, and IA32_IWKEYBACKUP_STATUS MSRs. They can be virtualized through software recording the guest expectation of IWKeyBackup as well as IWKey. This avoids the guest needing to actually read or write the actual platform IWKey-Backup; the guest interaction would be with the virtual IWKeyBackup.

VMMs that are unaware of Key Locker should not allow guests to set CR4.KL (as the VMM should already be preventing guests from setting CR4 bits for which the VMM is not aware). This will ensure that Key Locker instructions generate a #UD exception on guests of such VMMs.

Tertiary Processor-Based VM-Execution Controls

A new 64-bit vector of controls is defined to govern the handling of synchronous events, mainly those caused by the execution of specific instructions. This vector is called the tertiary processor-based VM-execution controls. Software can use the VMREAD and VMWRITE instructions to access the tertiary processor-based VM-execution controls using the encoding pair 2034H/2035H.

Bit 17 of the primary processor-based VM-execution controls is defined as "activate tertiary controls." It determines whether the tertiary processor-based VM-execution controls are used. If that bit is 0, VM entry and VMX non-root operation function as if all the tertiary processor-based VM-execution controls were 0. Processors that support only the 0-setting of bit 17 of the primary processor-based VM-execution controls do not support the tertiary processor-based VM-execution controls. Thus, a processor supports the tertiary processor-based VM-execution controls if and only if IA32_VMX_PROCBASED_CTLS[49]=1. If IA32_VMX_BASIC[55]=1, the IA32_VMX_TRUE_PROCBASED_CTLS MSR exists and is identical to IA32_VMX_PROCBASED_CTLS in bit positions 63:32. Thus, if IA32_VMX_BASIC[55]=1, a processor supports the tertiary processor-based VM-execution controls if and only if IA32_VMX_TRUE_PROCBASED_CTLS [49]=1.

Processors that support the tertiary processor-based VM-execution controls also support the IA32_VMX_PROCBASED_CTLS3 MSR (index 492H). This MSR enumerates the allowed 1-settings of these controls. Specifically, VM entry allows bit X of the tertiary processor-based VM-execution controls to be 1 if and only if bit X of the MSR is set to 1. If bit X of the MSR is cleared to 0, VM entry fails if control X and the "activate tertiary controls" primary processor-based VM-execution control are both 1.

LOADIWKEY VM Exiting

For a VMM to capture the IWKey values of guests, processors that support Key Locker also support a new "LOADIWKEY exiting" VM-execution control in bit 0 of the tertiary processor-based VM-execution controls. A processor that supports the 1-setting of this control if it sets bit 49 of the IA32_VMX_PROCBASED_CTLS MSR and bit 0 of the IA32_VMX_PROCBASED_CTLS3 MSR.

If the "activate tertiary controls" VM-execution control and the "LOADIWKEY exiting" VM-execution control are both 1, an execution of LOADIWKEY in VMX non-root operation causes a VM exit. Such a VM exit uses a basic exit reason of 45H (69 decimal) but no exit qualification. The length of the instruction is stored in the VM-exit instruction-length field and information about the instruction operands is stored in the VM-exit instruction-information field (details are provided in Table 6).

TABLE 6

Format of the VM-Exit Instruction-Information Field as Used for LOADIWKEY

| Bit Position(s) | Contents |
|---|---|
| 2:0 | Reserved |
| 6:3 | Reg1:<br>0 = XMM0<br>1 = XMM1<br>. . .<br>7 = XMM7<br>8-15 represent XMM8-XMM15, respectively (used only on processors that support Intel ® 64 architecture) |
| 9:7 | Undefined |
| 10 | Set to 1 (reg format) |

TABLE 6-continued

Format of the VM-Exit Instruction-Information Field as Used for LOADIWKEY

| Bit Position(s) | Contents |
|---|---|
| 14:11 | Undefined |
| 17:15 | Undefined (Segreg) |
| 27:18 | Undefined (IndexReg and BaseReg) |
| 31:28 | Reg2:<br>0 = XMM0<br>1 = XMM1<br>. . .<br>7 = XMM7<br>8-15 represent XMM8-XMM15, respectively (used only on processors that support Intel 64 architecture) |

Key Locker Performance

Serial algorithm modes like AES CBC encryption should use instructions that encrypt or decrypt a single block at a time (e.g., AESENC128KL), while parallel algorithm modes like AES CTR or AES GCM should use instructions that encrypt or decrypt multiple blocks at a time (e.g., AESENCWIDE128KL).

In order to improve performance, the processor may store recently used handles and their associated keys or round keys for the currently loaded IWKey in a 'handle cache'. For security reasons, this handle cache is not accessible except through using the Key Locker instructions; the keys or round keys cannot be directly read by software. The size of the handle cache may differ between implementations.

Key Locker Security Properties

Key Locker is designed to prevent an attacker who breaks into a system after a key is wrapped from being able to use that wrapped key after revocation, or on another system, or in violation of the specified handle restrictions (e.g., at ring 3 for a handle restricted to ring 0).

When used outside of a Trusted Execution Environment (TEE), an attacker who breaks into system before the key is wrapped may be able to observe the key before it is turned into a handle (e.g., through single stepping and watching the ENCODEKEY* instruction inputs), or observe the IWKey that is used to protect the Key Locker handles (e.g., through single stepping and watching the LOADIWKEY inputs when KeySource of 0 is used).

Key Locker may be particularly effective in protecting the key when the key is turned into a handle early in the boot process, as less software being loaded also means less victims for an attacker to target in order to escalate privileges or find an information disclosure. However, Key Locker should also reduce risk when used later due to the drastic reduction of when the key can be disclosed (only before the handle is generated instead of during the entire lifetime of the key).

ENCODEKEY* instructions take the key value from registers instead of memory in order to support software that wants to avoid storing the key to memory until it is protected by being wrapped into a Key Locker handle.

Key Locker handles contain integrity measurements so that any attempt to change the handle (e.g., changing the restrictions) is detected. These measurements also detect using the wrong key size or using a different IWKey than the handle was created with. Software should use care to check the ZF after each operation in order to detect these cases.

Key Locker does not prevent denial of service by more privileged system software overwriting the IWKey or IWKeyBackup. There are many existing methods for more privileged software to deny execution to less privileged software.

Key Locker does not prevent usage of a wrapped key in ways allowed by the handle restrictions unless the IWKey was revoked. Revoking a Key Locker handle involves overwriting the IWKey value used to create the handle. This may include overwriting the IWKey value on other logical processors (if they contain it), as well as overwriting the IWKey value in IWKeyBackup (if the IWKey was backed up there) and waiting for the new IWKeyBackup to overwrite the persistent storage (which causes IA32_IWKEYBACKUP_STATUS[Backup/Restore valid] to be set).

Key Locker provides some level of protection against simple hardware attacks including probes of external buses but may not provide sufficient protection against attackers that are able to physically probe values within the CPU die or modify data values on external buses.

If an attacker discovers the IWKey used to generate a handle, they can unwrap the handle in order to obtain the original key, which can then be directly used by the attacker for encryption and decryption. Key Locker security relies upon keeping the IWKey secret from potential attackers.

Key Locker Usage with TEE

Trusted Execution Environments (TEE) modes can provide a secure place to execute operations. One example of such a TEE is an Intel SGX enclave. Another example is a VMX guest that runs trusted services that are isolated from other less trusted code that runs outside that VMX guest.

A Key Locker handle can be generated by ENCODE-KEY* inside a TEE in order to further guard the key being protected. This provides protection against an attacker who is already present on the system before handle generation but has not penetrated the TEE. Such an attacker cannot single step and observe the key value before it is converted into a handle since that conversion process is protected by the TEE. In order to guard TEEs which do not control IWKey (e.g., enclaves) against an attacker knowing the IWKey (as handles only provide protection against attackers who do not know the IWKey), the TEE can check the destination register after the ENCODEKEY* and refuse to run unless the IWKey has a KeySource of 1. Note that such a TEE policy may prevent that software from working with virtualization, as IWKey with a KeySource of 1 cannot be fully virtualized at this time.

A more privileged entity that changes IWKey underneath a TEE will result in the previously created handles not working for encryption or decryption and setting RFLAGS.ZF to indicate that. Usages of Key Locker should always check ZF in order to detect this. Although this could be used as a denial of service on the TEE, there already exist many techniques that more privileged entities (e.g., OSes or VMMs) can use to deny service to less privileged entities that they manage.

Some usage models may be served by having a TEE generate the key and wrap it to a handle but allowing the handle itself to be used outside of the TEE. To support usages like this, applications at ring 3 can create handles restricted to system software which runs at ring 0 usage. These usages require that the TEE and the SW using the handle both use the same IWKey. If there is no such usage, then separate IWKeys could be used for the TEE and the rest of the software (e.g., when the TEE is a separate VMX guest). This would prevent the handles of the TEE from being used by software outside of the TEE if they are stolen (e.g., through an information attack), provided that the attacker is not also able to steal the IWKey value used for the TEE.

A TEE that trusts the IWKey when it is first launched, but not when it is later called (due to concerns of a later privilege escalation attack that overwrites the IWKey with a known non-random value) may be able to generate a handle of a known value when it is first called. It can later use that handle to confirm that the IWKey that was used early in the boot is still the current IWKey. This may be less effective if the attacker is able to single step the TEE as it may be able to restore the original IWKey only when the TEE is checking the IWKey and use the attacker-known IWKey the rest of the time.

Ability of Other Software to Use Handles

Key Locker handles are linked to the IWKey that was used to create them. This means that an attacker who steals the handle but not the original key will not be able to encrypt or decrypt with that original key (e.g., using the handle) unless they can use the stolen handle with its corresponding IWKey.

If the attacker is not able to discover the IWKey value (e.g., because it was loaded into the processor before the attacker was able to perform information disclosure or privilege escalation), then the attacker will not be able to set up that IWKey value on another system or after it is revoked; and thus will not be able to use the stolen handles on another system or after IWKey revocation. If IWKey revocation is performed on reboot, as recommended, this can prevent usage of previously obtained handles after a reboot.

If a VMM is using different IWKeys for different guests (which is expected to be the normal case), then a handle stolen from one guest will not be usable in a different attacker's guest unless the attacker also manages to obtain the IWKey from the VMM. A VMM that wishes paravirtualized guests to share handles would need to use the same IWKey for both.

It is also possible to create handles that include restrictions (e.g., a ring 0 only handle that can only encrypt and not decrypt).

Ring 0 only handles may be useful for OS keys that are not intended for usage by applications. If a malicious application manages to steal such a handle, it will be unable to use it within the application itself. Note that ring 0 handles can be created at any privilege level despite only being usable for encryption/decryption at CPL 0.

No-decrypt and no-encrypt handles may be useful in pairs where one side of a protocol only needs to create messages (with encryption) and the other side of the protocol only needs to read messages (with decryption). This would require using an AES mode that uses both AES encryption and decryption (e.g., AES-CBC) rather than an AES mode that only uses encryption (e.g., AES-CTR).

An attacker that obtains the victim's handle and is using the same IWKey as the victim can use that handle in ways allowed by the handle's restrictions. The expected usage model is to have the same IWKey for all applications, which may allow handles stolen by a different application to be used until they are revoked (e.g., by reboot). Currently, restrictions do not limit handle usage to a specific application.

CCA/CPA—Limitations of Encryption/Decryption as a Service

Although usage of Key Locker can protect the value of the key within the handle, chosen ciphertext attacks (CCA) and chosen plaintext attacks (CPA) may reveal data patterns. For example, AES ECB mode will always encrypt the same plaintext value into the same ciphertext value. Thus, an attacker who knows that a given block of ciphertext was created from a plaintext of 0 knows that other ciphertext blocks with the same value also map to plaintext of 0 and may be able to find patterns in the ciphertext.

Users of AES should be careful that the algorithm mode they select provides the necessary resistance against CCA and CPA attacks. This is true regardless of whether the key value is guarded by Key Locker or by another mechanism (e.g., using a hardware security module (HSM)).

Resistance to Side Channels

To improve performance, Key Locker instructions may use a cache of recently used handles. Although software cannot directly observe the values in the cache, usage of handles inside the cache will be faster than using handles which are not in the cache. This means that a timing-based side channel attack may be able to observe if another entity on the same processor is using the exact same handle.

Additionally, some implementations may do a partial lookup of cache entries based on a subset of the integrity tag of the handle, which can lead to different latency for handles if they match only that subset of a handle store in the Key Locker handle cache. Only bits within the bottom 64 bits of the integrity tag will be used this way. The AAD, ciphertext, and upper 64 bits of the tag will not be used for partial lookups. Because some subset of the bottom 64 bits of the tag may be used for a partial lookup, a malicious user of Key Locker instructions may be able to use a timing-based side channel attack to reveal that subset of handle bits of other Key Locker users. That is why only bits within the bottom 64 bits of the integrity tag are used for partial lookups. An attacker who is able to infer 64 bits of the integrity tag will have no information about the rest of the integrity tag or the ciphertext portion of the handle. This provides a 320-bit secure container for a 256-bit AES key and a 192-bit secure container for a 128-bit AES key. It will be more difficult for the attacker to guess the unknown bits of the handle than it would be for them to directly guess the entire AES key itself.

Although an attacker cannot use the key cache to infer enough bits of the other handle to guess their value, an attacker may theoretically be able to use the key cache to infer the pattern of handle usage of other Key Locker users on the processor.

System Firmware Enabling

SMM and SMM Transfer Monitor (STM)

Current implementations of Key Locker will not allow usage of AES Key Locker instructions in SMM. This is enumerated to SMM software through CPUID.AESKLE being 0 when in SMM, including both default treatment and dual-monitor treatment of SMIs. Future implementations that support SMM may allow CPUID.AESKLE to be 1 when in SMM to indicate that AES*KL and ENCODEKEY* instructions can be used in this mode.

Feature Config

On parts that support MSR_FEATURE_CONFIG (MSR address 13CH), AES Key Locker instructions are not available if the MSR_FEATURE_CONFIG[1:0] has a value of 11b. MSR_FEATURE_CONFIG[1:0] value of 11b will also cause CPUID.AESKLE to be 0, thus causing all AES Key Locker instructions to generate a #UD exception.

Additional Examples

At least some embodiments of the disclosed technologies can be described in view of the following examples:

Example 1. A hardware processor comprising:
    a decoder of a core to decode a single instruction into a decoded single instruction, the single instruction comprising a first input operand of a handle including a ciphertext of an encryption key (e.g., cryptographic key or other data), an authentication tag, and additional authentication data, and a second input operand of data encrypted with the encryption key; and
    an execution unit of the core to execute the decoded single instruction to:
        perform a first check of the authentication tag against the ciphertext and the additional authentication data for any modification to the ciphertext or the additional authentication data,
        perform a second check of a current request of the core against one or more restrictions specified by the additional authentication data of the handle,
        decrypt the ciphertext to generate the encryption key only when the first check indicates no modification to the ciphertext or the additional authentication data, and the second check indicates the one or more restrictions are not violated {Or look-up the original data (e.g., plaintext) in a cache. Also, an implementation may perform decryption (or lookup the plaintext in a cache) even when a check fails and simply not use the original data in that "failed check" case. Or it can start to use the original data but not return the results to the user (e.g., even speculatively in order to guard against speculative execution side channels)},
        decrypt the data encrypted with the encryption key to generate unencrypted data, and
        provide the unencrypted data as a resultant of the single instruction.

Example 2. The hardware processor of example 1, wherein the execution unit is to execute the decoded single instruction to set a flag (e.g., raise a corresponding flag) if: the first check indicates a modification to the ciphertext or the additional authentication data; or the second check indicates the one or more restrictions are violated.

Example 3. The hardware processor of example 1, wherein the decoder is to decode a second instruction into a decoded second instruction, and the execution unit is to execute the decoded second instruction to load into a register of the core an internal key used to decrypt the ciphertext.

Example 4. The hardware processor of example 3, wherein the execution unit is to execute the decoded second instruction to set a first value in the register to indicate software requested a specific key as the internal key through execution of the second instruction, and set a second value in the register to indicate software requested a random key as the internal key through execution of the second instruction.

Example 5. The hardware processor of example 3, wherein the internal key comprises an integrity key and a separate encryption key.

Example 6. The hardware processor of example 1, wherein the decoder is to decode a second instruction into a decoded second instruction, and the execution unit is to execute the decoded second instruction to generate the handle from an input of the encryption key and a handle restriction type.

Example 7. The hardware processor of example 1, wherein the additional authentication data comprises a field that indicates if the handle is not usable for encryption.

Example 8. The hardware processor of example 1, wherein the additional authentication data comprises a field that indicates if the handle is not usable for decryption.

Example 9. A method comprising:
  decoding a single instruction into a decoded single instruction with a decoder of a core of a hardware processor, the single instruction comprising a first input operand of a handle including a ciphertext of an encryption key, an authentication tag, and additional authentication data, and a second input operand of data encrypted with the encryption key; and
  executing the decoded single instruction with an execution unit of the core to:
    perform a first check of the authentication tag against the ciphertext and the additional authentication data for any modification to the ciphertext or the additional authentication data,
    perform a second check of a current request of the core against one or more restrictions specified by the additional authentication data of the handle,
    decrypt the ciphertext to generate the encryption key only when the first check indicates no modification to the ciphertext or the additional authentication data, and the second check indicates the one or more restrictions are not violated,
    decrypt the data encrypted with the encryption key to generate unencrypted data, and
    provide the unencrypted data as a resultant of the single instruction.

Example 10. The method of example 9, wherein the executing the decoded single instruction sets a flag if:
  the first check indicates a modification to the ciphertext or the additional authentication data; or
  the second check indicates the one or more restrictions are violated.

Example 11. The method of example 9, further comprising:
  decoding a second instruction into a decoded second instruction with the decoder of the core; and
  executing the decoded second instruction with the execution unit of the core to load into a register of the core an internal key used to decrypt the ciphertext.

Example 12. The method of example 11, wherein the execution unit sets a first value in the register to indicate software requested a specific key as the internal key through execution of the second instruction, and sets a second value in the register to indicate software requested a random key as the internal key through execution of the second instruction.

Example 13. The method of example 11, wherein the internal key comprises an integrity key and a separate encryption key.

Example 14. The method of example 9, further comprising:
  decoding a second instruction into a decoded second instruction with the decoder of the core; and
  executing the decoded second instruction with the execution unit of the core to generate the handle from an input of the encryption key and a handle restriction type.

Example 15. The method of example 9, wherein the additional authentication data comprises a field that indicates if the handle is not usable for encryption.

Example 16. The method of example 9, wherein the additional authentication data comprises a field that indicates if the handle is not usable for decryption.

Example 17. A non-transitory machine readable medium that stores program code that when executed by a machine causes the machine to perform a method comprising:
  decoding a single instruction into a decoded single instruction with a decoder of a core of a hardware processor, the single instruction comprising a first input operand of a handle including a ciphertext of an encryption key, an authentication tag, and additional authentication data, and a second input operand of data encrypted with the encryption key; and
  executing the decoded single instruction with an execution unit of the core to:
    perform a first check of the authentication tag against the ciphertext and the additional authentication data for any modification to the ciphertext or the additional authentication data,
    perform a second check of a current request of the core against one or more restrictions specified by the additional authentication data of the handle,
    decrypt the ciphertext to generate the encryption key only when the first check indicates no modification to the ciphertext or the additional authentication data, and the second check indicates the one or more restrictions are not violated,
    decrypt the data encrypted with the encryption key to generate unencrypted data, and
    provide the unencrypted data as a resultant of the single instruction.

Example 18. The non-transitory machine-readable medium of example 17, wherein the executing the decoded single instruction sets a flag if:
  the first check indicates a modification to the ciphertext or the additional authentication data; or
  the second check indicates the one or more restrictions are violated.

Example 19. The non-transitory machine-readable medium of example 17, further comprising:
  decoding a second instruction into a decoded second instruction with the decoder of the core; and
  executing the decoded second instruction with the execution unit of the core to load into a register of the core an internal key used to decrypt the ciphertext.

Example 20. The non-transitory machine-readable medium of example 19, wherein the execution unit sets a first value in the register to indicate software requested a specific key as the internal key through execution of the second instruction, and sets a second value in the register to indicate software requested a random key as the internal key through execution of the second instruction.

Example 21. The non-transitory machine-readable medium of example 19, wherein the internal key comprises an integrity key and a separate encryption key.

Example 22. The non-transitory machine-readable medium of example 17, further comprising:
  decoding a second instruction into a decoded second instruction with the decoder of the core; and executing the decoded second instruction with the execution unit of the core to generate the handle from an input of the encryption key and a handle restriction type.

Example 23. The non-transitory machine-readable medium of example 17, wherein the additional authentication data comprises a field that indicates if the handle is not usable for encryption.

Example 24. The non-transitory machine-readable medium of example 17, wherein the additional authentication data comprises a field that indicates if the handle is not usable for decryption.

Example 25. A hardware processor comprising:
 a decoder of a core to decode a single instruction into a decoded single instruction, the single instruction comprising an input operand of a handle including a ciphertext of original data, an authentication tag, and additional authentication data; and
 an execution unit of the core to execute the decoded single instruction to:
  perform a first check of the authentication tag against the ciphertext and the additional authentication data for any modification to the ciphertext or the additional authentication data,
  perform a second check of a current request of the core against one or more restrictions specified by the additional authentication data of the handle,
  decrypt the ciphertext to generate the original data only when the first check indicates no modification to the ciphertext or the additional authentication data, and the second check indicates the one or more restrictions are not violated,
  perform an operation on the original data to generate result data, and
  provide the result data as a resultant of the single instruction.

Example 26. The hardware processor of example 25, wherein the additional authentication data comprises a field that indicates if the handle is not usable outside an operating system.

Example 27. The hardware processor of example 25, wherein the additional authentication data comprises a field that indicates if the handle is not usable outside a specific trusted execution environment.

Example 28. The hardware processor of example 25, wherein the additional authentication data comprises a field that indicates if the handle is only usable when a specific piece of operating system controlled state is set in a specific way.

Example 29. The hardware processor of example 25, wherein the additional authentication data comprises a field that indicates if the handle is usable by a virtual machine monitor but not usable by a virtual machine.

Example 30. The hardware processor of example 25, wherein the additional authentication data comprises a field that indicates if the handle is not usable for decryption.

Example 31. An apparatus comprising:
 a decoder to decode a single instruction into a decoded single instruction, the single instruction having a first source operand to specify encrypted data and a second source operand to specify a handle including a first including ciphertext of an encryption key, an integrity tag, and additional authentication data;
 an execution unit to execute the decoded single instruction to:
  perform a first check of the integrity tag against the ciphertext and the additional authentication data for any modification to the ciphertext or the additional authentication data,
  perform a second check of a current request against one or more restrictions specified by the additional authentication data of the handle,
  decrypt the ciphertext to generate an encryption key only when the first check indicates no modification to the ciphertext or the additional authentication data and the second check indicates the one or more restrictions are not violated,
  decrypt the encrypted data with the encryption key to generate unencrypted data, and
  provide the unencrypted data as a result of the single instruction; and
 a cache to store the handle, wherein only a portion of the integrity tag is to be used in a lookup of the handle.

Example 32. The apparatus of example 31, wherein the portion of the integrity tag is half of the integrity tag.

Example 33. The apparatus of example 31, wherein the integrity tag is 128 bits and the portion of the integrity tag is 64 bits.

Example 34. The apparatus of example 31 or 32, wherein the integrity tag is bits 128 to 256 of the handle.

Example 35. The apparatus of example 34, wherein the additional authentication data is bits 0 to 127 of the handle.

Example 36. The apparatus of example 35, wherein the ciphertext is bits 256 to 383 of the handle.

Example 37. The apparatus of example 35, wherein the ciphertext is bits 256 to 511 of the handle.

Example 38. The apparatus of example 35, wherein the additional authentication data includes a field to indicate whether the handle is usable for encryption.

Example 39. The apparatus of example 35, wherein the additional authentication data includes a field to indicate whether the handle is usable for decryption.

Example 40. The apparatus of example 35, wherein the additional authentication data includes a field to indicate whether the handle is usable at a privilege level.

Example 41. The apparatus of example 35, wherein the additional authentication data includes a field to indicate a size of the ciphertext.

Example 42. The apparatus of example 41, wherein the additional authentication data includes a field to indicate whether the ciphertext is 128 bits or 256 bits.

Example 43. A method comprising:
 decoding a single instruction into a decoded single instruction with a decoder of a hardware processor, the single instruction having a first source operand to specify encrypted data and a second source operand to specify a handle including a first including ciphertext of an encryption key, an integrity tag, and additional authentication data;
 executing the decoded single instruction with an execution unit of the processor to:
  perform a first check of the integrity tag against the ciphertext and the additional authentication data for any modification to the ciphertext or the additional authentication data,
  perform a second check of a current request against one or more restrictions specified by the additional authentication data of the handle, decrypt the ciphertext to generate an encryption key only when the first check indicates no modification to the ciphertext or the additional authentication data and the second check indicates the one or more restrictions are not violated, decrypt the encrypted data with the encryption key to generate unencrypted data, provide the unencrypted data as a result of the single instruction, and store the handle in the cache; and looking up the handle from the cache based on a portion of the integrity tag.

Example 44. The method of example 43, wherein the subset of the integrity tag is half of the integrity tag.

Example 45. The method of example 43, wherein the integrity tag is 128 bits and the subset of the integrity is 64 bits.

Example 46. The method of example 43 or 44, wherein the integrity tag is bits 128 to 256 of the handle.

Example 47. The method of example 46, wherein the additional authentication data is bits 0 to 127 of the handle.

Example 48. The method of example 47, wherein the additional authentication data includes a field to indicate whether the ciphertext is bits 256 to 383 or bits 256 to 511 of the handle.

Example 49. A system comprising:

a memory to store a handle; and a processor including:
  a cache;
  a decoder to decode a single instruction into a decoded single instruction, the single instruction having a first source operand to specify encrypted data and a second source operand to specify a handle including a first including ciphertext of an encryption key, an integrity tag, and additional authentication data;
  an execution unit to execute the decoded single instruction to:
    read the handle from the memory,
    perform a first check of the integrity tag against the ciphertext and the additional authentication data for any modification to the ciphertext or the additional authentication data,
    perform a second check of a current request against one or more restrictions specified by the additional authentication data of the handle,
    decrypt the ciphertext to generate an encryption key only when the first check indicates no modification to the ciphertext or the additional authentication data and the second check indicates the one or more restrictions are not violated,
    decrypt the encrypted data with the encryption key to generate unencrypted data, and
    provide the unencrypted data as a result of the single instruction; and
    store the handle in the cache, wherein only a portion of the integrity tag is to be used in a lookup of the handle.

Example 50. The system of example 49, wherein the portion of the integrity tag is half of the integrity tag.

Example 51. An apparatus comprising:

decoder means for decoding a single instruction into a decoded single instruction, the single instruction having a first source operand to specify encrypted data and a second source operand to specify a handle including a first including ciphertext of an encryption key, an integrity tag, and additional authentication data;

execution means for executing the decoded single instruction to:
  perform a first check of the integrity tag against the ciphertext and the additional authentication data for any modification to the ciphertext or the additional authentication data,
  perform a second check of a current request against one or more restrictions specified by the additional authentication data of the handle,
  decrypt the ciphertext to generate an encryption key only when the first check indicates no modification to the ciphertext or the additional authentication data and the second check indicates the one or more restrictions are not violated,
  decrypt the encrypted data with the encryption key to generate unencrypted data, and
  provide the unencrypted data as a result of the single instruction; and caching means for storing the handle, wherein only a portion of the integrity tag is to be used in a lookup of the handle.

Example 52. The apparatus of example 51, wherein the portion of the integrity tag is half of the integrity tag.

Example 53. The apparatus of example 52, wherein the integrity tag is 128 bits and the portion of the integrity tag is 64 bits.

Example 54. The apparatus of example 53, wherein the integrity tag is bits 128 to 256 of the handle.

Example 55. The apparatus of example 54, wherein the additional authentication data is bits 0 to 127 of the handle.

In yet another embodiment, an apparatus comprises a data storage device that stores code that when executed by a hardware processor causes the hardware processor to perform any method disclosed herein. An apparatus may be as described in the detailed description. A method may be as described in the detailed description.

What is claimed is:

1. An apparatus comprising:

decoder circuitry to decode a single instruction into a decoded single instruction, the single instruction having a first source operand to specify encrypted data and a second source operand to specify a handle including a first including ciphertext of an encryption key, an integrity tag, and additional authentication data;

execution circuitry to execute the decoded single instruction to:
  perform a first check of the integrity tag against the ciphertext and the additional authentication data for any modification to the ciphertext or the additional authentication data,
  perform a second check of a current request against one or more restrictions specified by the additional authentication data of the handle,
  decrypt the ciphertext to generate an encryption key only when the first check indicates no modification to the ciphertext or the additional authentication data and the second check indicates the one or more restrictions are not violated,
  decrypt the encrypted data with the encryption key to generate unencrypted data, and
  provide the unencrypted data as a result of the single instruction; and a cache to store the handle, wherein only a portion of the integrity tag is to be used in a lookup of the handle.

2. The apparatus of claim 1, wherein the portion of the integrity tag is half of the integrity tag.

3. The apparatus of claim 1, wherein the integrity tag is 128 bits and the portion of the integrity tag is 64 bits.

4. The apparatus of claim 1, wherein the integrity tag is bits 128 to 256 of the handle.

5. The apparatus of claim 4, wherein the additional authentication data is bits 0 to 127 of the handle.

6. The apparatus of claim 5, wherein the ciphertext is bits 256 to 383 of the handle.

7. The apparatus of claim 5, wherein the ciphertext is bits 256 to 511 of the handle.

8. The apparatus of claim 5, wherein the additional authentication data includes a field to indicate whether the handle is usable for encryption.

9. The apparatus of claim 5, wherein the additional authentication data includes a field to indicate whether the handle is usable for decryption.

10. The apparatus of claim 5, wherein the additional authentication data includes a field to indicate whether the handle is usable at a privilege level.

11. The apparatus of claim 5, wherein the additional authentication data includes a field to indicate a size of the ciphertext.

12. The apparatus of claim 11, wherein the additional authentication data includes a field to indicate whether the ciphertext is 128 bits or 256 bits.

13. A method comprising:
decoding a single instruction into a decoded single instruction with a decoder of a hardware processor, the single instruction having a first source operand to specify encrypted data and a second source operand to specify a handle including a first including ciphertext of an encryption key, an integrity tag, and additional authentication data;
executing the decoded single instruction with an execution unit of the processor to:
perform a first check of the integrity tag against the ciphertext and the additional authentication data for any modification to the ciphertext or the additional authentication data,
perform a second check of a current request against one or more restrictions specified by the additional authentication data of the handle,
decrypt the ciphertext to generate an encryption key only when the first check indicates no modification to the ciphertext or the additional authentication data and the second check indicates the one or more restrictions are not violated,
decrypt the encrypted data with the encryption key to generate unencrypted data,
provide the unencrypted data as a result of the single instruction, and
store the handle in the cache; and
looking up the handle from the cache based on a portion of the integrity tag.

14. The method of claim 13, wherein the subset of the integrity tag is half of the integrity tag.

15. The method of claim 14, wherein the integrity tag is 128 bits and the subset of the integrity is 64 bits.

16. The method of claim 13, wherein the integrity tag is bits 128 to 256 of the handle.

17. The method of claim 16, wherein the additional authentication data is bits 0 to 127 of the handle.

18. The method of claim 17, wherein the additional authentication data includes a field to indicate whether the ciphertext is bits 256 to 383 or bits 256 to 511 of the handle.

19. A system comprising:
a memory to store a handle; and
a processor including:
a cache;
decoder circuitry to decode a single instruction into a decoded single instruction, the single instruction having a first source operand to specify encrypted data and a second source operand to specify a handle including a first including ciphertext of an encryption key, an integrity tag, and additional authentication data;
execution circuitry to execute the decoded single instruction to:
read the handle from the memory,
perform a first check of the integrity tag against the ciphertext and the additional authentication data for any modification to the ciphertext or the additional authentication data,
perform a second check of a current request against one or more restrictions specified by the additional authentication data of the handle,
decrypt the ciphertext to generate an encryption key only when the first check indicates no modification to the ciphertext or the additional authentication data and the second check indicates the one or more restrictions are not violated,
decrypt the encrypted data with the encryption key to generate unencrypted data, and
provide the unencrypted data as a result of the single instruction; and
store the handle in the cache, wherein only a portion of the integrity tag is to be used in a lookup of the handle.

20. The system of claim 19, wherein the portion of the integrity tag is half of the integrity tag.

* * * * *